(12) United States Patent
Gao et al.

(10) Patent No.: US 12,259,491 B2
(45) Date of Patent: Mar. 25, 2025

(54) RADAR SIGNAL SENDING METHOD AND DEVICE

(71) Applicant: Shenzhen Yinwang Intelligent Technologies Co., Ltd., Shenzhen (CN)

(72) Inventors: Lutao Gao, Beijing (CN); Sha Ma, Beijing (CN); Sida Song, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 522 days.

(21) Appl. No.: 17/537,269

(22) Filed: Nov. 29, 2021

(65) Prior Publication Data

US 2022/0082655 A1    Mar. 17, 2022

Related U.S. Application Data

(63) Continuation of application No. PCT/CN2020/077653, filed on Mar. 3, 2020.

(30) Foreign Application Priority Data

May 31, 2019 (CN) .......................... 201910473501.4

(51) Int. Cl.
*G01S 7/02* (2006.01)
*G01S 7/536* (2006.01)
(Continued)

(52) U.S. Cl.
CPC .............. *G01S 7/023* (2013.01); *G01S 7/536* (2013.01); *G01S 7/0235* (2021.05); *G01S 7/35* (2013.01);
(Continued)

(58) Field of Classification Search
CPC ........ G01S 7/023; G01S 7/536; G01S 13/931; G01S 7/0235; G01S 13/343; G01S 7/35; G01S 7/36
See application file for complete search history.

(56) References Cited

U.S. PATENT DOCUMENTS 4,302,758 A    11/1981  Tomasi
2003/0218919 A1*  11/2003  Arita ....................... G01S 17/42
365/200

(Continued)

FOREIGN PATENT DOCUMENTS

CN         1894596 A    1/2007
CN       102356332 A    2/2012
(Continued)

OTHER PUBLICATIONS

Don Barrick et al., "Oceanographic Radar Timing Stability Required for New ITU Spectral Allocations", 2013 IEEE, total 8 pages.

*Primary Examiner* — Timothy A Brainard
*Assistant Examiner* — Ismaaeel A. Siddiquee
(74) *Attorney, Agent, or Firm* — Leydig, Voit & Mayer, Ltd.

(57) ABSTRACT

A radar signal sending method and a device provides for the sending of the radar signal to cooperative radars. A first time domain range in L time domain ranges is determined. A first radar signal is sent in the first time domain range. Any one of the L time domain ranges partially overlaps at least one of the other (L−1) time domain ranges, and an absolute value of a difference between time domain start locations of any two of the L time domain ranges is greater than or equal to a first threshold and less than or equal to a second threshold.

21 Claims, 21 Drawing Sheets

(51) Int. Cl.
*G01S 7/35* (2006.01)
*G01S 7/36* (2006.01)
*G01S 13/34* (2006.01)
*G01S 13/931* (2020.01)

(52) U.S. Cl.
CPC ............... *G01S 7/36* (2013.01); *G01S 13/343* (2013.01); *G01S 13/931* (2013.01)

(56) References Cited

U.S. PATENT DOCUMENTS

| | | | |
|---|---|---|---|
| 2016/0124075 A1* | 5/2016 | Vogt | G01S 13/536 |
| | | | 342/13 |
| 2016/0223645 A1* | 8/2016 | Kim | G01S 13/345 |
| 2017/0350970 A1* | 12/2017 | Saito | G01S 13/42 |
| 2018/0159647 A1 | 6/2018 | Nayyar et al. | |
| 2018/0252809 A1 | 9/2018 | Davis et al. | |
| 2019/0137600 A1* | 5/2019 | Bilik | G01S 7/023 |
| 2020/0088838 A1* | 3/2020 | Melzer | G01S 7/352 |

FOREIGN PATENT DOCUMENTS

| | | |
|---|---|---|
| CN | 102608581 A | 7/2012 |
| CN | 105842700 A | 8/2016 |
| JP | 2001255371 A | 9/2001 |
| JP | 2006220624 A | 8/2006 |
| JP | 2007187632 A | 7/2007 |
| JP | 2008232830 A | 10/2008 |
| JP | 2012107947 A | 6/2012 |
| JP | 2014126391 A | 7/2014 |
| JP | 2017003453 A | 1/2017 |
| JP | 2018059871 A | 4/2018 |

\* cited by examiner

RADAR SIGNAL SENDING METHOD AND DEVICE

CROSS-REFERENCE TO RELATED APPLICATIONS

This application is a continuation of International Application No. PCT/CN2020/077653, filed on Mar. 3, 2020, which claims priority to Chinese Patent Application No. 201910473501.4, filed on May 31, 2019. The disclosures of the aforementioned applications are hereby incorporated by reference in their entireties.

TECHNICAL FIELD

This application relates to the field of communications, and in particular, to a radar signal sending method and a device.

BACKGROUND

With the development of society, more machines in modern life develop towards automation and intelligence. Vehicles for mobile travel are not an exception, and intelligent vehicles are gradually entering people's daily life. In recent years, an advanced driving assistant system (ADAS) plays a quite important role in intelligent vehicles. This system uses various sensors installed on the vehicles to sense a surrounding environment, collect data, identify, detect, and track a still or moving object, and perform a systematic operation and analysis with reference to navigation map data in a driving process of the vehicle, so that a driver detects a possible danger in advance, thereby effectively improving driving comfort and safety of the vehicle.

In a self-driving architecture, a sensing layer includes visual sensors such as an in-vehicle camera and radar sensors such as an in-vehicle millimeter wave radar, an in-vehicle laser radar, and an in-vehicle ultrasonic radar. Because of low costs and a relatively mature technology, the millimeter wave radar is the first to become a main sensor of a self-driving system. At present, the ADAS has developed more than ten functions, where adaptive cruise control (ACC), autonomous emergency braking (AEB), lane change assist (LCA), blind spot monitoring (BSD), and the like require detection data from in-vehicle millimeter wave radar. A millimeter wave is an electromagnetic wave whose wavelength is between 1 mm and 10 mm, and a corresponding frequency range is from 30 GHz to 300 GHz. In this frequency band, a millimeter wave-related feature is quite suitable for application to the vehicle field. For example, large bandwidth, rich frequency domain resources, and a low antenna side lobe help implement imaging or quasi-imaging; a wavelength is short, reducing a volume of a radar device and an antenna aperture, so that a weight is reduced; a beam is narrow, to be specific, the millimeter wave beam is much narrower than a microwave beam in a case of a same antenna size, so that radar resolution is high; penetration is strong, to be specific, the millimeter wave radar is more capable of penetrating smoke, dust, and fog than the laser radar and an optical system, and the millimeter wave radar can implement all-weather operation.

With widespread use of in-vehicle radars, mutual interference between in-vehicle radars is becoming more serious. Mutual interference reduces a detection probability of the in-vehicle radar or improves a false alarm probability of detection of the in-vehicle radar, and therefore causes impact on driving safety or comfort of a vehicle that cannot be ignored. On this premise, how to reduce interference between in-vehicle radars is a technical problem that needs to be resolved urgently.

SUMMARY

Embodiments of this application provide a radar signal sending method and a device, to minimize or avoid interference between radars.

According to a first aspect, a radar signal sending method is provided. The method includes: determining a first time domain range, where the first time domain range is a time domain range in L time domain ranges, and L is a positive integer greater than 1; and sending a first radar signal in the first time domain range, where any one of the L time domain ranges partially overlaps at least one of the other (L−1) time domain ranges, and an absolute value of a difference between time domain start locations of any two of the L time domain ranges is greater than or equal to a first threshold and less than or equal to a second threshold; and the first threshold is determined based on at least one echo delay and at least one propagation delay, the at least one echo delay includes a first echo delay corresponding to a maximum detection distance of the first radar detection apparatus, and the at least one propagation delay includes a first propagation delay corresponding to the first radar signal.

The method may be performed by a detection apparatus. The detection apparatus is, for example, a radar detection apparatus. The radar detection apparatus performing the method may be referred to as the first radar detection apparatus.

In this embodiment of this application, an absolute value of a difference between time domain start locations of any two of the L time domain ranges may be greater than or equal to the first threshold and less than or equal to the second threshold. The first threshold is determined based on the at least one echo delay and the at least one propagation delay. For example, an absolute value of a difference between time domain start locations of any two time domain ranges needs to be greater than or equal to a largest value in the at least one echo delay and the at least one propagation delay. Only one radar detection apparatus is allowed to perform sending in one time domain range. In this way, a radar signal sent by one radar detection apparatus does not fall within an effective receiving area of another radar detection apparatus and is not processed by the another radar detection apparatus as a received signal, and a radar signal sent by another radar detection apparatus does not fall within an effective receiving area of the first radar detection apparatus and is not processed by the first radar detection apparatus as a received signal. In this way, interference between radar detection apparatuses can be reduced.

With reference to the first aspect, in a possible implementation of the first aspect, the at least one echo delay includes a second echo delay, and the second echo delay is an echo delay corresponding to a maximum detection distance of a second radar detection apparatus, and/or the at least one propagation delay includes a second propagation delay, and the second propagation delay is a propagation delay corresponding to a third radar signal corresponding to a third radar detection apparatus, where the second echo delay is not equal to the first echo delay, and the second propagation delay is not equal to the first propagation delay.

In addition to the first echo delay, the at least one echo delay may include an echo delay of another radar detection apparatus. For example, the at least one echo delay further includes the second echo delay corresponding to the second radar detection apparatus. The second echo delay may be equal to the first echo delay, or may not be equal to the first echo delay. If the second echo delay is not equal to the first echo delay, it indicates that types of the second radar detection apparatus and the first radar detection apparatus are different. In this case, a propagation delay of a radar signal sent by the second radar detection apparatus may be equal to the first propagation delay, or may not be equal to the first propagation delay, and this is not limited. In addition to the first propagation delay, the at least one propagation delay may include a propagation delay of a radar signal corresponding to another radar detection apparatus. For example, the at least one propagation delay further includes the second propagation delay corresponding to the third radar detection apparatus. The second propagation delay may be equal to the first propagation delay, or may not be equal to the first propagation delay. If the second propagation delay is not equal to the first propagation delay, it indicates that types of the third radar detection apparatus and the first radar detection apparatus are different. In this case, an echo delay of the third radar signal sent by the third radar detection apparatus may be equal to the first echo delay, or may not be equal to the first echo delay, and this is not limited. The second radar detection apparatus and the third radar detection apparatus may be a same radar detection apparatus, or may be different radar detection apparatuses.

With reference to the first aspect, in a possible implementation of the first aspect, the first threshold is a largest value in a plurality of first sub-thresholds, and the plurality of first sub-thresholds are determined based on the at least one echo delay and the at least one propagation delay.

For example, if a plurality of first sub-thresholds may be determined based on the at least one echo delay and the at least one echo delay, a largest value in the plurality of first sub-thresholds may be used as the first threshold. Equivalently, if a quantity of radar detection apparatuses involved in calculation is greater than 2, one first sub-threshold may be calculated based on every two radar detection apparatuses, and a largest value in obtained first sub-thresholds may be used as the first threshold, so that the determined first threshold can comply with a case of a plurality of radar detection apparatuses, and there is no interference between the plurality of radar detection apparatuses.

With reference to the first aspect, in a possible implementation of the first aspect, the first threshold meets the following formula:

$$\max(\tau_{max_1}, \tau_{max_2}, \Delta_{p_1}, \Delta_{p_2}) + \max\left(0, T_c - \frac{a_1}{a_2}T_c\right),$$

$$\text{or } \max(\tau_{max_1}, \tau_{max_2}, \Delta_{p_1}, \Delta_{p_2}) + \max\left(0, T_c - \frac{a_1}{a_2}T_c\right) + \Delta,$$

where $\tau_{max_1}$ is an echo delay corresponding to a maximum detection distance of a fourth radar detection apparatus, $\tau_{max_2}$ is an echo delay corresponding to a maximum detection distance of a fifth radar detection apparatus, $\Delta_{p_1}$ is a propagation delay corresponding to a fourth radar signal, $\Delta_{p_2}$ is a propagation delay corresponding to a fifth radar signal, $a_1$ is a frequency change amount of the fourth radar signal in a unit time, $a_2$ is a frequency change amount of the fifth radar signal in the unit time, $T_c$ is a frequency scanning time of the fourth radar detection apparatus, the fourth radar signal corresponds to the fourth radar detection apparatus, the fifth radar signal corresponds to the fifth radar detection apparatus, $\Delta$ is a time margin, a synchronization error, or a sum of a time margin and a synchronization error, and the synchronization error is a synchronization error between the fourth radar detection apparatus and the fifth radar detection apparatus.

With reference to the first aspect, in a possible implementation of the first aspect, the propagation delay corresponding to the fourth radar signal is a maximum propagation delay corresponding to the fourth radar signal, and the propagation delay corresponding to the fifth radar signal is a maximum propagation delay corresponding to the fifth radar signal.

A manner of calculating the first threshold is provided. This case may be, for example, applicable to a case in which locations of the fourth radar detection apparatus and the fifth radar detection apparatus are not fixed, for example, both the fourth radar detection apparatus and the fifth radar detection apparatus are in-vehicle radar detection apparatuses. In this case, the propagation delay corresponding to the fourth radar signal may be the maximum propagation delay corresponding to the fourth radar signal, and similarly, the propagation delay corresponding to the fifth radar signal may be the maximum propagation delay corresponding to the fifth radar signal. The fourth radar detection apparatus or the fifth radar detection apparatus may be the first radar detection apparatus, or neither the fourth radar detection apparatus nor the fifth radar detection apparatus is the first radar detection apparatus, and this is not specifically limited.

With reference to the first aspect, in a possible implementation of the first aspect, the second threshold is determined based on the at least one echo delay and the at least one propagation delay.

Based on the at least one echo delay and the at least one propagation delay, the second threshold may be determined in addition to determining the first threshold. Alternatively, the second threshold may be determined in another manner, and this is not specifically limited.

With reference to the first aspect, in a possible implementation of the first aspect, the second threshold is a smallest value in a plurality of second sub-thresholds, and the plurality of second sub-thresholds are determined based on the at least one echo delay and the at least one propagation delay.

For example, if a plurality of second sub-thresholds may be determined based on the at least one echo delay and the at least one echo delay, a smallest value in the plurality of second sub-thresholds may be used as the second threshold. Equivalently, if a quantity of radar detection apparatuses involved in calculation is greater than 2, one second sub-threshold may be calculated based on every two radar detection apparatuses, and a smallest value in obtained second sub-thresholds may be used as the second threshold, so that the determined second threshold can comply with a case of a plurality of radar detection apparatuses, and there is no interference between the plurality of radar detection apparatuses.

With reference to the first aspect, in a possible implementation of the first aspect, the second threshold meets the following formula:

$$T_c - \max(\tau_{max_1}, \tau_{max_2}, \Delta_{p_1}, \Delta_{p_2}) + \min\left(0, T_c - \frac{a_1}{a_2}T_c\right),$$

-continued $$\text{or } T_c - \max(\tau_{max_1}, \tau_{max_2}, \Delta_{p_1}, \Delta_{p_2}) + \min\left(0, T_c - \frac{a_1}{a_2}T_c\right) + \Delta,$$

where $\tau_{max_1}$ is an echo delay corresponding to a maximum detection distance of a sixth radar detection apparatus, $\tau_{max_2}$ is an echo delay corresponding to a maximum detection distance of a seventh radar detection apparatus, $\Delta_{p_1}$ is a propagation delay corresponding to a sixth radar signal, $\Delta_{p_2}$ is a propagation delay corresponding to a seventh radar signal, $a_1$ is a frequency change amount of the sixth radar signal in the unit time, $a_2$ is a frequency change amount of the seventh radar signal in the unit time, $T_c$ is a frequency scanning time of the sixth radar detection apparatus, the sixth radar signal corresponds to the sixth radar detection apparatus, the seventh radar signal corresponds to the seventh radar detection apparatus, $\Delta$ is a time margin, a synchronization error, or a sum of a time margin and a synchronization error, and the synchronization error is a synchronization error between the sixth radar detection apparatus and the seventh radar detection apparatus.

A manner of calculating the second threshold is provided. This case may be, for example, applicable to a case in which locations of the sixth radar detection apparatus and the seventh radar detection apparatus are not fixed, for example, both the sixth radar detection apparatus and the seventh radar detection apparatus are in-vehicle radar detection apparatuses. In this case, the propagation delay corresponding to the sixth radar signal may be a maximum propagation delay corresponding to the sixth radar signal, and similarly, the propagation delay corresponding to the seventh radar signal may be a maximum propagation delay corresponding to the seventh radar signal.

The sixth radar detection apparatus and the fourth radar detection apparatus may be a same detection apparatus, or may be different detection apparatuses, and the seventh radar detection apparatus and the fifth radar detection apparatus may be a same detection apparatus, or may be different detection apparatuses.

With reference to the first aspect, in a possible implementation of the first aspect, the propagation delay corresponding to the sixth radar signal is a maximum propagation delay corresponding to the sixth radar signal, and the propagation delay corresponding to the seventh radar signal is a maximum propagation delay corresponding to the seventh radar signal.

The maximum propagation delay of the radar signal may be a propagation delay corresponding to a maximum tolerable interference distance of a corresponding radar detection apparatus.

With reference to the first aspect, in a possible implementation of the first aspect, the first threshold meets the following formula:

$$\max(\Delta_{p_1}, \Delta_{p_2}, \tau_{max_2} - \Delta_{p_1}, \tau_{max_1} - \Delta_{p_2}) + \max\left(0, T_c - \frac{a_1}{a_2}T_c\right),$$

$$\text{or } \max(\Delta_{p_1}, \Delta_{p_2}, \tau_{max_2} - \Delta_{p_1}, \tau_{max_1} - \Delta_{p_2}) + \max\left(0, T_c - \frac{a_1}{a_2}T_c\right) + \Delta,$$

where $\tau_{max_1}$ is an echo delay corresponding to a maximum detection distance of a fourth radar detection apparatus, $\tau_{max_2}$ is an echo delay corresponding to a maximum detection distance of a fifth radar detection apparatus, $\Delta_{p_1}$ is a propagation delay corresponding to a fourth radar signal, $\Delta_{p_2}$ is a propagation delay corresponding to a fifth radar signal, $a_1$ is a frequency change amount of the fourth radar signal in a unit time, $a_2$ is a frequency change amount of the fifth radar signal in the unit time, $T_c$ is a frequency scanning time of the fourth radar detection apparatus, the fourth radar signal corresponds to the fourth radar detection apparatus, the fifth radar signal corresponds to the fifth radar detection apparatus, $\Delta$ is a time margin, a synchronization error, or a sum of a time margin and a synchronization error, and the synchronization error is a synchronization error between the fourth radar detection apparatus and the fifth radar detection apparatus.

Another manner of calculating the first threshold is provided. This case may be, for example, applicable to a case in which locations of the fourth radar detection apparatus and the fifth radar detection apparatus are fixed, for example, both the fourth radar detection apparatus and the fifth radar detection apparatus are disposed on an RSU or a base station, or the fourth radar detection apparatus is disposed on an RSU, and the fifth radar detection apparatus is disposed on a base station. In this case, the propagation delay corresponding to the fourth radar signal may be a delay of the fourth radar signal in reaching the fifth radar detection apparatus from the fourth radar detection apparatus, and similarly, the propagation delay corresponding to the fifth radar signal may be a delay of the fifth radar signal in reaching the fourth radar detection apparatus from the fifth radar detection apparatus.

With reference to the first aspect, in a possible implementation of the first aspect, the second threshold is determined based on the at least one echo delay and the at least one propagation delay.

With reference to the first aspect, in a possible implementation of the first aspect, the second threshold is a smallest value in a plurality of second sub-thresholds, and the plurality of second sub-thresholds are determined based on the at least one echo delay and the at least one propagation delay.

With reference to the first aspect, in a possible implementation of the first aspect, the second threshold meets the following formula:

$$T_c - \max(\Delta_{p_1}, \Delta_{p_2}, \tau_{max_2} - \Delta_{p_1}, \tau_{max_1} - \Delta_{p_2}) + \min\left(0, T_c - \frac{a_1}{a_2}\right),$$

or $$T_c - \max(\Delta_{p_1}, \Delta_{p_2}, \tau_{max_2} - \Delta_{p_1}, \tau_{max_1} - \Delta_{p_2}) + \min\left(0, T_c - \frac{a_1}{a_2}T_c\right) + \Delta,$$

where $\tau_{max_1}$ is an echo delay corresponding to a maximum detection distance of a sixth radar detection apparatus, $\tau_{max_2}$ is an echo delay corresponding to a maximum detection distance of a seventh radar detection apparatus, $\Delta_{p_1}$ is a propagation delay corresponding to a sixth radar signal, $\Delta_{p_2}$ is a propagation delay corresponding to a seventh radar signal, $a_1$ is a frequency change amount of the sixth radar signal in the unit time, $a_2$ is a frequency change amount of the seventh radar signal in the unit time, $T_c$ is a frequency scanning time of the sixth radar detection apparatus, the sixth radar signal corresponds to the sixth radar detection apparatus, the seventh radar signal corresponds to the seventh radar detection apparatus, $\Delta$ is a time margin, a synchronization error, or a sum of a time margin and a synchronization error, and the synchronization error is a synchronization error between the sixth radar detection apparatus and the seventh radar detection apparatus.

Another manner of calculating the second threshold is provided. This case may be, for example, applicable to a case in which locations of the sixth radar detection apparatus and the seventh radar detection apparatus are fixed, for example, both the sixth radar detection apparatus and the seventh radar detection apparatus are disposed on an RSU or a base station, or the sixth radar detection apparatus is disposed on an RSU, and the seventh radar detection apparatus is disposed on a base station. In this case, the propagation delay corresponding to the sixth radar signal may be a delay of the sixth radar signal in reaching the seventh radar detection apparatus from the sixth radar detection apparatus, and similarly, the propagation delay corresponding to the seventh radar signal may be a delay of the seventh radar signal in reaching the sixth radar detection apparatus from the seventh radar detection apparatus.

With reference to the first aspect, in a possible implementation of the first aspect, the propagation delay corresponding to the sixth radar signal is a delay of the sixth radar signal in reaching the seventh radar detection apparatus from the sixth radar detection apparatus, and the propagation delay corresponding to the seventh radar signal is a delay of the seventh radar signal in reaching the sixth radar detection apparatus from the seventh radar detection apparatus.

According to a second aspect, a first type of detection apparatus is provided. For example, the detection apparatus is the first radar detection apparatus described above. The detection apparatus is configured to perform the method in any one of the first aspect and the possible implementations of the first aspect. The detection apparatus may include modules, for example, a processing unit and a transceiver unit, configured to perform the method in any one of the first aspect and the possible implementations of the first aspect.

The processing unit is configured to determine a first time domain range, where the first time domain range is a time domain range in L time domain ranges, and L is a positive integer greater than 1; and the transceiver unit is configured to send a first radar signal in the first time domain range, where
any one of the L time domain ranges partially overlaps at least one of the other (L−1) time domain ranges, and an absolute value of a difference between time domain start locations of any two of the L time domain ranges is greater than or equal to a first threshold and less than or equal to a second threshold; and the first threshold is determined based on at least one echo delay and at least one propagation delay, the at least one echo delay includes a first echo delay corresponding to a maximum detection distance of the first radar detection apparatus, and the at least one propagation delay includes a first propagation delay corresponding to the first radar signal.

With reference to the second aspect, in a possible implementation of the second aspect,
the at least one echo delay includes a second echo delay, and the second echo delay is an echo delay corresponding to a maximum detection distance of a second radar detection apparatus; and/or
the at least one propagation delay includes a second propagation delay, and the second propagation delay is a propagation delay corresponding to a third radar signal corresponding to a third radar detection apparatus, where the second echo delay is not equal to the first echo delay, and the second propagation delay is not equal to the first propagation delay.

With reference to the second aspect, in a possible implementation of the second aspect, the first threshold is a largest value in a plurality of first sub-thresholds, and the plurality of first sub-thresholds are determined based on the at least one echo delay and the at least one propagation delay.

With reference to the second aspect, in a possible implementation of the second aspect, the first threshold meets the following formula:

$$\max(\tau_{max_1}, \tau_{max_2}, \Delta_{p_1}, \Delta_{p_2}) + \max\left(0, T_c - \frac{a_1}{a_2}T_c\right),$$

or $$\max(\tau_{max_1}, \tau_{max_2}, \Delta_{p_1}, \Delta_{p_2}) + \max\left(0, T_c - \frac{a_1}{a_2}T_c\right) + \Delta,$$

where $\tau_{max_1}$ is an echo delay corresponding to a maximum detection distance of a fourth radar detection apparatus, $\tau_{max_2}$ is an echo delay corresponding to a maximum detection distance of a fifth radar detection apparatus, $\Delta_{p_1}$ is a propagation delay corresponding to a fourth radar signal, $\Delta_{p_2}$ is a propagation delay corresponding to a fifth radar signal, $a_1$ is a frequency change amount of the fourth radar signal in a unit time, $a_2$ is a frequency change amount of the fifth radar signal in the unit time, $T_c$ is a frequency scanning time of the fourth radar detection apparatus, the fourth radar signal corresponds to the fourth radar detection apparatus, the fifth radar signal corresponds to the fifth radar detection apparatus, $\Delta$ is a time margin, a synchronization error, or a sum of a time margin and a synchronization error, and the synchronization error is a synchronization error between the fourth radar detection apparatus and the fifth radar detection apparatus.

With reference to the second aspect, in a possible implementation of the second aspect, the propagation delay corresponding to the fourth radar signal is a maximum propagation delay corresponding to the fourth radar signal, and the propagation delay corresponding to the fifth radar signal is a maximum propagation delay corresponding to the fifth radar signal.

With reference to the second aspect, in a possible implementation of the second aspect, the second threshold is determined based on the at least one echo delay and the at least one propagation delay.

With reference to the second aspect, in a possible implementation of the second aspect, the second threshold is a smallest value in a plurality of second sub-thresholds, and the plurality of second sub-thresholds are determined based on the at least one echo delay and the at least one propagation delay.

With reference to the second aspect, in a possible implementation of the second aspect, the second threshold meets the following formula:

$$T_c - \max(\tau_{max_1}, \tau_{max_2}, \Delta_{p_1}, \Delta_{p_2}) + \min\left(0, T_c - \frac{a_1}{a_2}T_c\right),$$

or $$T_c - \max(\tau_{max_1}, \tau_{max_2}, \Delta_{p_1}, \Delta_{p_2}) + \max\left(0, T_c - \frac{a_1}{a_2}T_c\right) + \Delta,$$

where $\tau_{max_1}$ is an echo delay corresponding to a maximum detection distance of a sixth radar detection apparatus, $\tau_{max_2}$ is an echo delay corresponding to a maximum detection distance of a seventh radar detection apparatus, $\Delta_{p_1}$ is a propagation delay corresponding to a sixth radar signal, $\Delta_{p_2}$ is a propagation delay corresponding to a seventh radar signal, $a_1$ is a frequency change amount of the sixth radar signal in the unit time, $a_2$ is a frequency change amount of the seventh radar signal in the unit time, $T_c$ is a frequency scanning time of the sixth radar detection apparatus, the sixth radar signal corresponds to the sixth radar detection apparatus, the seventh radar signal corresponds to the seventh radar detection apparatus, $\Delta$ is a time margin, a synchronization error, or a sum of a time margin and a synchronization error, and the synchronization error is a synchronization error between the sixth radar detection apparatus and the seventh radar detection apparatus.

With reference to the second aspect, in a possible implementation of the second aspect, the propagation delay corresponding to the sixth radar signal is a maximum propagation delay corresponding to the sixth radar signal, and the propagation delay corresponding to the seventh radar signal is a maximum propagation delay corresponding to the seventh radar signal.

With reference to the second aspect, in a possible implementation of the second aspect, the first threshold meets the following formula:

$$\max(\Delta_{p_1}, \Delta_{p_2}, \tau_{max_2} - \Delta_{p_1}, \tau_{max_1} - \Delta_{p_2}) + \max\left(0, T_c - \frac{a_1}{a_2}T_c\right),$$

or $$\max(\Delta_{p_1}, \Delta_{p_2}, \tau_{max_2} - \Delta_{p_1}, \tau_{max_1} - \Delta_{p_2}) + \max\left(0, T_c - \frac{a_1}{a_2}T_c\right) + \Delta,$$

where $\tau_{max_1}$ is an echo delay corresponding to a maximum detection distance of a fourth radar detection apparatus, $\tau_{max_2}$ is an echo delay corresponding to a maximum detection distance of a fifth radar detection apparatus, $\Delta_{p_1}$ is a propagation delay corresponding to a fourth radar signal, $\Delta_{p_2}$ is a propagation delay corresponding to a fifth radar signal, $a_1$ is a frequency change amount of the fourth radar signal in a unit time, $a_2$ is a frequency change amount of the fifth radar signal in the unit time, $T_c$ is a frequency scanning time of the fourth radar detection apparatus, the fourth radar signal corresponds to the fourth radar detection apparatus, the fifth radar signal corresponds to the fifth radar detection apparatus, $\Delta$ is a time margin, a synchronization error, or a sum of a time margin and a synchronization error, and the synchronization error is a synchronization error between the fourth radar detection apparatus and the fifth radar detection apparatus.

With reference to the second aspect, in a possible implementation of the second aspect, the second threshold is determined based on the at least one echo delay and the at least one propagation delay.

With reference to the second aspect, in a possible implementation of the second aspect, the second threshold is a smallest value in a plurality of second sub-thresholds, and the plurality of second sub-thresholds are determined based on the at least one echo delay and the at least one propagation delay.

With reference to the second aspect, in a possible implementation of the second aspect, the second threshold meets the following formula:

$$T_c - \max(\Delta_{p_1}, \Delta_{p_2}, \tau_{max_2} - \Delta_{p_1}, \tau_{max_1} - \Delta_{p_2}) + \min\left(0, T_c - \frac{a_1}{a_2}T_c\right),$$

or $$T_c - \max(\Delta_{p_1}, \Delta_{p_2}, \tau_{max_2} - \Delta_{p_1}, \tau_{max_1} - \Delta_{p_2}) + \min\left(0, T_c - \frac{a_1}{a_2}T_c\right) + \Delta,$$

where $\tau_{max_1}$ is an echo delay corresponding to a maximum detection distance of a sixth radar detection apparatus, $\tau_{max_2}$ is an echo delay corresponding to a maximum detection distance of a seventh radar detection apparatus, $\Delta_{p_1}$ is a propagation delay corresponding to a sixth radar signal, $\Delta_{p_2}$ is a propagation delay corresponding to a seventh radar signal, $a_1$ is a frequency change amount of the sixth radar signal in the unit time, $a_2$ is a frequency change amount of the seventh radar signal in the unit time, $T_c$ is a frequency scanning time of the sixth radar detection apparatus, the sixth radar signal corresponds to the sixth radar detection apparatus, the seventh radar signal corresponds to the seventh radar detection apparatus, $\Delta$ is a time margin, a synchronization error, or a sum of a time margin and a synchronization error, and the synchronization error is a synchronization error between the sixth radar detection apparatus and the seventh radar detection apparatus.

With reference to the second aspect, in a possible implementation of the second aspect, the propagation delay corresponding to the fourth radar signal is a delay of the fourth radar signal in reaching the fifth radar detection apparatus from the fourth radar detection apparatus, and the propagation delay corresponding to the fifth radar signal is a delay of the fifth radar signal in reaching the fourth radar detection apparatus from the fifth radar detection apparatus.

For technical effects of the second aspect or the various possible implementations of the second aspect, refer to the descriptions of the technical effects of the first aspect or the corresponding implementations of the first aspect.

According to a third aspect, a second type of detection apparatus is provided. For example, the detection apparatus is the first radar detection apparatus described above. The detection apparatus includes a processor, a transmitter, and a receiver, and the processor, the transmitter, and the receiver are coupled to implement the method described in the first aspect or the various possible designs of the first aspect. For example, the detection apparatus is a chip disposed in a detection device. For example, the detection device is a radar. The transmitter and the receiver are implemented, for example, by using an antenna, a feeder, and a codec in a communications device, or if the detection apparatus is a chip disposed in a detection device, the transmitter and the receiver are, for example, a communications interface in the chip, and the communications interface is connected to a radio frequency transceiver component in the detection device, to implement information transceiving by using the radio frequency transceiver component.

The processor is configured to determine a first time domain range, where the first time domain range is a time domain range in L time domain ranges, and L is a positive integer greater than 1; and the transmitter is configured to send a first radar signal in the first time domain range, where any one of the L time domain ranges partially overlaps at least one of the other (L−1) time domain ranges, and an absolute value of a difference between time domain start locations of any two of the L time domain ranges is greater than or equal to a first threshold and less than or equal to a second threshold; and the first threshold is determined based on at least one echo delay and at least one propagation delay, the at least one echo delay includes a first echo delay corresponding to a maximum detection distance of the first radar detection apparatus, and the at least one propagation delay includes a first propagation delay corresponding to the first radar signal.

With reference to the third aspect, in a possible implementation of the third aspect,
the at least one echo delay includes a second echo delay, and the second echo delay is an echo delay corresponding to a maximum detection distance of a second radar detection apparatus; and/or
the at least one propagation delay includes a second propagation delay, and the second propagation delay is a propagation delay corresponding to a third radar signal corresponding to a third radar detection apparatus, where
the second echo delay is not equal to the first echo delay, and the second propagation delay is not equal to the first propagation delay.

With reference to the third aspect, in a possible implementation of the third aspect, the first threshold is a largest value in a plurality of first sub-thresholds, and the plurality of first sub-thresholds are determined based on the at least one echo delay and the at least one propagation delay.

With reference to the third aspect, in a possible implementation of the third aspect, the first threshold meets the following formula:

$$\max(\tau_{max_1}, \tau_{max_2}, \Delta_{p_1}, \Delta_{p_2}) + \max\left(0, T_c - \frac{a_1}{a_2}T_c\right),$$

or $$\max(\tau_{max_1}, \tau_{max_2}, \Delta_{p_1}, \Delta_{p_2}) + \max\left(0, T_c - \frac{a_1}{a_2}T_c\right) + \Delta,$$

where
$\tau_{max_1}$ is an echo delay corresponding to a maximum detection distance of a fourth radar detection apparatus, $\tau_{max_2}$ is an echo delay corresponding to a maximum detection distance of a fifth radar detection apparatus, $\Delta_{p_1}$ is a propagation delay corresponding to a fourth radar signal, $\Delta_{p_2}$ is a propagation delay corresponding to a fifth radar signal, $a_1$ is a frequency change amount of the fourth radar signal in a unit time, $a_2$ is a frequency change amount of the fifth radar signal in the unit time, $T_c$ is a frequency scanning time of the fourth radar detection apparatus, the fourth radar signal corresponds to the fourth radar detection apparatus, the fifth radar signal corresponds to the fifth radar detection apparatus, $\Delta$ is a time margin, a synchronization error, or a sum of a time margin and a synchronization error, and the synchronization error is a synchronization error between the fourth radar detection apparatus and the fifth radar detection apparatus.

With reference to the third aspect, in a possible implementation of the third aspect, the propagation delay corresponding to the fourth radar signal is a maximum propagation delay corresponding to the fourth radar signal, and the propagation delay corresponding to the fifth radar signal is a maximum propagation delay corresponding to the fifth radar signal.

With reference to the third aspect, in a possible implementation of the third aspect, the second threshold is determined based on the at least one echo delay and the at least one propagation delay.

With reference to the third aspect, in a possible implementation of the third aspect, the second threshold is a smallest value in a plurality of second sub-thresholds, and the plurality of second sub-thresholds are determined based on the at least one echo delay and the at least one propagation delay.

With reference to the third aspect, in a possible implementation of the third aspect, the second threshold meets the following formula:

$$T_c - \max(\tau_{max_1}, \tau_{max_2}, \Delta_{p_1}, \Delta_{p_2}) + \min\left(0, T_c - \frac{a_1}{a_2}T_c\right),$$

or $$T_c - \max(\tau_{max_1}, \tau_{max_2}, \Delta_{p_1}, \Delta_{p_2}) + \max\left(0, T_c - \frac{a_1}{a_2}T_c\right) + \Delta,$$

where
$\tau_{max_1}$ is an echo delay corresponding to a maximum detection distance of a sixth radar detection apparatus, $\tau_{max_2}$ is an echo delay corresponding to a maximum detection distance of a seventh radar detection apparatus, $\Delta_{p_1}$ is a propagation delay corresponding to a sixth radar signal, $\Delta_{p_2}$ is a propagation delay corresponding to a seventh radar signal, $a_1$ is a frequency change amount of the sixth radar signal in the unit time, $a_2$ is a frequency change amount of the seventh radar signal in the unit time, $T_c$ is a frequency scanning time of the sixth radar detection apparatus, the sixth radar signal corresponds to the sixth radar detection apparatus, the seventh radar signal corresponds to the seventh radar detection apparatus, $\Delta$ is a time margin, a synchronization error, or a sum of a time margin and a synchronization error, and the synchronization error is a synchronization error between the sixth radar detection apparatus and the seventh radar detection apparatus.

With reference to the third aspect, in a possible implementation of the third aspect, the propagation delay corresponding to the fourth radar signal is a maximum propagation delay corresponding to the fourth radar signal, and the propagation delay corresponding to the fifth radar signal is a maximum propagation delay corresponding to the fifth radar signal.

With reference to the third aspect, in a possible implementation of the third aspect, the first threshold meets the following formula:

$$\max(\Delta_{p_1}, \Delta_{p_2}, \tau_{max_2} - \Delta_{p_1}, \tau_{max_1} - \Delta_{p_2}) + \max\left(0, T_c - \frac{a_1}{a_2}T_c\right),$$

or $$\max(\Delta_{p_1}, \Delta_{p_2}, \tau_{max_2} - \Delta_{p_1}, \tau_{max_1} - \Delta_{p_2}) + \max\left(0, T_c - \frac{a_1}{a_2}T_c\right) + \Delta,$$

where
$\tau_{max_1}$ is an echo delay corresponding to a maximum detection distance of a fourth radar detection apparatus, $\tau_{max_2}$ is an echo delay corresponding to a maximum detection distance of a fifth radar detection apparatus, $\Delta_{p_1}$ is a propagation delay corresponding to a fourth radar signal, $\Delta_{p_2}$ is a propagation delay corresponding to a fifth radar signal, $a_1$ is a frequency change amount of the fourth radar signal in a unit time, $a_2$ is a frequency change amount of the fifth radar signal in the unit time, $T_c$ is a frequency scanning time of the fourth radar detection apparatus, the fourth radar signal corresponds to the fourth radar detection apparatus, the fifth radar signal corresponds to the fifth radar detection apparatus, $\Delta$ is a time margin, a synchronization error, or a sum of a time margin and a synchronization error, and the synchronization error is a synchronization error between the fourth radar detection apparatus and the fifth radar detection apparatus.

With reference to the third aspect, in a possible implementation of the third aspect, the second threshold is determined based on the at least one echo delay and the at least one propagation delay.

With reference to the third aspect, in a possible implementation of the third aspect, the second threshold is a smallest value in a plurality of second sub-thresholds, and the plurality of second sub-thresholds are determined based on the at least one echo delay and the at least one propagation delay.

With reference to the third aspect, in a possible implementation of the third aspect, the second threshold meets the following formula:

$$T_c - \max(\Delta_{p_1}, \Delta_{p_2}, \tau_{max_2} - \Delta_{p_1}, \tau_{max_1} - \Delta_{p_2}) + \min\left(0, T_c - \frac{a_1}{a_2}T_c\right),$$

or $$T_c - \max(\Delta_{p_1}, \Delta_{p_2}, \tau_{max_2} - \Delta_{p_1}, \tau_{max_1} - \Delta_{p_2}) + \min\left(0, T_c - \frac{a_1}{a_2}T_c\right) + \Delta,$$

where $\tau_{max_1}$ is an echo delay corresponding to a maximum detection distance of a sixth radar detection apparatus, $\tau_{max_2}$ is an echo delay corresponding to a maximum detection distance of a seventh radar detection apparatus, $\Delta_{p_1}$ is a propagation delay corresponding to a sixth radar signal, $\Delta_{p_2}$ is a propagation delay corresponding to a seventh radar signal, $a_1$ is a frequency change amount of the sixth radar signal in the unit time, $a_2$ is a frequency change amount of the seventh radar signal in the unit time, $T_c$ is a frequency scanning time of the sixth radar detection apparatus, the sixth radar signal corresponds to the sixth radar detection apparatus, the seventh radar signal corresponds to the seventh radar detection apparatus, $\Delta$ is a time margin, a synchronization error, or a sum of a time margin and a synchronization error, and the synchronization error is a synchronization error between the sixth radar detection apparatus and the seventh radar detection apparatus.

With reference to the third aspect, in a possible implementation of the third aspect, the propagation delay corresponding to the fourth radar signal is a delay of the fourth radar signal in reaching the fifth radar detection apparatus from the fourth radar detection apparatus, and the propagation delay corresponding to the fifth radar signal is a delay of the fifth radar signal in reaching the fourth radar detection apparatus from the fifth radar detection apparatus.

For technical effects of the third aspect or the various possible implementations of the third aspect, refer to the descriptions of the technical effects of the first aspect or the corresponding implementations of the first aspect.

According to a fourth aspect, a third type of detection apparatus is provided. The detection apparatus may be the first radar detection apparatus in the foregoing method designs. For example, the detection apparatus is a chip disposed in a detection device. For example, the detection device is a radar. The detection apparatus includes: a memory, configured to store computer executable program code; and a processor, coupled to the memory. The program code stored in the memory includes instructions, and when the processor executes the instructions, the third type of detection apparatus performs the method in any one of the first aspect and the possible implementations of the first aspect.

The third type of detection apparatus may further include a communications interface, and the communications interface may be a transceiver in a detection device, for example, be implemented by using an antenna, a feeder, and a codec in the detection apparatus; or if the fifth detection apparatus is a chip disposed in a detection device, the communications interface may be an input/output interface such as an input/output pin of the chip.

According to a fifth aspect, a communications system is provided. The communications system may include the first type of detection apparatus according to the second aspect, the second type of detection apparatus according to the third aspect, or the third type of detection apparatus according to the fourth aspect, and include another detection apparatus (for example, one or more of a second detection apparatus, a third detection apparatus, a fourth detection apparatus, and a fifth detection apparatus); or the communications system may include the first type of detection apparatus according to the second aspect, the second type of detection apparatus according to the third aspect, or the third type of detection apparatus according to the fourth aspect, and include a target object; or the communications system may include the first type of detection apparatus according to the second aspect, the second type of detection apparatus according to the third aspect, or the third type of detection apparatus according to the fourth aspect, and include another detection apparatus (for example, one or more of a second detection apparatus, a third detection apparatus, a fourth detection apparatus, and a fifth detection apparatus) and a target object.

According to a sixth aspect, a computer storage medium is provided. The computer-readable storage medium stores instructions, and when the instructions run on a computer, the computer performs the method according to any one of the first aspect and the possible designs of the first aspect.

According to a seventh aspect, a computer program product including instructions is provided. The computer program product stores the instructions, and when the computer program product runs on a computer, the computer performs the method according to any one of the first aspect and the possible designs of the first aspect.

In the embodiments of this application, an absolute value of a difference between time domain start locations of any two of the L time domain ranges may be greater than or equal to the first threshold and less than or equal to the second threshold. In this way, a radar signal sent by one radar detection apparatus does not fall within an effective receiving area of another radar detection apparatus and is not processed by the another radar detection apparatus as a received signal, and a radar signal sent by another radar detection apparatus does not fall within an effective receiving area of the first radar detection apparatus and is not processed by the first radar detection apparatus as a received signal. In this way, interference between radar detection apparatuses can be reduced.

DESCRIPTION OF EMBODIMENTS

Figure 1:
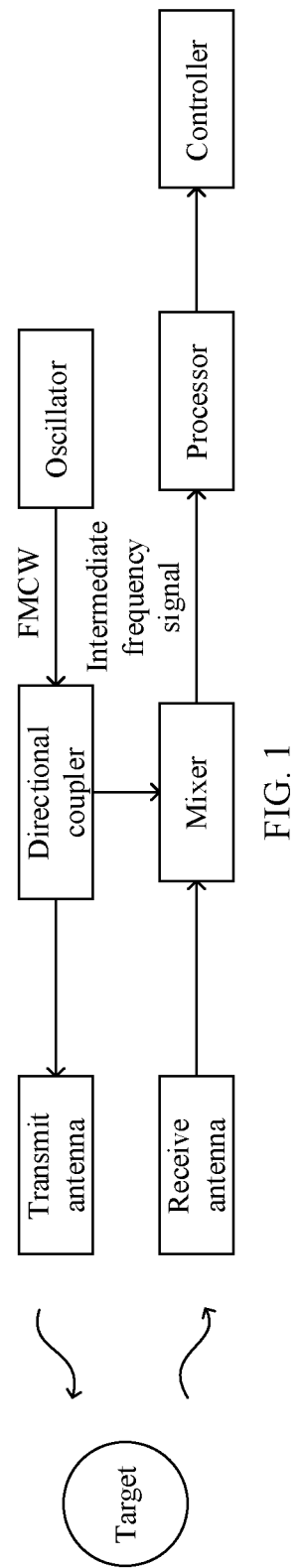
FIG. 1 is a schematic structural diagram of a radar apparatus.

To make the objectives, technical solutions, and advantages of the embodiments of this application clearer, the following further describes the embodiments of this application in detail with reference to the accompanying drawings.

In the following, some terms of the embodiments of this application are described, to help a person skilled in the art have a better understanding.

(1) A radar detection apparatus is, for example, a radar, or may be another apparatus configured to perform detection (for example, ranging).

(2) A radar may also be referred to as a radar apparatus, a detector, a radar detection apparatus, a radar signal sending apparatus, or the like. A working principle of the radar is to detect a corresponding target object by transmitting a signal (also referred to as a "sounding signal") and receiving a reflected signal reflected by the target object. The signal transmitted by the radar may be a radar signal, and correspondingly, the received reflected signal reflected by the target object may also be a radar signal.

(3) A transmission period of the radar detection apparatus (also referred to as a "frequency scanning period", a "frequency scanning time", "frequency scanning duration", or the like of the radar detection apparatus) is a period in which the radar detection apparatus transmits a radar signal of a complete waveform. The radar detection apparatus usually sends radar signals in a plurality of frequency scanning periods in continuous duration.

(4) For an initial frequency of the radar detection apparatus, at the beginning of a transmission period, the radar detection apparatus transmits a radar signal at one frequency. The frequency is referred to as the initial frequency of the radar detection apparatus. In addition, a transmission frequency of the radar detection apparatus changes in the transmission period based on the initial frequency.

(5) Frequency scanning bandwidth of the radar detection apparatus is bandwidth occupied by a waveform of a radar signal sent by the radar detection apparatus. It should be noted herein that "frequency scanning bandwidth" is defined for ease of description, and is technically bandwidth occupied by the waveform of the radar signal sent by the radar detection apparatus. Further, a frequency band occupied by the waveform of the radar signal sent by the radar detection apparatus may be referred to as a frequency scanning frequency band.

(6) A frequency modulated continuous wave (FMCW) is an electromagnetic wave whose frequency changes with time.

(7) A linear frequency modulated continuous wave is an electromagnetic wave whose frequency changes linearly with time. The linear change herein generally means a linear change in one transmission period. A waveform of the linear frequency modulated continuous wave is usually a sawtooth wave or a triangular wave or another possible waveform such as a step frequency waveform.

(8) A maximum ranging range of the radar detection apparatus, also referred to as a maximum detection distance of the radar detection apparatus, is a parameter related to configuration of the radar detection apparatus (for example, related to a factory setting parameter of the radar detection apparatus). For example, if the radar detection apparatus is a radar, a maximum ranging distance of a long range adaptive cruise control (ACC) radar is 250 m, and a maximum ranging distance of an intermediate-range radar is 70 m to 150 m.

(9) For an intermediate frequency (IF) signal, in an example in which the radar detection apparatus is a radar, a signal obtained after a mixer performs processing on a local oscillator signal of the radar and a reflected signal (a signal obtained after a transmitted signal of the radar is reflected by a target object) received by the radar is an intermediate frequency signal. One part of a frequency modulated continuous wave signal generated by an oscillator is used as the local oscillator signal, and the other part of the frequency modulated continuous wave signal is used as the transmitted signal to be transmitted by using a transmit antenna. Frequency mixing is performed on the reflected signal that is of the transmitted signal and that is received by a receive antenna and the local oscillator signal to obtain the "intermediate frequency signal". One or more of location information, speed information, and angle information of the target object may be obtained by using the intermediate frequency signal. The location information may be location information of the target object relative to the current radar, the speed information may be speed information of the target object relative to the current radar, and the angle information may be angle information of the target object relative to the current radar. Further, a frequency of the intermediate frequency signal is referred to as an "intermediate frequency".

(10) A maximum propagation delay of a radar signal is determined based on an attribute or a parameter of a current radar, and the attribute or the parameter may include at least one of the following: transmit power of a radar signal of a detection apparatus (a detection apparatus used as an interference source) and sensitivity of a receiver of a detection apparatus (a current detection apparatus). Another radar signal is received by the current radar after a specific propagation delay. After the propagation delay, if power of an interfering signal is greater than the sensitivity of the receiver, the interfering signal causes interference to the current radar; or if power of an interfering signal is not greater than the sensitivity of the receiver, the interfering signal does not cause interference to the current radar, and the interfering signal is processed as noise. After the propagation delay, if the power of the interfering signal is equal to the sensitivity of the receiver, the propagation delay is referred to as the maximum propagation delay of the radar signal.

(11) "At least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B may be singular or plural. The character "/" generally indicates an "or" relationship between the associated objects. "At least one of the following" or a similar expression thereof means any combination of one or more of the items. For example, at least one of a, b, and c may represent a, b, c, "a and b", "a and c", "b and c", or "a, b, and c", where a, b, and c may be singular or plural.

In addition, unless otherwise stated, in the embodiments of this application, ordinal words such as "first" and "second" are used to distinguish between a plurality of objects, and are not used to limit a sequence, a time sequence, a priority, or an importance degree of the plurality of objects. For example, first information and second information are merely used to distinguish between different information, and are not used to indicate a difference in content, a priority, a sending sequence, an importance degree, or the like of the two types of information.

The foregoing describes some concepts in the embodiments of this application, and the following describes technical features of the embodiments of this application.

With the development of society, more machines in modern life develop towards automation and intelligence. Vehicles for mobile travel are not an exception, and intelligent vehicles are gradually entering the daily life of people. In recent years, advanced driving assistance systems (ADAS) plays a quite important role in intelligent vehicles. This system uses various sensors installed on the vehicles to sense a surrounding environment, collect data, identify, detect, and track a still or moving object, and perform a systematic operation and analysis with reference to navigation map data at any time in a driving process of the vehicle, so that a driver detects a possible danger in advance, thereby effectively improving driving comfort and safety of the vehicle. It can be considered that real self-driving is an ultimate product of development of the ADAS. In a self-driving architecture, a sensing layer is compared to "eyes" of vehicles, and includes visual sensors such as an in-vehicle camera and radar sensors such as an in-vehicle millimeter wave radar, an in-vehicle laser radar, and an in-vehicle ultrasonic radar. Because of low costs and a relatively mature technology, the millimeter wave radar is the first to become a main sensor of a self-driving system. At present, the ADAS has developed more than ten functions, where adaptive cruise, autonomous emergency braking, lane change assist, blind spot monitoring, and the like require detection data from the in-vehicle millimeter wave radar.

A millimeter wave is an electromagnetic wave whose wavelength is between 1 mm and 10 mm, and a corresponding frequency range is from 30 GHz to 300 GHz. In this frequency band, a millimeter wave-related feature enables the in-vehicle millimeter wave radar to be quite suitable for application to the vehicle field. Large bandwidth, rich frequency domain resources, and a low antenna side lobe help implement imaging or quasi-imaging; a wavelength is short, reducing a volume of a radar device and an antenna aperture, so that a weight is reduced; a beam is narrow, to be specific, the millimeter wave beam is much narrower than a microwave beam in a case of a same antenna size, so that radar resolution is high; penetration is strong, to be specific, the millimeter wave radar is more capable of penetrating smoke, dust, and fog than the laser radar and an optical system, and the millimeter wave radar can work 24/7.

An in-vehicle millimeter wave radar system generally includes apparatuses such as an oscillator, a transmit antenna, a receive antenna, a mixer, a processor, and a controller. FIG. 1 is a working principle diagram of a millimeter wave radar. The oscillator generates a radar signal whose frequency increases linearly with time. The radar signal is usually a frequency modulated continuous wave. One part of the radar signal is output to the mixer as a local oscillator signal by using a directional coupler, and the other part is transmitted by using the transmit antenna. The receive antenna receives a radar signal reflected back after the transmitted radar signal encounters an object in front of a vehicle. The mixer performs frequency mixing on the received radar signal and the local oscillator signal to obtain an intermediate frequency signal. The intermediate frequency signal includes information such as the distance, the speed, and the angle of the target object relative to the radar system. The intermediate frequency signal passes through a low-pass filter and is amplified and output to the processor. The processor processes the received signal. The processor usually performs fast Fourier transform, spectrum analysis, and the like on the received signal to obtain the information such as the distance, the speed, and the angle of the target object relative to the radar system. Finally, the processor may output the obtained information to the controller to control behavior of the vehicle.

A waveform of the frequency modulated continuous wave of the millimeter wave radar is usually a sawtooth wave or a triangular wave. The following describes in detail a ranging principle of the millimeter wave radar by using the sawtooth wave as an example. A ranging principle of the triangular wave is similar.

Figure 2:
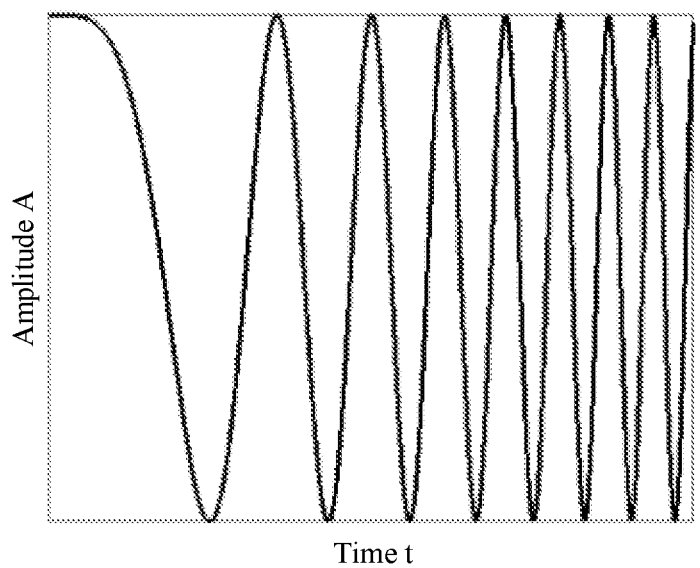
FIG. 2 is a schematic diagram of a frequency modulated continuous wave.
Figure 3:
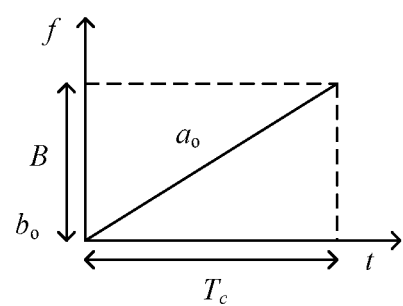
FIG. 3 is a schematic diagram in which a frequency of a frequency modulated continuous wave changes linearly with time.

As shown in FIG. 2, the linear frequency modulated continuous wave is a signal whose frequency changes linearly with time. As shown in FIG. 3, a period of the frequency modulated continuous wave is $T_c$, a slope is $a_0$, bandwidth is B, and a start frequency of the frequency modulated continuous wave is $b_0$. One frequency modulated continuous wave signal shown in FIG. 2 is also referred to as one linear frequency modulated pulse (chirp) signal.

An equivalent baseband signal of a single-period frequency modulated continuous wave output by the oscillator of the millimeter wave radar may be represented as follows:

$$S_{BB}^T(t) = A\exp\left\{j2\pi\left[\frac{a_0}{2}t^2 + b_0 t + \varphi_0\right]\right\}, \quad \text{(formula 1.1)}$$
$$0 \le t \le T_c$$

A represents amplitude of the equivalent baseband signal, $a_0$, represents a slope of the equivalent baseband signal, $b_0$ represents a y-intercept of the equivalent baseband signal, $\varphi_0$ represents an initial phase of the equivalent baseband signal, and exp represents an exponential function of e. Because a frequency is defined as a change rate of a phase relative to time, a frequency of the equivalent baseband signal is as follows:

$$f = \frac{d\left(\frac{a_0}{2}t^2 + b_0 t + \varphi_0\right)}{dt} = a_0 t + b_0, \quad \text{(formula 1.2)}$$
$$0 \le t \le T_c$$

An image of the formula 1.2 is shown in FIG. 3.

A signal obtained after the equivalent baseband signal transmitted by the oscillator is up-converted is radiated from the transmit antenna of the millimeter wave radar. The transmitted signal may be represented as follows:

$$S_{RF}^T(t) = A\exp\left\{j2\pi\left[\frac{a_0}{2}t^2 + b_0 t + \varphi_0\right]\right\}\exp(j2\pi f_c t) = \quad \text{(formula 1.3)}$$
$$A\exp\left\{j2\pi\left[\frac{a_0}{2}t^2 + (b_0 + f_c)t + \varphi_0\right]\right\},$$
$$0 \le t \le T_c$$

Figure 4:
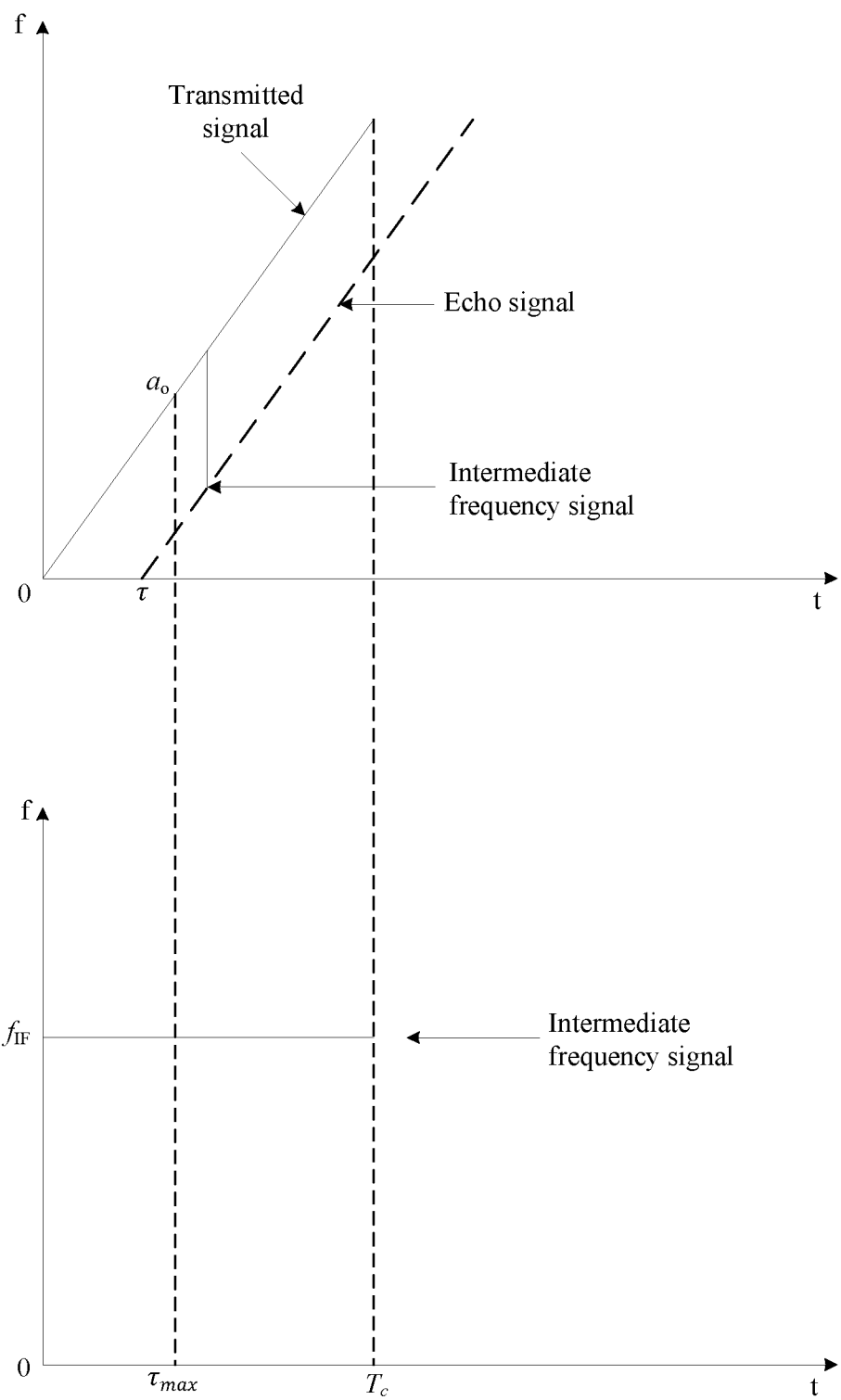
FIG. 4 is a schematic diagram of a possible frequency change of a transmitted signal, a reflected signal, and an intermediate frequency signal.

After the signal encounters an obstacle, a signal is reflected back and is received by the millimeter wave radar. A shape of a waveform of the transmitted signal is the same as that of the reflected signal, except that the waveform of the reflected signal has a delay $\tau$ relative to the waveform of the transmitted signal. Refer to FIG. 4. In FIG. 4, an echo signal is the reflected signal. The received reflected signal may be represented as follows:

$$S_{RF}^R(t - \tau) = \quad \text{(formula 1.4)}$$
$$A'\exp\left\{j2\pi\left[\frac{a_0}{2}(t-\tau)^2 + (b_0 + f_c)(t-\tau) + \varphi_0\right]\right\},$$
$$0 \le t \le T_c$$

A signal obtained after the received equivalent baseband signal is down-converted is as follows:

$$S_{BB}^R(t - \tau) = \quad \text{(formula 1.5)}$$
$$A'\exp\left\{j2\pi\left[\frac{a_0}{2}(t-\tau)^2 + b_0(t-\tau) - f_c\tau + \varphi_0\right]\right\},$$
$$0 \le t \le T_c$$

A' is amplitude of a signal obtained after a transmit antenna gain, target reflection, a propagation loss, and a receive antenna gain are considered for the equivalent baseband signal transmitted by the oscillator, $\tau$ is a delay from sending the radar signal by a transmitter of the millimeter wave radar to receiving the echo signal (namely, the reflected signal) by a receiver of the millimeter wave radar. As shown in FIG. 4, this delay is twice distance/speed of light. In addition, in FIG. 4, $\tau_{max}$ represents an echo delay corresponding to a maximum detection distance of the millimeter wave radar, that is, $\tau_{max}$ is a delay of the reflected signal received by the millimeter wave radar relative to the transmitted signal when a distance between the millimeter wave radar and the target object is a maximum distance that can be detected by the millimeter wave radar. A relationship between $\tau$ and a target distance d may be represented as follows:

$$\tau = \frac{2d}{c} \quad \text{(formula 1.6)}$$

Herein, c is the speed of light.

The mixer of the millimeter wave radar performs frequency mixing on the received signal and a local oscillator signal to obtain a signal, and an intermediate frequency signal is output after the signal passes through the low-pass filter. The intermediate frequency signal is represented as follows:

$$S_{IF}(t) = S_{BB}^T(t) \times [S_{BB}^R(t-\tau)]^* = \quad \text{(formula 1.7)}$$
$$AA'\exp(j2\pi f_c \tau) \cdot \exp\left[-j2\pi\left(\frac{a_0}{2}\tau^2 - b_0\tau\right)\right]$$
$$\exp[j2\pi(a_0\tau t)], \tau \le t \le T_c$$

The intermediate frequency signal is sent to the processor of the millimeter wave radar for processing such as fast Fourier transform, to obtain a frequency $f_{IF}$ of the intermediate frequency signal.

In addition, as shown in FIG. 4, the frequency of the intermediate frequency signal is a product of a slope of the waveform of the transmitted signal and the delay $\tau$, that is, $$f_{IF} = a_0 \cdot \tau = \frac{-B}{T_c} \cdot \frac{2d}{c} = \frac{2d}{c \cdot T_c} B \quad \text{(formula 1.8)}$$

Therefore, the distance d between the millimeter wave radar and the target object is as follows:

$$d = \frac{c \cdot T_c}{2B} f_{IF} \quad \text{(formula 1.9)}$$

It can be learned from the foregoing derivation process that there is a linear relationship between a frequency difference between the transmitted signal and the received signal (namely, the frequency of the intermediate frequency signal) and the delay: More distant the target object, the later the reflected signal is received, and the larger the frequency difference between the reflected signal and the transmitted signal is. Therefore, the distance between the radar and the target object may be determined by determining the frequency of the intermediate frequency signal. In addition, the foregoing processing process of the radar signal is merely an example, and a specific radar processing process is not limited.

With an increase of a penetration rate of in-vehicle radars, mutual interference between in-vehicle radars is becoming more serious, which greatly reduces a detection probability of the radar or improves a false alarm probability of detection of the radar, and therefore causes impact on driving safety or comfort that cannot be ignored.

Figure 5:
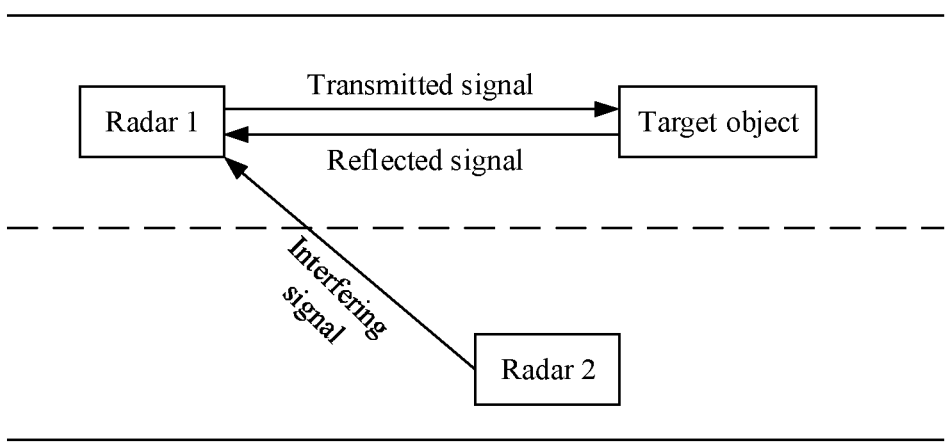
FIG. 5 is a schematic diagram of mutual interference between in-vehicle radars.

FIG. 5 is a schematic diagram of mutual interference between in-vehicle radars. A radar 1 sends a transmitted signal and receives a reflected signal that is of the transmitted signal and that is reflected by a target object. When the radar 1 receives the reflected signal, a receive antenna of the radar 1 also receives a transmitted signal or a reflected signal of a radar 2. Therefore, the transmitted signal or the reflected signal of the radar 2 that is received by the radar 1 is an interfering signal for the radar 1.

For example, it is assumed that the radar 1 be an observation radar, a slope of a frequency modulated continuous wave of the radar 1 is $a_0$, an intercept is $b_0$, and a period is $T_c$; the radar 2 is an interfering radar, a slope of a frequency modulated continuous wave of the radar 2 is $a_1$, and an intercept is $b_1$. In this case, it is assumed that $b_0=b_1$. An echo delay corresponding to a maximum ranging distance of the radar 1 is $\tau_{max}$ (that is, a delay calculated by substituting the maximum detection distance of the radar into the formula 1.6. For example, if the maximum detection distance of the radar is 250 m, the delay calculated by substituting the maximum detection distance into the formula 1.6 is 1.67 μs), and a delay of the interfering signal of the radar 2 arriving at a receiver of the radar 1 is $\tau_1$. It is considered that a timing error at a transmission moment of the radar is $\Delta\tau$ (for example, an error such as 60 ns of the transmission moment that is generated due to a timing error of a global positioning system (GPS)). A time range in which the radar detects the received signal is from $\tau_{max}$ to $T_c$.

Figure 6:
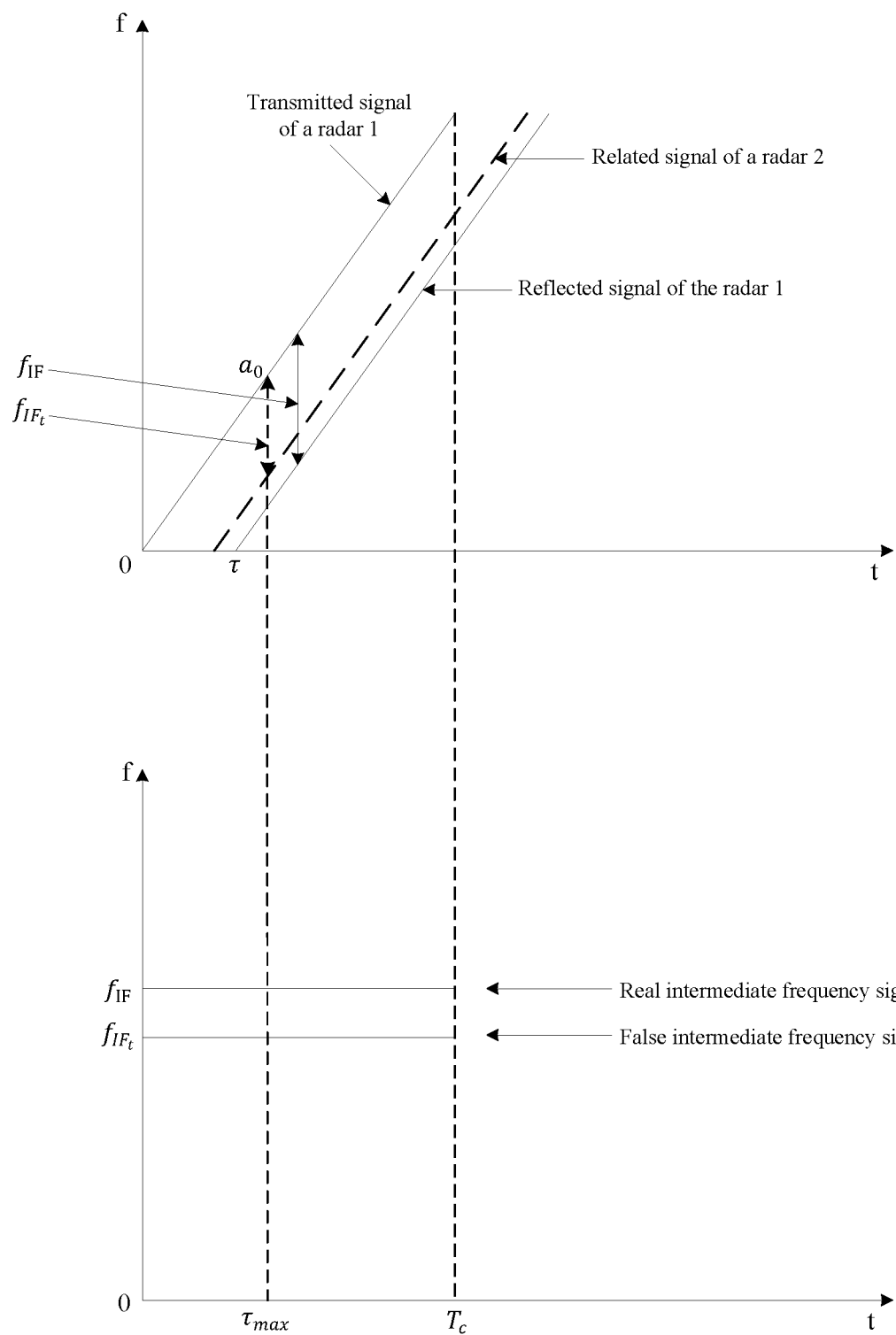
FIG. 6 and FIG. 7 are a schematic diagram of a possible false intermediate frequency signal.
Figure 7:
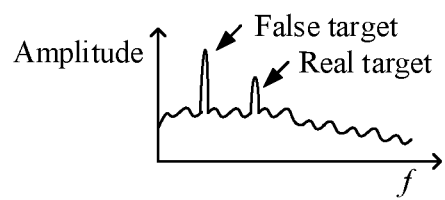

FIG. 6 and FIG. 7 are a schematic diagram of a possible false intermediate frequency signal. If a slope of a radar signal sent by the radar 1 is the same as a slope of a radar signal sent by the radar 2, that is, $a_0=a_1$, and operating frequency bands of the two radar signals overlap, a false alarm occurs. As shown in FIG. 6, the radar 1 transmits a signal to a target object and receives a reflected signal from the target object, but in a time range between transmitting the signal by the radar 1 and receiving the reflected signal by the radar 1, a receive antenna of the radar 1 receives a transmitted signal or a reflected signal (a dashed line) of the radar 2. A signal waveform of the radar 1 and a signal waveform of the radar 2 are consistent and have same frequency scanning bandwidth. In a target echo observation range of the radar 1, if the radar 1 receives a signal indicated by a dashed line of a corresponding frequency, the radar 1 considers that a "target object 1" exists. If the radar 1 detects the signal indicated by the dashed line and a reflected signal indicated by a solid line in a time range ($T_{max}$ to $T_c$) of signal processing, the radar 1 mistakenly considers the received signal indicated by the dashed line as a reflected signal of an object that exists in front of the radar 1. In this case, a false intermediate frequency signal is generated. The radar 1 may find two peaks through spectrum analysis after performing fast Fourier transform. As shown in FIG. 7, each peak corresponds to one target object. The radar 1 considers that both the "target object 1" and a "target object 2" exist. The radar 1 mistakenly considers that the "target object 1" exists ahead, but actually the "target object 1" does not exist. This is referred to as a "ghost" or a "false alarm". After a false alarm is generated, a self-driving vehicle slows down or brakes when there is no object ahead, which reduces driving comfort.

Figure 8:
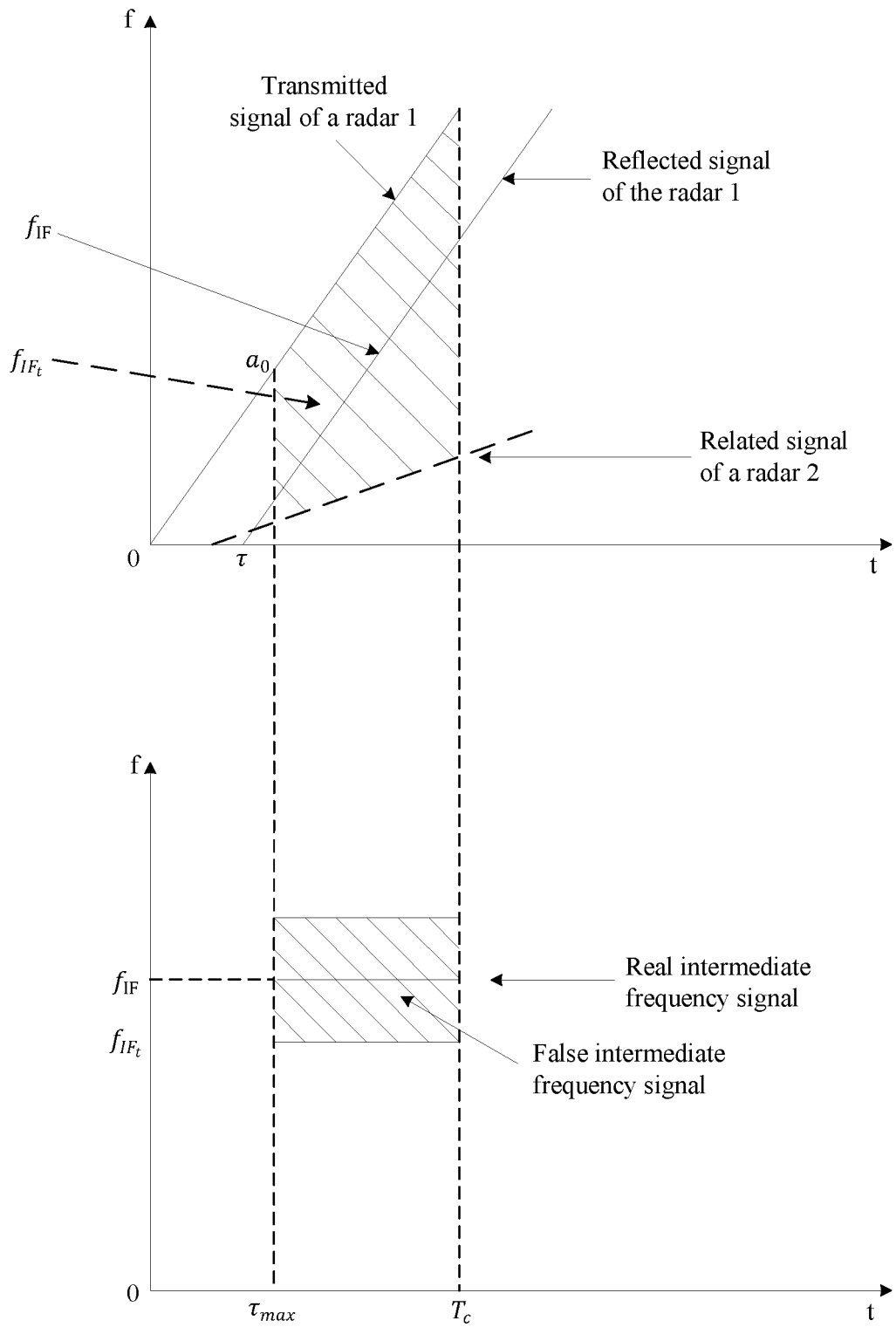
FIG. 8 and FIG. 9 are a schematic diagram in which a possible interfering signal drowns a target signal.
Figure 9:
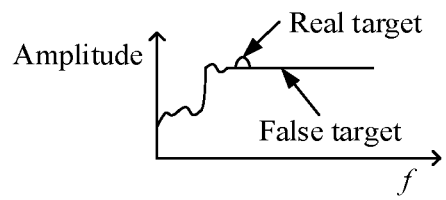

FIG. 8 and FIG. 9 are a schematic diagram in which a possible interfering signal drowns a target signal. As shown in FIG. 8, the radar 1 transmits a signal to a target object, and receives a reflected signal from the target object. However, in a target echo observation range of the radar 1, the receive antenna of the radar 1 receives a transmitted signal or a reflected signal (a dashed line) of the radar 2. A slope of a signal waveform of the radar 1 is different from that of a signal waveform of the radar 2. In a signal detection time range ($\tau_{max}$ to $T_c$), the radar 1 detects both a reflected signal of the radar 1 and a related signal of the radar 2. After frequency mixing is performed on the detected related signal of the radar 2 and the reflected signal of the radar 1, an intermediate frequency signal that includes various frequency components is generated. After fast Fourier transform is performed on the intermediate frequency signal, as shown in FIG. 9, an interference platform occurs. Consequently, a "protruding" degree of the real target object is not enough, which causes a difficulty to detection and improves a possibility of missed detection. After missed detection occurs, a self-driving vehicle mistakenly considers that there is no object and does not slow down or brake when there is an object ahead, causing a traffic accident and reducing driving safety of the vehicle.

Figure 10:
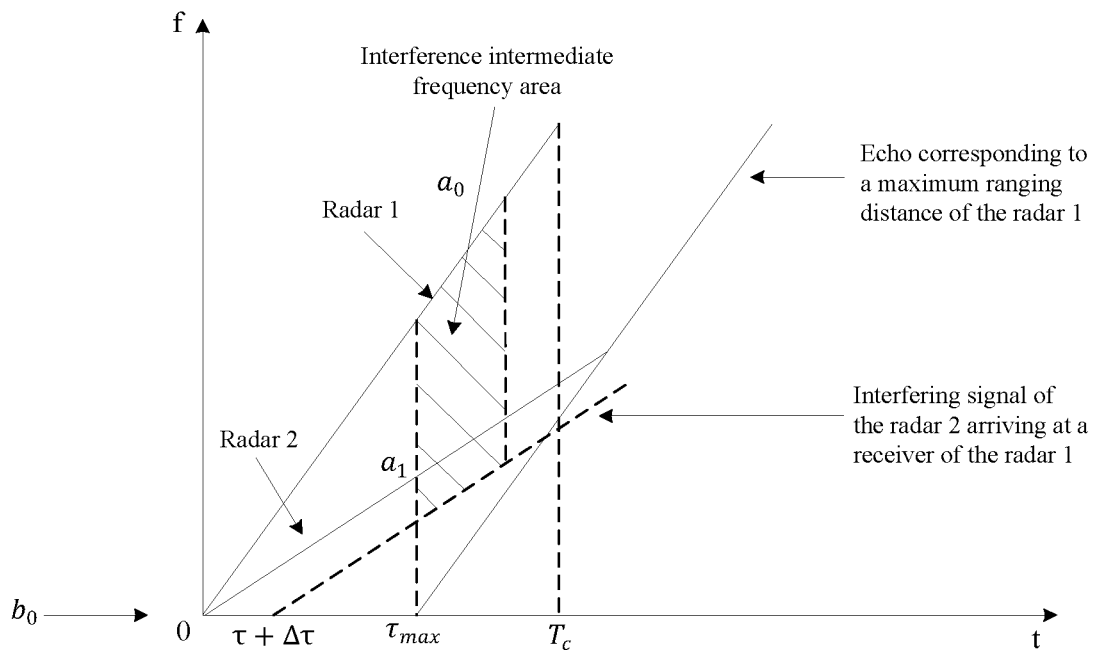
FIG. 10 is a schematic diagram of an interference platform.

The slope of the signal waveform of the radar 1 is different from that of the signal waveform of the radar 2. If the slope of the waveform of the radar 1 is $a_0$, and the slope of the waveform of the radar 2 is $a_1$, there may be the following two cases for a difference between the two slopes:

When $a_1<a_0$, as shown in FIG. 10, an interference platform problem occurs, causing a problem of missed detection.

Figure 11:
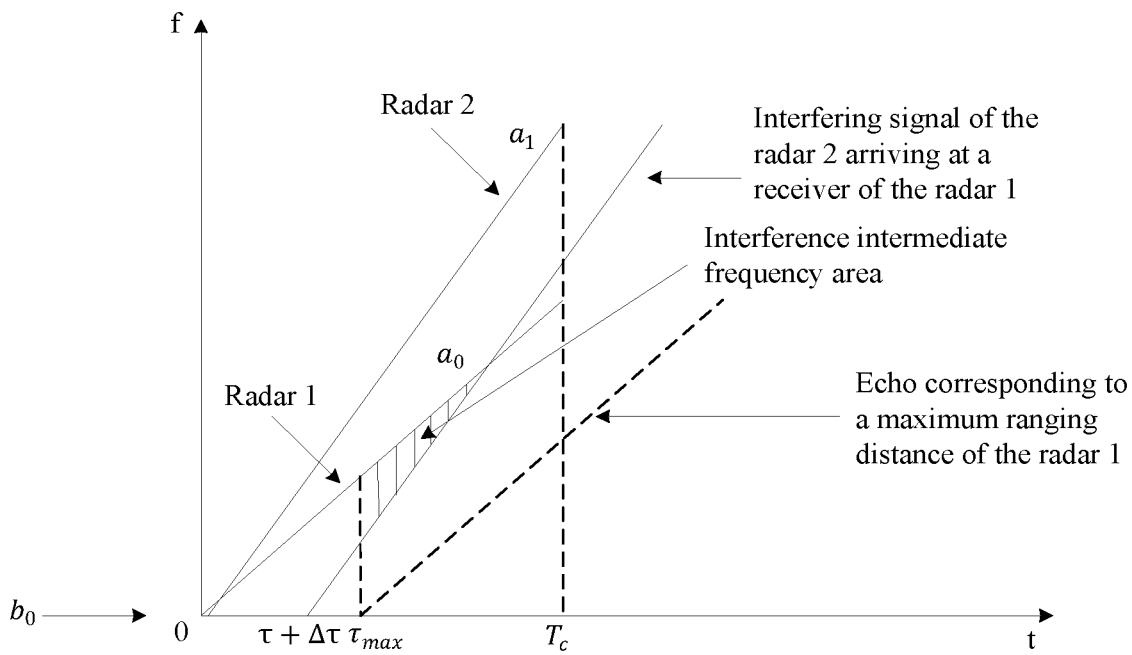
FIG. 11 is a schematic diagram of an interference platform.

When $a_1>a_0$, as shown in FIG. 11, an interference platform problem also occurs, causing a problem of missed detection.

A person skilled in the art can appreciate that a signal received at a moment or in a period of time may be an interfering signal, or may be a reflected signal of a target object, and a detection case of the radar can be clearly reflected by a related change case of a time and a frequency of a transmitted/reflected signal. Therefore, in subsequent descriptions of the embodiments of this application, a line chart that reflects a slope (a change range of a frequency in a unit time) of a transmitted/reflected signal is mostly used to represent a case of mutual interference between radars.

If a detection probability of the radar is reduced or a false alarm probability of detection of the radar is improved, impact that cannot be ignored is caused to driving safety or comfort. Therefore, how to reduce interference between in-vehicle radars is a problem that needs to be resolved.

Figure 12:
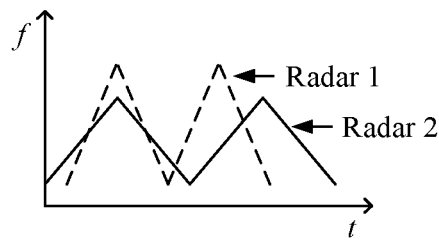
FIG. 12 is a schematic diagram of a possible solution.
Figure 13:
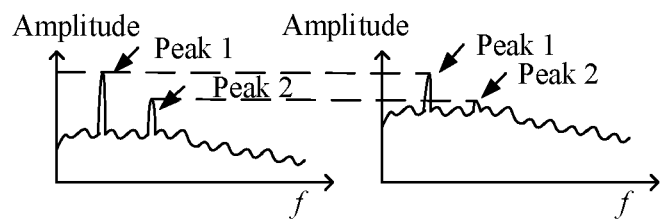
FIG. 13 is a schematic diagram of a possible false alarm result.

To resolve the foregoing problems, in a possible solution, different parameters such as waveform slopes and periods may be set for different radars. FIG. 12 is a schematic diagram of a possible solution. As shown in FIG. 12, parameters such as a waveform slope and a transmission period of a signal of the radar 1 are inconsistent with those of the radar 2. Therefore, even if the radar 1 receives a signal of the radar 2, because signal waveforms of the radar 1 and the radar 2 are inconsistent, when signals of the radar 1 and the radar 2 pass through the mixer, that is, a difference between frequencies of the signals is calculated, no intermediate frequency signal with a constant frequency is generated. The method can reduce a probability of occurrence of a ghost because only an intermediate frequency signal with a constant frequency is reflected as a peak signal in spectrum analysis. However, if the radar 1 receives a signal of the radar 2, and after the mixer is used, the interfering signal falls within effective received intermediate frequency bandwidth, strength of the interfering signal is increased. After the strength of the interfering signal is increased, an original target is drowned by the interference. Refer to FIG. 13. FIG. 13 is a schematic diagram of a possible missed detection result. A consequence is that an obstacle in front of a vehicle is not detected, and therefore missed detection occurs. This has adverse impact on driving safety of the vehicle, especially safety of a self-driving vehicle.

Figure 14:
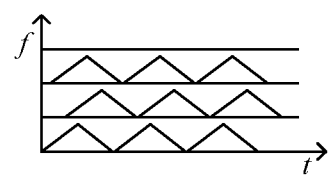
FIG. 14 is a schematic diagram of another possible solution.

FIG. 14 is a schematic diagram of another possible solution. A technology used in this solution is a radar waveform frequency shift technology. If a radar detects interference generated by another radar in a frequency scanning band of the radar, the radar uses another frequency band to prevent interference between a plurality of radars. A frequency shift (shift) interval in the frequency shift technology may be greater than the frequency scanning bandwidth of the radar. As shown in FIG. 14, frequencies of waveforms of all radars are totally separated, and do not overlap.

Figure 15:
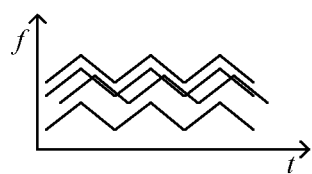
FIG. 15 is a schematic diagram of still another possible solution.

However, setting the frequency shift (shift) interval causes excessive frequency domain resources to be occupied, and frequency domain resources currently allocated to the in-vehicle radar are limited. Alternatively, a frequency shift (shift) technology is still applied, but a radar performs a random frequency shift after detecting interference generated by another radar in an operating frequency band, as shown in FIG. 15. FIG. 15 is a schematic diagram of still another possible solution. In this case, interference can be attenuated to some extent. However, the fully randomized frequency shift inevitably causes waveforms of two radars after the frequency shift to be excessively close in frequency domain, resulting in occurrence of a ghost or an increase in strength of an interfering signal, and resulting in missed detection of an object.

In view of this, the technical solutions of the embodiments of this application are provided. In the embodiments of this application, an absolute value of a difference between time domain start locations of any two of L time domain ranges may be greater than or equal to a first threshold and less than or equal to a second threshold. The first threshold is determined based on at least one echo delay and at least one propagation delay. For example, an absolute value of a difference between time domain start locations of any two time domain ranges needs to be greater than or equal to a largest value in the at least one echo delay and the at least one propagation delay.

Only one radar detection apparatus is allowed to perform sending in one time domain range. In this way, a radar signal sent by one radar detection apparatus does not fall within a target echo observation range of another radar detection apparatus, and a radar signal sent by another radar detection apparatus does not fall within a target echo observation range of the first radar detection apparatus. In this way, interference between radar detection apparatuses can be reduced.

Figure 16:
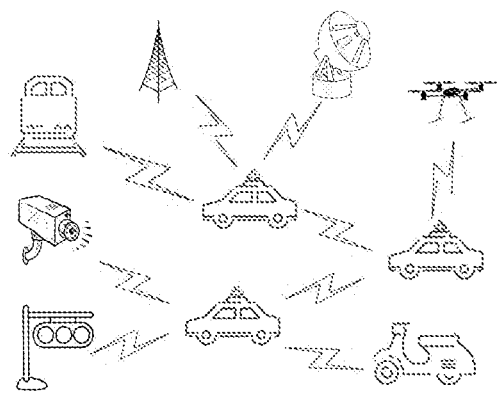
FIG. 16 is a schematic diagram of a possible application scenario of the embodiments of this application.

FIG. 16 is a schematic diagram of a possible application scenario of the embodiments of this application. The application scenario may be self-driving, autonomous driving, intelligent driving, connected driving, or the like. The radar detection apparatus may be installed in a motor vehicle (for example, a self-driving vehicle, an intelligent vehicle, an electric vehicle, or a digital vehicle), a drone, a rail car, a bicycle, a signal lamp, a speed measurement apparatus, a network device (for example, a base station or a terminal device in various systems), or the like. The embodiments of this applications are not only applicable to a radar detection apparatus between vehicles, but also applicable to a radar detection apparatus between a vehicle and another apparatus such as a drone, or a radar detection apparatus between other apparatuses. In addition, the radar detection apparatus may be installed on a mobile device, for example, installed on a vehicle as an in-vehicle radar detection apparatus, or may be installed on a fixed device, for example, installed on a device such as a road side unit (road side unit, RSU). An installment location, a function, and the like of the radar detection apparatus are not limited in the embodiments of this application.

The embodiments of this application may be performed by a detection apparatus. For example, the detection apparatus that performs the method provided in the embodiments of this application may be referred to as a first detection apparatus. For ease of description, in the following embodiments of this application, an example in which a detection apparatus is a radar detection apparatus and a radar detection apparatus is a radar such as a millimeter wave radar is mostly used for explanation and description of the embodiments. However, the detection apparatus in the embodiments of this application is not limited only to a radar detection apparatus, and the radar detection apparatus is not limited only to a millimeter wave radar or a radar. Further, in the embodiments of this application, a plurality of radar detection apparatuses sending radar signals in corresponding time domain ranges in the L time domain ranges may have a same frequency scanning period. For example, if a radar detection apparatus 1 sends a radar signal in the first time domain range in the plurality of time domain ranges, and a radar detection apparatus 2 sends a radar signal in the second time domain range in the plurality of time domain ranges, a frequency scanning period of the radar detection apparatus 1 is the same as a frequency scanning period of the radar detection apparatus 2.

In addition, a signal sent by the detection apparatus may be a radio signal. If an example in which the detection apparatus is a radar detection apparatus is used, it may be considered that the signal sent by the detection apparatus is a radar signal. In the embodiments of this application, an example in which the detection apparatus is a radar detection apparatus and the signal sent by the detection apparatus is a radar signal is used.

It should be noted that, in the L time domain ranges, a plurality of radar detection apparatuses transmit radar signals in corresponding time domain ranges. The time domain range may be continuous duration. The radar detection apparatus may send a radio signal in one or more frequency scanning periods in the continuous duration. In addition, the time domain range may also be referred to as a time domain unit, a time domain resource, a time unit, a time resource, duration, or the like. A specific name is not limited. A length of one time domain range may be equal to a transmission period (also referred to as a "frequency scanning period", "frequency scanning duration", or the like) of the radar detection apparatus. In other words, a time domain length of each of the L time domain ranges may be a frequency scanning period of the radar detection apparatus. Alternatively, a length of one time domain range may be equal to an integer multiple of a frequency scanning period of the radar detection apparatus. For example, if duration of a time domain range is 500 frequency scanning periods, a corresponding radar detection apparatus needs to transmit a radar signal in 500 frequency scanning periods in this time domain range. In some scenarios, time domain lengths of the L time domain ranges are the same. In other scenarios, time domain lengths of the L time domain ranges may be not all the same.

In addition, it should be noted that, in a possible case, the radar detection apparatus transmits a radar signal at specific transmission timing. However, because of a possible difference in an actual communication scenario, environment, or hardware device, an actual sending moment of the radar signal may have an error, which may also be referred to as a signal transmission error, for example, an error caused by precision of a GPS. In another possible case, in a manufacturing process, different radar detection apparatuses may have slight errors in signal transmission due to differences in manufacturing. In another case, there may also be an error caused by another reason. All the foregoing possible errors may be considered in the method provided in the embodiments of this application in specific implementation. Alternatively, in the embodiments of this application, these errors may be ignored, and the solutions are described based on a uniform standard and uniform transmission timing. It should be noted that when the technical solutions are described in the embodiments of this application, implementation and beneficial effects of the embodiments of this application are not substantially affected regardless of whether the errors are considered or ignored.

The technical solutions provided in the embodiments of this application are described below with reference to the accompanying drawings.

Figure 17A:
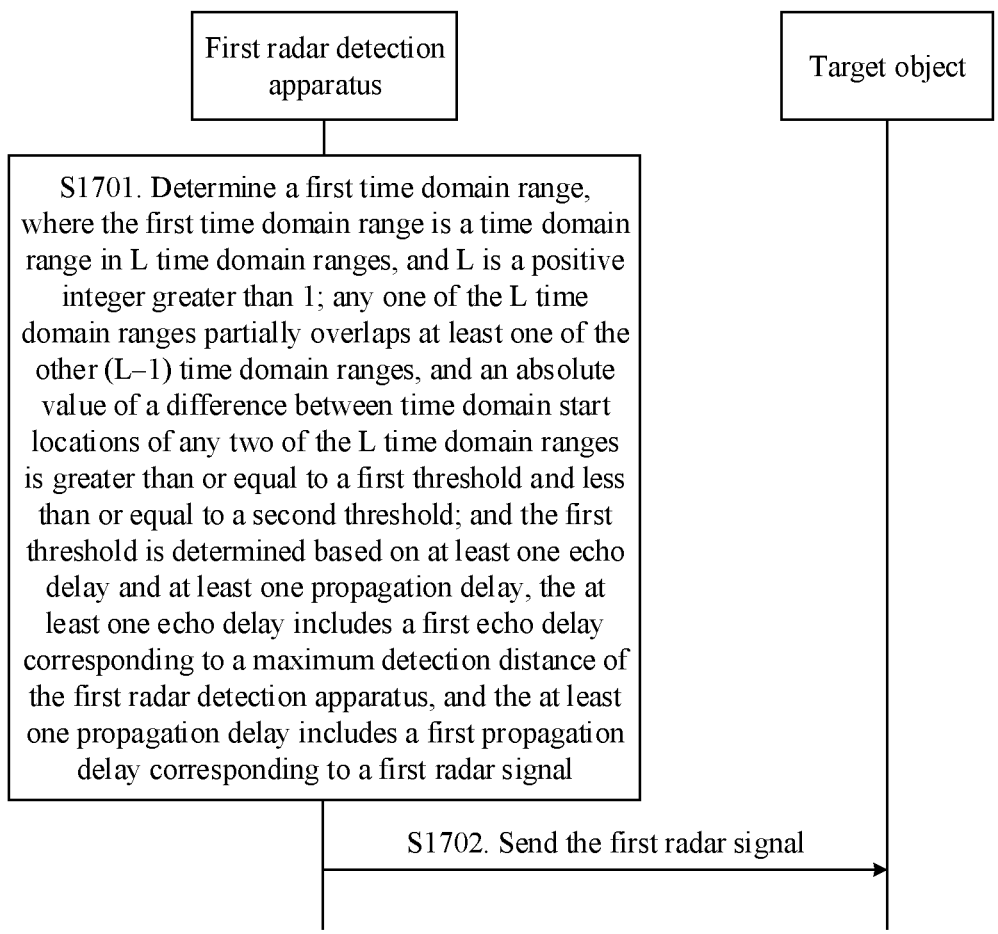
FIG. 17A is a flowchart of a radar signal sending method according to an embodiment of this application.

An embodiment of this application provides a radar signal sending method. FIG. 17A is a flowchart of the method. In the following description process, an example in which the method is applied to a network architecture shown in FIG. 16 is used. The method provided in the embodiment shown in FIG. 17A may be performed by a radar detection apparatus in the network architecture shown in FIG. 16. For example, the radar detection apparatus is referred to as a first radar detection apparatus. In addition, in the following description process, signals sent by radar detection apparatuses may all be radar signals, and naturally, received echo signals may also be radar signals.

S1701. The first radar detection apparatus determines a first time domain range.

The first time domain range is a time domain range in L time domain ranges, and L is a positive integer greater than 1.

Any one of the L time domain ranges partially overlaps at least one of the other (L−1) time domain ranges, and an absolute value of a difference between time domain start locations of any two of the L time domain ranges is greater than or equal to a first threshold and less than or equal to a second threshold. The first threshold is determined based on at least one echo delay and at least one propagation delay, the at least one echo delay includes an echo delay (for example, referred to as a "first echo delay") corresponding to a maximum detection distance of the first radar detection apparatus, and the at least one propagation delay includes a propagation delay (for example, referred to as a "first propagation delay") corresponding to a first radar signal sent by the first radar detection apparatus. "L" herein may be predefined or preconfigured, or may be determined according to a preset rule. For example, for one radar detection apparatus, "L" may be embodied as L candidate time domain grids in one frequency scanning period, and each time domain grid and specific duration form one time domain range. The time domain grid may be a start location or an end location of the time domain range, an intermediate location of the time-domain range, or the like. This is not specifically limited herein. Because the radar detection apparatus works in specific duration, the solutions are described and explained by using the "time domain range" in this application. Technically, the time domain range may be defined by using a time domain grid and duration. S1701 may be replaced with "S1701. A first radar detection apparatus determines a first time domain grid". The first detection apparatus determines the first time domain range based on the first time domain grid. Further, the first time domain grid is one of L time domain grids.

In this embodiment of this application, the L time domain ranges may be referred to as one time domain range set. Certainly, the L time domain ranges and each of the L time domain ranges may also be defined as other names. Regardless of names of the L time domain ranges and each of the L time domain ranges, the L time domain ranges refer to a time length of a relatively coarse granularity, and each time domain range refers to a time length of a relatively fine granularity.

Any one of the L time domain ranges partially overlaps (or, in other words, not fully overlaps) at least one of the other (L−1) time domain ranges. That two time domain ranges fully overlap means that the two time domain ranges are totally the same. For example, time domain start locations of the two time domain ranges are the same and time domain end locations are the same. Alternatively, that two time domain ranges fully overlap means that one of the two time domain ranges is all included in the other time domain range. That two time domain ranges do not fully overlap means that the two time domain ranges have an intersection set, but the two time domain ranges are not totally the same. For example, time domain start location of the two time domain ranges are the same, and time domain end locations are different, or time domain start locations of the two time domain ranges are different, and time domain end locations are the same, or time domain start locations of the two time domain ranges are different, and time domain end locations are different. Through this design, a fully time-divided resource design can be avoided, and time domain resources can be reduced. In addition, distribution density of radar detection apparatuses in time domain can be appropriately adjusted, so that as many radar detection apparatuses as possible transmit radar signals in a specific time domain length while high-performance communication is ensured.

In the design manner in which a plurality of time domain ranges partially overlap, a time domain resource waste caused by totally separating frequency scanning periods of the plurality of radar detection apparatuses in time domain can be avoided, time domain resources can be effectively used, relatively high anti-interference performance can be implemented at relatively low time domain resource costs, and communication of more radar detection apparatuses can be supported.

Further, for the case in which an absolute value of a difference between time domain start locations of any two of the L time domain ranges is greater than or equal to the first threshold and less than or equal to the second threshold, there may be the following cases.

For example, time domain start locations of the L time domain ranges are equally spaced in time domain. In this example, an absolute value of a difference between time domain start locations of any two time domain ranges that are "adjacent" in time domain in the L time domain ranges is equal to, for example, F, and in this case, an absolute value of a difference between time domain start locations of any two time domain ranges that are "not adjacent" in time domain may be equal to X times of F, where X is a positive integer greater than 1.

For another example, time domain start locations of the L time domain ranges are not equally spaced in time domain. In this example, if an absolute value of a difference between time domain start locations is the smallest for two of the L time domain ranges, it is assumed that the absolute value of the difference between the time domain start locations of the two time domain ranges is equal to F. An absolute value of a difference between time domain start locations of any two time domain ranges other than the two of the L time domain ranges may be greater than F.

Figure 17B:
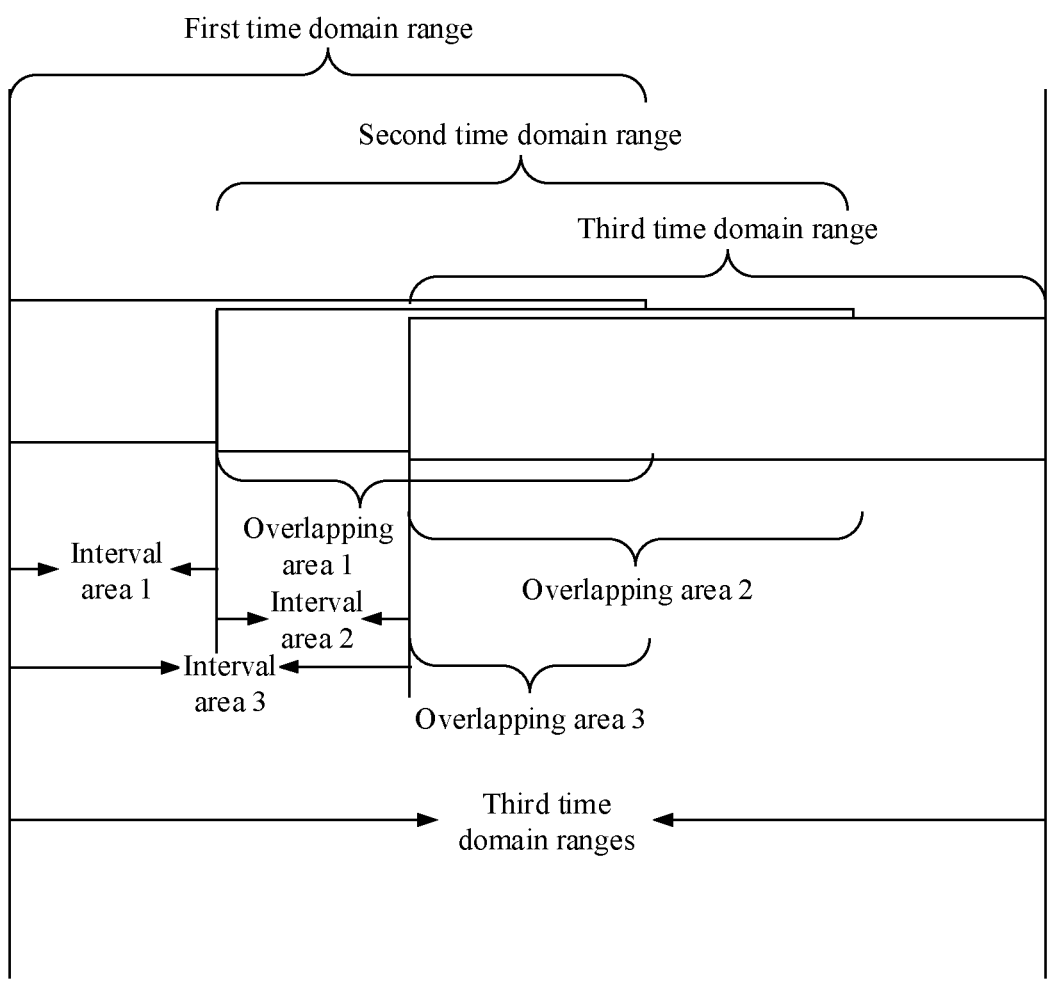
FIG. 17B is a schematic diagram of a relationship between three time domain ranges according to an embodiment of this application.

The following provides descriptions by using an example with reference to FIG. 17B.

FIG. 17B shows an optional case when L is equal to 3. When L is equal to 3, the three time domain ranges may be referred to as the first time domain range, the second time domain range, and the third time domain range. Any one of the three time domain ranges partially overlaps with the other two time domain ranges. In FIG. 17B, an overlapping area between the first time domain range and the second time domain range is marked as an overlapping area 1, an overlapping area between the first time domain range and the third time domain range is marked as an overlapping area 3, and an overlapping area between the second time domain range and the third time domain range is marked as an overlapping area 2. In FIG. 17B, an absolute value of a difference between time domain start locations of any two of the three time domain ranges is greater than or equal to the first threshold and less than or equal to the second threshold. An absolute value of a difference between a time domain start location of the first time domain range and a start location of the second time domain range is a length of an interval area 1, an absolute value of a difference between the time domain start location of the second time domain range and a start location of the third time domain range is a length of an interval area 2, and an absolute value of a difference between the time domain start location of the third time domain range and the start location of the first time domain range is a length of an interval area 3. In this embodiment of this application, the length of the interval area 1, the length of the interval area 2, and the length of the interval area 3 are all greater than or equal to the first threshold and less than or equal to the second threshold.

It should be noted that if the L time domain ranges include the first time domain range, the second time domain range, and the third time domain range in ascending order of time domains, an absolute value of a difference between time domain start locations of the first time domain range and the second time domain range is referred to as a first absolute value, and an absolute value of a difference between time domain start locations of the second time domain range and the third time domain range is referred to as a second absolute value, the first absolute value may be equal to the second absolute value, or may not be equal to the second absolute value. However, both the first absolute value and the second absolute value are greater than or equal to the first threshold and less than or equal to the second threshold.

The first radar detection apparatus may be a radar detection apparatus that needs to send a radar signal. Therefore, the first radar detection apparatus may select the first time domain range from the L time domain ranges to send a radar signal. For example, a second radar detection apparatus may also be a radar detection apparatus that needs to send a radar signal. For example, the second radar detection apparatus may also select a corresponding time domain range from the L time domain ranges to send a radar signal. There should be a one-to-one correspondence between time domain ranges and radar detection apparatuses. In other words, the second radar detection apparatus may select a second time domain range from the L time domain ranges to send a radar signal, and the second time domain range and the first time domain range are different time domain ranges. However, there is another possibility that when the second radar detection apparatus needs to select a time domain range, the L time domain ranges may all be occupied, and in this case, the second radar detection apparatus may select, for sending, a time domain range from the L time domain ranges that have been occupied.

In addition, types of the first radar detection apparatus and the second radar detection apparatus may be different, or may be the same. For example, there are a total of N types of radar detection apparatuses, the first radar detection apparatus belongs to a first type of radar detection apparatus in the N types of radar detection apparatuses, and the second radar detection apparatus belongs to a second type of radar detection apparatus in the N types of radar detection apparatuses. The radar detection apparatus may have a plurality of parameters. For example, one parameter is an echo delay corresponding to a maximum detection distance of the radar detection apparatus, and the other parameter is a propagation delay of a radar signal sent by the radar detection apparatus. For two radar detection apparatuses, provided that values of at least one of the two parameters are different, it indicates that types of the two radar detection apparatuses are different. For example, if the echo delay corresponding to the maximum detection distance of the first radar detection apparatus and an echo delay corresponding to a maximum detection distance of the second radar detection apparatus are different, it indicates that the types of the first radar detection apparatus and the second radar detection apparatus are different; or if the propagation delay of the radar signal sent by the first radar detection apparatus is different from a propagation delay of a radar signal sent by the second radar detection apparatus, it indicates that the types of the first radar detection apparatus and the second radar detection apparatus are different; or if the echo delay corresponding to the maximum detection distance of the first radar detection apparatus and an echo delay corresponding to a maximum detection distance of the second radar detection apparatus are different, and the propagation delay of the radar signal sent by the first radar detection apparatus and a propagation delay of a radar signal sent by the second radar detection apparatus are different, it indicates that the types of the first radar detection apparatus and the second radar detection apparatus are different; or if the echo delay corresponding to the maximum detection distance of the first radar detection apparatus and an echo delay corresponding to a maximum detection distance of the second radar detection apparatus are the same, and the propagation delay of the radar signal sent by the first radar detection apparatus and a propagation delay of a radar signal sent by the second radar detection apparatus are the same, it indicates that the types of the first radar detection apparatus and the second radar detection apparatus are the same.

In addition to the first echo delay, the at least one echo delay may include an echo delay of another radar detection apparatus. It may be understood that the at least one echo delay may correspond to at least one radar detection apparatus. For example, the echo delay corresponding to the maximum detection distance of the second radar detection apparatus may be referred to as a second echo delay, and the second echo delay may be included in the at least one echo delay. The second echo delay may be equal to the first echo delay, or may not be equal to the first echo delay. If the second echo delay is not equal to the first echo delay, it indicates that the types of the second radar detection apparatus and the first radar detection apparatus are different. In this case, the propagation delay of the radar signal (for example, referred to as a "second radar signal") sent by the second radar detection apparatus may be equal to the first propagation delay, or may not be equal to the first propagation delay, and this is not limited.

In addition to the first propagation delay, the at least one propagation delay may include a propagation delay of a radar signal corresponding to (or a radar signal sent by) another radar detection apparatus. It may be understood that the at least one propagation delay may correspond to at least one radar detection apparatus. For example, a propagation delay of a radar signal (for example, referred to as a third radar signal) sent by a third radar detection apparatus is referred to as a second propagation delay, and the second propagation delay may be included in the at least one propagation delay. The second propagation delay may be equal to the first propagation delay, or may not be equal to the first propagation delay. If the second propagation delay is not equal to the first propagation delay, it indicates that types of the third radar detection apparatus and the first radar detection apparatus are different. In this case, an echo delay of the third radar signal sent by the third radar detection apparatus may be equal to the first echo delay, or may not be equal to the first echo delay, and this is not limited.

The second radar detection apparatus and the third radar detection apparatus may be a same radar detection apparatus, or may be different radar detection apparatuses.

The echo delay corresponding to the radar detection apparatus refers to a time difference between a moment at which the radar detection apparatus sends a radar signal when the radar detection apparatus performs detection and a moment at which a reflected signal obtained after the sent radar signal reaches a target object and is reflected is received by the radar detection apparatus. If a distance between a detected target object and the radar detection apparatus is the maximum detection distance supported by the radar detection apparatus, the echo delay corresponding to the maximum detection distance of the radar detection apparatus refers to a time difference between a moment at which the radar detection apparatus sends a radar signal when the radar detection apparatus performs detection and a moment at which a reflected signal obtained after the sent radar signal reaches the target object and is reflected is received by the radar detection apparatus.

The first threshold may be determined based on the at least one echo delay and the at least one propagation delay. For example, if a plurality of first sub-thresholds may be determined based on the at least one echo delay and the at least one propagation delay, a largest value in the plurality of first sub-thresholds may be used as the first threshold. In addition, the second threshold may also be determined based on the at least one echo delay and the at least one propagation delay. For example, if a plurality of second sub-thresholds may be determined based on the at least one echo delay and the at least one propagation delay, a smallest value in the plurality of second sub-thresholds may be used as the second threshold. It should be noted herein that the plurality of first sub-thresholds and the plurality of second sub-thresholds are determined based on the at least one echo delay and the at least one propagation delay, and specific determining manners may be different.

For example, if a total of N radar detection apparatuses are included, the first sub-threshold may be calculated based on every two radar detection apparatuses, that is, one first sub-threshold may be calculated for every two radar detection apparatuses, and a largest value in a plurality of calculated first sub-thresholds is selected as the first threshold. For example, if a total of $C_N^2$ first sub-thresholds may be determined based on the N radar detection apparatuses, and each of the $C_N^2$ first sub-thresholds is determined based on echo delays corresponding to maximum detection distances of two of the N radar detection apparatuses and propagation delays of radar signals sent by the two radar detection apparatuses, the first threshold may be a largest value in the $C_N^2$ first sub-thresholds.

In addition, the second sub-threshold may be calculated based on every two radar detection apparatuses, that is, one second sub-threshold may be calculated for every two radar detection apparatuses, and a smallest value in a plurality of calculated second sub-thresholds is selected as the second threshold. For example, if a total of $C_N^2$ second sub-thresholds may be determined based on the N radar detection apparatuses, and each of the $C_N^2$ second sub-threshold is determined based on echo delays corresponding to maximum detection distances of two of the N radar detection apparatuses and propagation delays of radar signals sent by the two radar detection apparatuses, the second threshold may be a smallest value in the $C_N^2$ second sub-thresholds.

All the N radar detection apparatuses may be radar detection apparatuses that need to send radar signals, or may be radar detection apparatuses that need to select time domain ranges from the plurality of time domain ranges to send radar signals, or some of the N radar detection apparatuses may not need to select time domain ranges from the plurality of time domain ranges. What are exactly included in the N radar detection apparatuses are not limited in this embodiment of this application.

In the foregoing manner, the first sub-threshold or the second sub-threshold can be calculated based on two different radar detection apparatuses regardless of types of the radar detection apparatuses, and the types of the two radar detection apparatuses may be different, or may be the same.

Alternatively, in another manner, different types of radar detection apparatuses may be distinguished from each other, and the first sub-threshold or the second sub-threshold may be calculated based on different types of radar detection apparatuses, or the first sub-threshold or the second sub-threshold may be calculated based on a same type of radar detection apparatus.

For example, if a total of N types of radar detection apparatuses are included, the first sub-threshold may be calculated based on every two types of radar detection apparatuses, that is, one first sub-threshold may be calculated for every two types of radar detection apparatuses, and a largest value in a plurality of calculated first sub-thresholds is selected as the first threshold. Alternatively, the first sub-threshold may be calculated based on each type of radar detection apparatus, that is, one first sub-threshold may be calculated for each type of radar detection apparatus, and a largest value in a plurality of calculated first sub-thresholds is selected as the first threshold. For example, if a total of $(C_N^1)^2-C_N^2$ first sub-thresholds may be determined based on the N types of radar detection apparatuses, and one of the $(C_N^1)^2-C_N^2$ first sub-thresholds is determined based on echo delays corresponding to maximum detection distances of two of the N types of radar detection apparatuses and propagation delays of radar signals sent by the two types of radar detection apparatuses, or is determined based on an echo delay corresponding to a maximum detection distance of one of the N types of radar detection apparatuses and a propagation delay of a radar signal sent by this type of radar detection apparatus, the first threshold may be a largest value in the $(C_N^1)^2-C_N^2$ first sub-thresholds.

In addition, the second sub-threshold may be calculated based on every two types of radar detection apparatuses, that is, one second sub-threshold may be calculated for every two types of radar detection apparatuses, and a smallest value in a plurality of calculated second sub-thresholds is selected as the second threshold. Alternatively, the second sub-threshold may be calculated based on each type of radar detection apparatus, that is, one second sub-threshold may be calculated for each type of radar detection apparatus, and a smallest value in a plurality of calculated second sub-thresholds is selected as the second threshold. For example, if a total of $(C_N^1)^2-C_N^2$ second sub-thresholds may be determined based on the N types of radar detection apparatuses, and each of the $(C_N^1)^2-C_N^2$ second sub-thresholds is determined based on echo delays corresponding to maximum detection distances of two of the N types of radar detection apparatuses and propagation delays of radar signals sent by the two types of radar detection apparatuses, or is determined based on an echo delay corresponding to a maximum detection distance of one of the N types of radar detection apparatuses and a propagation delay of a radar signal sent by this type of radar detection apparatus, the second threshold may be a smallest value in the $(C_N^1)^2-C_N^2$ second sub-thresholds.

Alternatively, in another manner, different types of radar detection apparatuses may be distinguished from each other, the first sub-threshold or the second sub-threshold may be calculated only based on different types of radar detection apparatuses, and if types of two radar detection apparatuses are the same, the first sub-threshold or the second sub-threshold is not calculated based on the two radar detection apparatuses.

For example, if a total of N types of radar detection apparatuses are included, the first sub-threshold may be calculated based on every two types of radar detection apparatuses, that is, one first sub-threshold may be calculated for every two types of radar detection apparatuses, and a largest value in a plurality of calculated first sub-thresholds is selected as the first threshold. For example, if a total of $C_N^2$ first sub-thresholds may be determined based on the N types of radar detection apparatuses, and each of the $C_N^2$ first sub-thresholds is determined based on echo delays corresponding to maximum detection distances of two of the N types of radar detection apparatuses and propagation delays of radar signals sent by the two types of radar detection apparatuses, the first threshold may be a largest value in the $C_N^2$ first sub-thresholds.

In addition, the second sub-threshold may be calculated based on every two types of radar detection apparatuses, that is, one second sub-threshold may be calculated for every two types of radar detection apparatuses, and a smallest value in a plurality of calculated second sub-thresholds is selected as the second threshold. For example, if a total of $C_N^2$ second sub-thresholds may be determined based on the N types of radar detection apparatuses, and each of the $C_N^2$ second sub-thresholds is determined based on echo delays corresponding to maximum detection distances of two of the N types of radar detection apparatuses and propagation delays of radar signals sent by the two types of radar detection apparatuses, the second threshold may be a smallest value in the $C_N^2$ second sub-thresholds.

When calculation is performed based on one type of radar detection apparatus, calculation needs to be performed only based on any one of the type of radar detection apparatus. All the N types of radar detection apparatuses may be radar detection apparatuses that need to send radar signals, or may be radar detection apparatuses that need to select time domain ranges from the plurality of time domain ranges to send radar signals, or some of the N types of radar detection apparatuses may not need to select time domain ranges from the plurality of time domain ranges. For example, the N types of radar detection apparatuses may include all types of current radar detection apparatuses in the market. What are exactly included in the N types of radar detection apparatuses are not limited in this embodiment of this application.

In this embodiment of this application, the first threshold (or the first sub-threshold) or the second threshold (or the second sub-threshold) may be determined by using different methods. In the following description process, an example in which the first threshold is calculated based on a fourth radar detection apparatus and a fifth radar detection apparatus is used. In other words, the first threshold is the largest value in the plurality of first sub-threshold, and the finally selected largest value is calculated, for example, based on the fourth radar detection apparatus and the fifth radar detection apparatus. The fourth radar detection apparatus or the fifth radar detection apparatus is, for example, the first radar detection apparatus, or neither the fourth radar detection apparatus nor the fifth radar detection apparatus is the first radar detection apparatus. However, because the first threshold is the largest value in the plurality of first sub-thresholds, parameters (for example, the first echo delay and the first propagation delay) of the first radar detection apparatus are also involved in a calculation process of some of the plurality of first sub-thresholds, even if neither the fourth radar detection apparatus nor the fifth radar detection apparatus is the first radar detection apparatus, it may still be considered that the first threshold is determined based on the at least one echo delay and the at least one propagation delay, the at least one echo delay includes the first echo delay, and the at least one propagation delay includes the first propagation delay.

In addition, determining the first sub-threshold or the second sub-threshold is also related to a location of the radar detection apparatus. For example, the radar detection apparatus is a movable radar detection apparatus, for example, an in-vehicle radar detection apparatus (for example, an in-vehicle radar), or the radar detection apparatus is a radar detection apparatus at a fixed location (for example, a radar detection apparatus disposed on an RSU). In both cases, the determined first sub-threshold or the determined second sub-threshold may be different. The following separately provides descriptions. In the following description process, an example in which the fourth radar detection apparatus and the fifth radar detection apparatus are involved in calculation is used as an example. In other words, the following description process may be considered as determining the first threshold and the second threshold, or may be considered as determining the first sub-threshold and the second sub-threshold.

1. The radar detection apparatus is a movable radar detection apparatus such as an in-vehicle radar.

In this case, one first sub-threshold may be determined based on an echo delay corresponding to a maximum detection distance of the fourth radar detection apparatus, an echo delay corresponding to a maximum detection distance of the fifth radar detection apparatus, a maximum propagation delay of a radar signal sent by the fourth radar detection apparatus (or a maximum propagation delay of a transmitted signal of the fourth radar detection apparatus), and a maximum propagation delay of a radar signal sent by the fifth radar detection apparatus (or a maximum propagation delay of a transmitted signal of the fifth radar detection apparatus). Alternatively, one second sub-threshold may be determined based on an echo delay corresponding to a maximum detection distance of the fourth radar detection apparatus, an echo delay corresponding to a maximum detection distance of the fifth radar detection apparatus, a maximum propagation delay of a radar signal sent by the fourth radar detection apparatus (or a maximum propagation delay of a transmitted signal of the fourth radar detection apparatus), and a maximum propagation delay of a radar signal sent by the fifth radar detection apparatus (or a maximum propagation delay of a transmitted signal of the fifth radar detection apparatus).

For example, the final first threshold is a first sub-threshold determined based on the fourth radar detection apparatus and the fifth radar detection apparatus, and the final second threshold is a second sub-threshold determined based on a sixth radar detection apparatus and a seventh radar detection apparatus. In other words, the second threshold is a second sub-threshold determined based on an echo delay corresponding to a maximum detection distance of the sixth radar detection apparatus, an echo delay corresponding to a maximum detection distance of the seventh radar detection apparatus, a maximum propagation delay of a radar signal sent by the sixth radar detection apparatus, and a maximum propagation delay of a radar signal sent by the seventh radar detection apparatus. The fourth radar detection apparatus and the sixth radar detection apparatus may be a same detection apparatus, or may be different detection apparatuses, and the fifth radar detection apparatus and the seventh radar detection apparatus may be a same detection apparatus, or may be different detection apparatuses.

Next, how to obtain the first sub-threshold and the second sub-threshold is described by using calculation based on the fourth radar detection apparatus and the fifth radar detection apparatus as an example. It should be noted that if calculation is performed based on other radar detection apparatuses, for example, calculation is performed based on the sixth radar detection apparatus and the seventh radar detection apparatus, a calculation process is also similar to the following process. The following describes the solutions by using an example in which the first threshold is a first sub-threshold obtained based on the fourth radar detection apparatus and the fifth radar detection apparatus and the second threshold is a second sub-threshold obtained based on the fourth radar detection apparatus and the fifth radar detection apparatus.

The maximum propagation delay of the radar signal is determined based on an attribute or a parameter of a current radar detection apparatus. Another radar signal is received by the current radar detection apparatus after a specific propagation delay. After the propagation delay, if power of the interfering signal is greater than sensitivity of a receiver of the current radar detection apparatus, the interfering signal causes interference to the current radar detection apparatus; or if power of the interfering signal is not greater than sensitivity of a receiver of the current radar detection apparatus, the interfering signal does not cause interference to the current radar detection apparatus, and the interfering signal is processed as noise. Therefore, after the propagation delay, if the power of the interfering signal is equal to the sensitivity of the receiver of the current radar detection apparatus, a distance between a radar detection apparatus transmitting the interfering signal and the current radar detection apparatus is referred to as a maximum tolerable interference distance, and the propagation delay is referred to as a maximum propagation delay.

The echo delay corresponding to the maximum detection distance of the fourth radar detection apparatus and the echo delay corresponding to the maximum detection distance of the fifth radar detection apparatus may be the same or different, and the maximum propagation delay of the radar signal sent by the fourth radar detection apparatus and the maximum propagation delay of the radar signal sent by the fifth radar detection apparatus may be the same or different. The fourth radar detection apparatus and the fifth radar detection apparatus may be a same type of radar detection apparatus, or may be different types of radar detection apparatuses.

For example, the radar signal sent by the fourth radar detection apparatus is earlier than the radar signal sent by the fifth radar detection apparatus. In this embodiment of this application, when a spacing between time domain ranges is set, the following may be considered:

(1) If a distance between the fourth radar detection apparatus and the fifth radar detection apparatus is quite short, at least an interval $\tau_{max_1}$ is required between sending moments of the fourth radar detection apparatus and the fifth radar detection apparatus to ensure that the two radar detection apparatuses do not interfere with each other, where $\tau_{max_1}$ represents the echo delay corresponding to the maximum detection distance of the fourth radar detection apparatus.

(2) If a distance between the fourth radar detection apparatus and the fifth radar detection apparatus is greater than a distance corresponding to $\tau_{max_1}$, the radar signal sent by the fourth radar detection apparatus cannot fall within a target echo observation range of the fifth radar detection apparatus after a propagation delay $\Delta_{p_1}$:

(3) The transmitted signal of the fifth radar detection apparatus cannot fall within an effective detection area of the fourth radar detection apparatus in a next period after a propagation delay $\Delta_{p_2}$. In other words, one radar detection apparatus may periodically send a signal and periodically receive a signal, and the transmitted signal of the fifth radar detection apparatus cannot be received by the fourth radar detection apparatus after the propagation delay $\Delta_{p_2}$. The foregoing may be combined to obtain the following:

$$\max(\tau_{max_1}, \tau_{max_2}, \Delta_{p_1}, \Delta_{p_2}) + \max\left(0, T_c - \frac{a_1}{a_2}T_c\right) \le \Delta_t \le \quad \text{(formula 2.1)}$$

$$T_c - \max(\tau_{max_1}, \tau_{max_2}, \Delta_{p_1}, \Delta_{p_2}) + \min\left(0, T_c - \frac{a_1}{a_2}T_c\right)$$

The formula 2.1 may also be considered as two formulas. For example, $$\max(\tau_{max_1}, \tau_{max_2}, \Delta_{p_1}, \Delta_{p_2}) + \max\left(0, T_c - \frac{a_1}{a_2}T_c\right) \le \Delta_t$$

may be considered as a first formula, used to determine the first threshold, and $$\le \Delta_t \le T_c - \max(\tau_{max_1}, \tau_{max_2}, \Delta_{p_1}, \Delta_{p_2}) + \min\left(0, T_c - \frac{a_1}{a_2}T_c\right)$$

may be considered as a fifth formula, used to determine the second threshold.

The formula for determining the first threshold and the formula for determining the second threshold may be combined into one formula, for example, the formula 2.1. In this case, the first threshold and the second threshold may be determined together. Alternatively, the formula for determining the first threshold and the formula for determining the second threshold may exist separately, and the first threshold and the second threshold may be separately determined.

In the formula 2.1, $\tau_{max_1}$ represents the echo delay corresponding to the maximum detection distance of the fourth radar detection apparatus, and $\tau_{max_2}$ represents the echo delay corresponding to the maximum detection distance of the fifth radar detection apparatus. $\Delta_{p_1}$ represents the maximum propagation delay of the radar signal sent by the fourth radar detection apparatus. Therefore, in the formula 2.1, $\Delta_{p_1}$ may also be represented as $\Delta_{p_{1max}}$. $\Delta_{p_2}$ represents the maximum propagation delay of the radar signal sent by the fifth radar detection apparatus. Therefore, in the formula 2.1, $\Delta_{p_2}$ may also be represented as $\Delta_{p_{2max}}$. $a_1$ represents a slope of the radar signal sent by the fourth radar detection apparatus, and $a_2$ represents a slope of the radar signal sent by the fifth radar detection apparatus. In this embodiment of this application, an absolute value of the slope may represent a frequency change amount in a unit time (or may represent a frequency change range in a unit time). Therefore, it may also be considered that $a_1$ represents a frequency change amount of the radar signal sent by the fourth radar detection apparatus in the unit time, and $a_2$ represents a frequency change amount of the radar signal sent by the fifth radar detection apparatus in the unit time. For ease of understanding, the following still describes the case in which $a_1$ represents the slope of the radar signal sent by the fourth radar detection apparatus, and $a_2$ represents the slope of the radar signal sent by the fifth radar detection apparatus. It should be understood that $a_1$ in this embodiment of this application may represent an absolute value of a slope, or may represent a slope. If $a_1$ represents a slope, a value of $a_1$ may be positive or negative. Similarly, $a_2$ may represent an absolute value of a slope, or may represent a slope. If $a_2$ represents a slope, a value of $a_2$ may be positive or negative. $\Delta_t$ represents an absolute value of a difference between time domain start locations of any two of the L time domain ranges. $T_c$ represents a frequency scanning period of the fourth radar detection apparatus. Because both the fourth radar detection apparatus and the fifth radar detection apparatus are movable radar detection apparatuses, the maximum propagation delays of the radar signals sent by the two radar detection apparatuses are substituted into the formula 2.1 instead of actual propagation delays of the radar signals sent by the two radar detection apparatuses.

Figure 18:
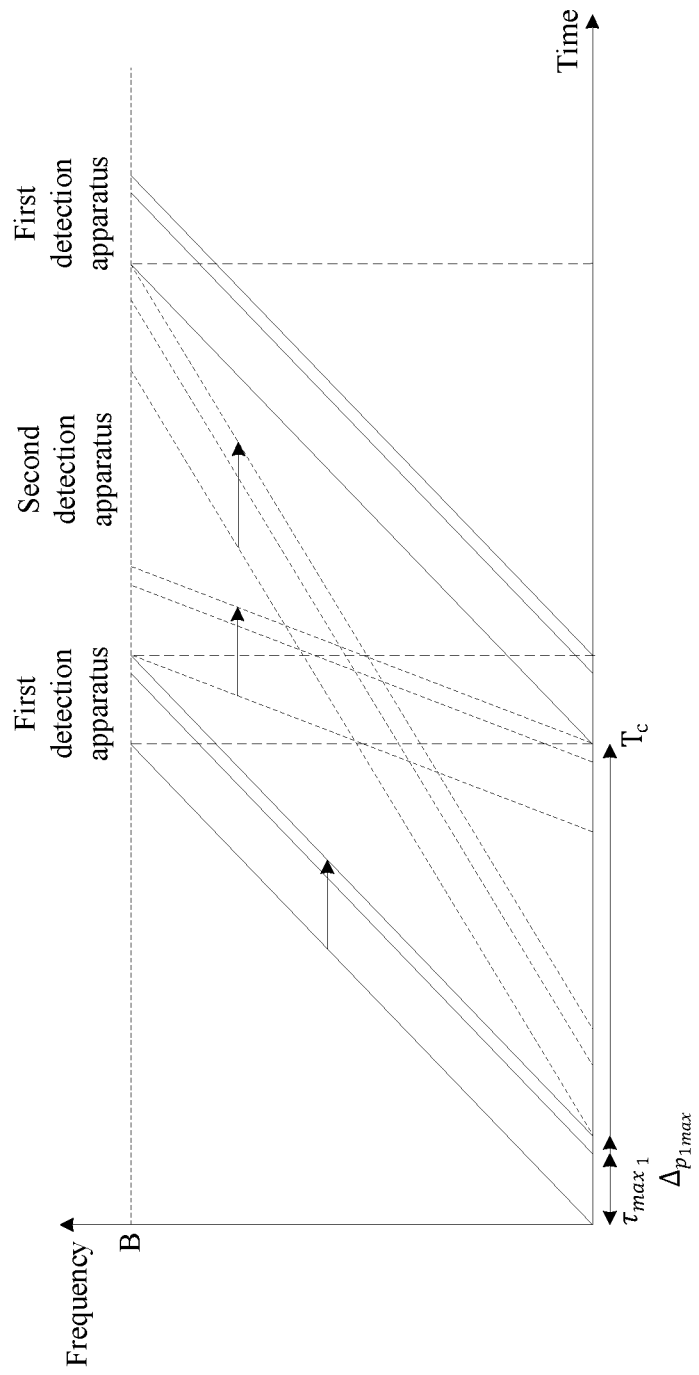
FIG. 18 is a schematic diagram of a time domain range of a fourth radar detection apparatus and a time domain range of a fifth radar detection apparatus according to an embodiment of this application.

FIG. 18 is a schematic diagram of a time domain range of the fourth radar detection apparatus and a time domain range of the fifth radar detection apparatus that are determined based on the foregoing method. In FIG. 18, all solid lines represent signals of the fourth radar detection apparatus, all dashed lines (except for three vertical dashed lines) represent signals of the fifth radar detection apparatus, and B represents frequency scanning bandwidth of the fourth radar detection apparatus. It can be learned based on the requirement that a moment at which the fifth radar detection apparatus sends a signal needs to be later than at least the echo delay corresponding to the maximum detection distance of the fourth radar detection apparatus (in FIG. 18, the first solid line from left to right represents a transmitted signal of the fourth radar detection apparatus in one period, the second solid line from left to right represents a reflected signal, namely, an echo signal, of the transmitted signal, and the third solid line from left to right represents a signal obtained after the maximum propagation delay $\Delta_{p_{1max}}$ expires for the transmitted signal), and needs to be later than the maximum propagation delay of the radar signal sent by the fourth radar detection apparatus. In this case, the transmitted signal of the fourth radar detection apparatus is not received by the fifth radar detection apparatus as a received signal. Therefore, $\max(\tau_{max_1}, \tau_{max_2}, \Delta_{p_{1max}}, \Delta_{p_{2max}}) \le \Delta_t \le T_c - \max(\tau_{max_1}, \tau_{max_2}, \Delta_{p_{1max}}, \Delta_{p_{2max}})$.

In addition, it should be further ensured that the transmitted signal of the fifth radar detection apparatus does not fall within a target echo observation range of the fourth radar detection apparatus in a range of the bandwidth B, in other words, the transmitted signal of the fifth radar detection apparatus does not intersect with the target echo observation range of the fourth radar detection apparatus in the range of the bandwidth B, and certainly, it also needs to be ensured that the transmitted signal of the fourth radar detection apparatus does not fall within the target echo observation range of the fifth radar detection apparatus in the range of the bandwidth B. Therefore, $$T_c + \max(\tau_{max_1}, \tau_{max_2}, \Delta_{p_{1max}}, \Delta_{p_{2max}}) - \frac{a_1}{a_2}T_c \le$$

$$\Delta_t \le 2T_c - \max(\tau_{max_1}, \tau_{max_2}, \Delta_{p_{1max}}, \Delta_{p_{2max}}) - \frac{a_1}{a_2}T_c.$$

In addition, $a_2$ needs to meet the following constraint, so that the foregoing formula does not limit a frequency scanning period of the fifth radar detection apparatus:

$$\frac{a_1 T_c}{2T_c - 2\Delta_p} \le a_2 \le \frac{a_1 T_c}{2\Delta_p}.$$

The three formulas may be combined to obtain the formula 2.1. It can be learned from FIG. 18 that a transmitted signal of each of the two radar detection apparatuses does not fall within a target echo observation range of the other party, and does not cause interference to the other party. In addition, in FIG. 18, the signal of the fourth radar detection apparatus is used as a reference, and the signal of the fifth radar detection apparatus needs to meet the corresponding requirement, so that the two radar detection apparatuses do not interfere with each other. Therefore, when the formula 2.1 is applied to FIG. 18, $T_c$ may be the frequency scanning period of the fourth radar detection apparatus.

For example, both the fourth radar detection apparatus and the fifth radar detection apparatus are in-vehicle radars. For example, frequency scanning bandwidth of the fourth radar detection apparatus is 250 MHz, the frequency scanning period $T_c$ is 27.8 μs, the maximum detection distance is 250 m, and a corresponding maximum intermediate frequency is 15 MHz. The slope of the radar signal sent by the fifth radar detection apparatus (for a radar detection apparatus, a slope of a transmitted signal (namely, a sent radar signal), a slope of a reflected signal, and a slope of a signal obtained after a propagation delay of the transmitted signal are the same) is 1.2 times of the slope of the radar signal sent by the fourth radar detection apparatus, the maximum detection distance of the fifth radar detection apparatus is also 250 m, and a maximum propagation delay of a signal between a plurality of radars is 2 μs (for example, if after a radar signal transmitted by the fourth radar detection apparatus is propagated for 600 meters, power of the signal arriving at a receiver of the fifth radar detection apparatus is −115 dBm, and is equal to sensitivity of the receiver of the fifth radar detection apparatus, the maximum propagation delay of the fourth radar detection apparatus is 2 μs). $\tau_{max_1} = \tau_{max_2} = 250 \times 2/\text{speed of light} \approx 1.67$ μs may be calculated based on the maximum detection distance 250 m.

Through substitution into the formula 2.1, $$\max(1.67, 2) + \max\left(0, 27.8 - \frac{1}{1.2} \times 27.8\right) \le$$

$$\Delta_t \le 27.8 - \max(1.67, 2) + \min\left(0, 27.8 - \frac{1}{1.2} \times 27.8\right),$$

that is, 6.7 μs≤$\Delta_t$≤25.7 is may be obtained. For example, if an absolute value of a difference between time domain start locations of any two of the L time domain ranges is 6.7 μs, a quantity of radar detection apparatuses that do not interfere with each other and that can be supported is [27.8/6.7]=4 in a case of a frequency scanning period of 27.8 μs. Based on the analysis, in this scenario, L=4.

Figure 19:
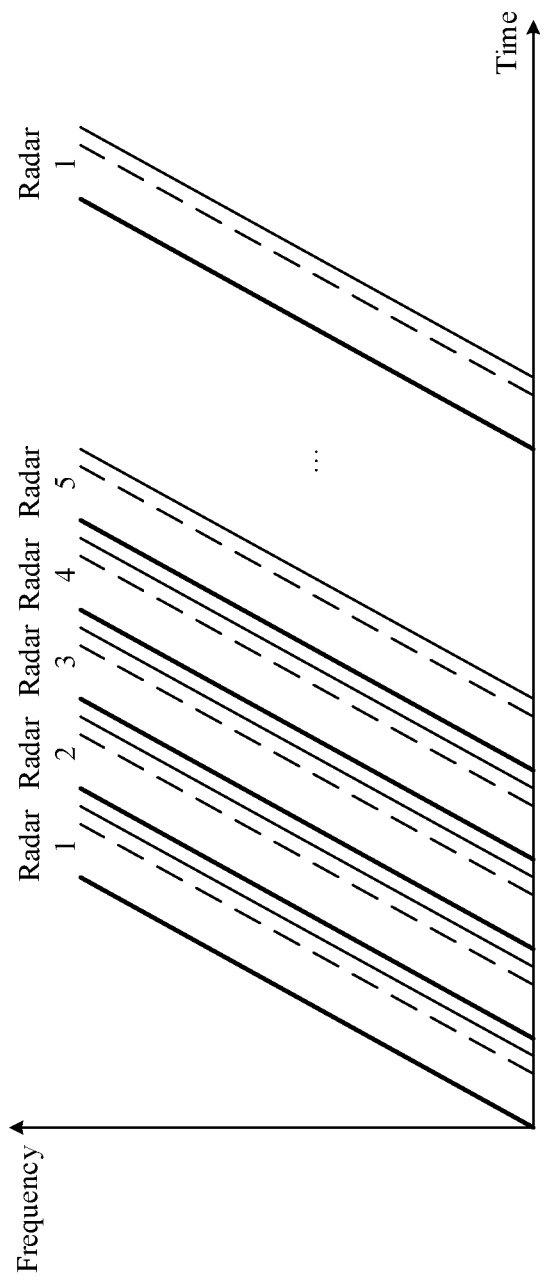
FIG. 19 is a schematic diagram of an arrangement manner of time domain ranges within which a plurality of radars fall according to an embodiment of this application.
Figure 20:
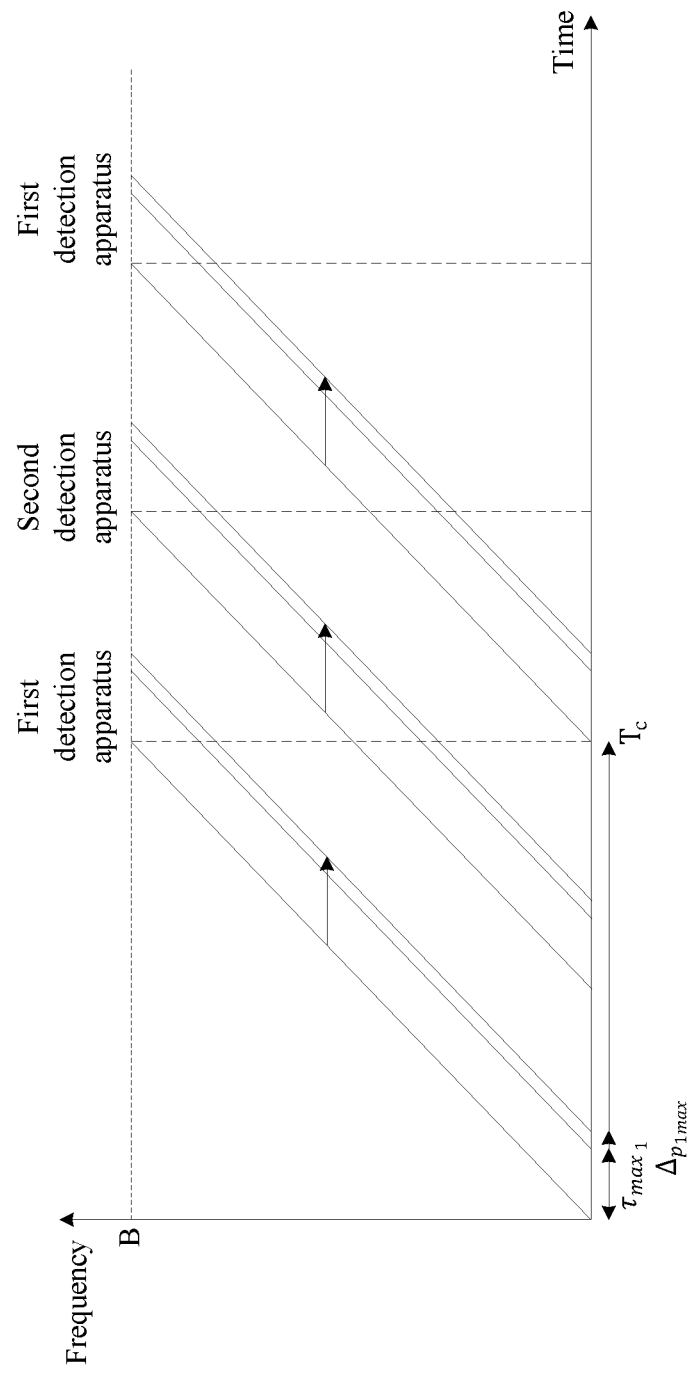
FIG. 20 is a schematic diagram of a time domain range of a fourth radar detection apparatus and a time domain range of a fifth radar detection apparatus according to an embodiment of this application.

FIG. 19 is a schematic diagram of arrangement of time domain ranges within which a plurality of radars fall. In FIG. 20, all relatively thick solid lines represent transmitted signals of corresponding radars, dashed lines represent reflected signals (echo signals) of the corresponding radars, and relatively thin solid lines represent signals obtained after propagation delays expire for the transmitted signals of the corresponding radars. Clearly, a smaller spacing between time domain ranges indicates a larger quantity of time domain ranges arranged in a case of same frequency scanning duration. There may be a one-to-one correspondence between radar detection apparatuses and time domain ranges. Therefore, in each embodiment of this application, a minimum value of a calculated range is selected as the spacing between time domain ranges, so that more radar detection apparatuses can be accommodated.

There is also a relatively special case in which the slope of the radar signal sent by the fourth radar detection apparatus and the slope of the radar signal sent by the fifth radar detection apparatus are the same. In this case, the formula 2.1 may be transformed into the following:

$$\max(\tau_{max_1}, \tau_{max_2}, \Delta_{p_1}, \Delta_{p_2}) \le \Delta_t \le T_c - \max(\tau_{max_1}, \tau_{max_2}, \Delta_{p_1}, \Delta_{p_2}) \quad \text{(formula 2.2)}$$

The formula 2.2 may also be considered as two formulas. For example, $\max(\tau_{max_1}, \tau_{max_2}, \Delta_{p_1}, \Delta_{p_2}) \le \Delta_t$ may be considered as a second formula, used to determine the first threshold, and $\Delta_t \le T_c - \max(\tau_{max_1}, \tau_{max_2}, \Delta_{p_1}, \Delta_{p_2})$ may be considered as a sixth formula, used to determine the second threshold.

The formula for determining the first threshold and the formula for determining the second threshold may be combined into one formula, for example, the formula 2.2. In this case, the first threshold and the second threshold may be determined together. Alternatively, the formula for determining the first threshold and the formula for determining the second threshold may exist separately, and the first threshold and the second threshold may be separately determined.

FIG. 20 is a schematic diagram of a time domain range of the fourth radar detection apparatus and a time domain range of the fifth radar detection apparatus that are determined based on the foregoing method. In FIG. 20, all solid lines represent signals of the fourth radar detection apparatus, all dashed lines (except for three vertical dashed lines) represent signals of the fifth radar detection apparatus, and B represents frequency scanning bandwidth of the fourth radar detection apparatus. It can be learned based on the requirement that a moment at which the fifth radar detection apparatus sends a signal needs to be later than at least the echo delay corresponding to the maximum detection distance of the fourth radar detection apparatus (in FIG. 20, the first solid line from left to right represents a transmitted signal of the fourth radar detection apparatus in one period, the second solid line from left to right represents a reflected signal, namely, an echo signal, of the transmitted signal, and the third solid line from left to right represents a signal obtained after the maximum propagation delay $\Delta_{p_1}$ expires for the transmitted signal), and needs to be later than the maximum propagation delay of the radar signal sent by the fourth radar detection apparatus. In this case, the transmitted signal of the fourth radar detection apparatus is not received by the fifth radar detection apparatus as a received signal. Therefore, $\max(\tau_{max_1}, \tau_{max_2}, \Delta_{p_1}, \Delta_{p_2}) \le \Delta_t \le T_c - \max(\tau_{max_1}, \tau_{max_2}, \Delta_{p_1}, \Delta_{p_2})$. Because the slope of the radar signal sent by the fourth radar detection apparatus and the slope of the radar signal sent by the fifth radar detection apparatus are the same, it is unnecessary to consider a case in which waveforms of the two radar detection apparatuses intersect, and $\max(\tau_{max_1}, \tau_{max_2}, \Delta_{p_1}, \Delta_{p_2}) \le \Delta_t \le T_c - \max(\tau_{max_1}, \tau_{max_2}, \Delta_{p_1}, \Delta_{p_2})$ is the formula 2.2. It can be learned from FIG. 20 that a transmitted signal of each of the two radar detection apparatuses does not fall within a target echo observation range of the other party, and does not cause interference to the other party.

In addition, in FIG. 20, the signal of the fourth radar detection apparatus is used as a reference, and the signal of the fifth radar detection apparatus needs to meet the corresponding requirement, so that the two radar detection apparatuses do not interfere with each other. Therefore, when the formula 2.2 is applied to FIG. 20, $T_c$ may be the frequency scanning period of the fourth radar detection apparatus.

For example, both the fourth radar detection apparatus and the fifth radar detection apparatus are in-vehicle long range radars (long range radar, LRR), and parameters of the fourth radar detection apparatus are the same as parameters of the fifth radar detection apparatus. For example, frequency scanning bandwidth of the fourth LRR is 250 MHz, a frequency scanning period $T_c$ is 27.8 μs, a maximum detection distance is 250 m, a corresponding maximum intermediate frequency is 15 MHz, and a maximum propagation delay is 2 µs (for example, if after a radar signal of the fourth LRR is propagated for 600 meters, power of the signal arriving at a receiver of the fifth LRR is −115 dBm, and is equal to sensitivity of the receiver of the fifth LRR, the maximum propagation delay of the fourth LRR is 2 µs). Because parameters of the fourth LRR are the same as parameters of the fifth LRR, the foregoing parameters correspond to the fourth LRR and also correspond to the fifth LRR. The following may be calculated based on the maximum detection distance 250 m: $\tau_{max_1}=\tau_{max_2}=250\times 2$/speed of light≈1.67 µs.

Through substitution into the formula 2.2, max(1.67, 2)≤$\Delta_t$≤27.8−max(1.67, 2), that is, 2 µs≤$\Delta_t$≤25.8 µs may be obtained. For example, if an absolute value of a difference between time domain start locations of any two of the L time domain ranges is 2 µs, a quantity of LRRs that do not interfere with each other and that can be supported is [27.8/2]=13 in a case of a frequency scanning period of 27.8 µs.

Figure 21:
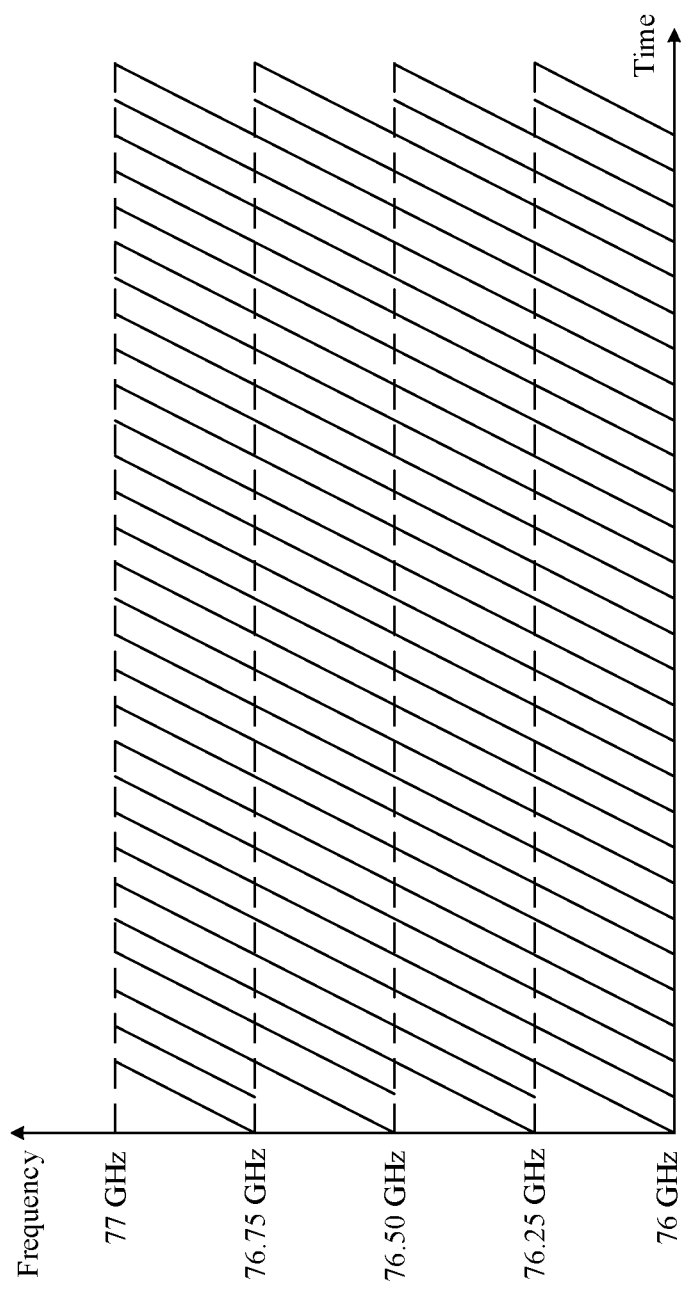
FIG. 21 is a schematic diagram of a radar signal that can be supported in bandwidth of 1 GHz according to an embodiment of this application.

For a schematic diagram of arrangement of time domain ranges within which a plurality of LRRs fall, still refer to FIG. 19. In addition, in consideration that the LRR may use 1 GHz bandwidth of 76 GHz to 77 GHz, and frequency scanning bandwidth of the LRR is 250 MHz, four frequency domain resources that do not interfere with each other may be obtained through frequency division for use by the LRR. Referring to FIG. 21, the four frequency domain resources are 76 GHz to 76.25 GHz, 76.25 GHz to 76.50 GHz, 76.50 GHz to 76.70 GHz, and 76.70 GHz to 77 GHz in FIG. 21. A plurality of time domain ranges may be set on each frequency domain resource. Therefore, in the 1 GHz bandwidth of 76 GHz to 77 GHz, a total of 4*13=52 groups of radar signals that do not interfere with each other can be supported, that is, 52 LRRs can be supported.

For another example, based on the formula 2.2, if the echo delay corresponding to the maximum detection distance of the fourth radar detection apparatus is equal to the echo delay corresponding to the maximum detection distance of the fifth radar detection apparatus, and the maximum propagation delay of the radar signal sent by the fourth radar detection apparatus is equal to the maximum propagation delay of the radar signal sent by the fifth radar detection apparatus, for example, the fourth radar detection apparatus and the fifth radar detection apparatus are a same type of radar detection apparatus, the formula 2.1 may be further transformed into the following:

$$\max(\tau_{max}, \Delta_p) \leq \Delta_t \leq T_c - \max(\tau_{max}, \Delta_p) \quad \text{(formula 2.2-1)}$$

The formula 2.2-1 may also be considered as two formulas. For example, max($\tau_{max}$, $\Delta_p$)≤$\Delta_t$ may be considered as a second formula, used to determine the first threshold, and $\Delta_t$≤$T_c$−max($\tau_{max}$, $\Delta_p$) may be considered as a sixth formula, used to determine the second threshold. $\tau_{max}$ represents the echo delay corresponding to the maximum detection distance of the fourth radar detection apparatus and also represents the echo delay corresponding to the maximum detection distance of the fifth radar detection apparatus, and $\Delta_p$ represents the maximum propagation delay of the radar signal sent by the fourth radar detection apparatus and also represents the maximum propagation delay of the radar signal sent by the fifth radar detection apparatus. It can be appreciated that if corresponding parameters of the two radar detection apparatuses are the same, the first threshold or the second threshold only needs to be calculated based on parameters of one of the radar detection apparatuses.

The formula for determining the first threshold and the formula for determining the second threshold may be combined into one formula, for example, the formula 2.2-1. In this case, the first threshold and the second threshold may be determined together. Alternatively, the formula for determining the first threshold and the formula for determining the second threshold may exist separately, and the first threshold and the second threshold may be separately determined.

For example, both the fourth radar detection apparatus and the fifth radar detection apparatus are in-vehicle radars. For example, frequency scanning bandwidth of the fourth radar detection apparatus is 250 MHz, the frequency scanning period $T_c$ is 27.8 µs, the maximum detection distance is 250 m, a corresponding maximum intermediate frequency is 15 MHz, and a maximum propagation delay of a signal between a plurality of radars is 2 µs (for example, if after the radar signal of the fourth radar detection apparatus is propagated for 600 meters, power of the signal arriving at a receiver of the fifth radar detection apparatus is −115 dBm, and is equal to sensitivity of the receiver of the fifth radar detection apparatus, the maximum propagation delay of the fourth radar detection apparatus is 2 µs). $\tau_{max_1}=\tau_{max_2}=250\times 2$/speed of light≈1.67 µs may be calculated based on the maximum detection distance 250 m.

Through substitution into the formula 2.2-1, max(1.67, 2)≤$\Delta_t$≤27.8max(1.67, 2), that is, 2 µs≤$\Delta_t$≤25.8 µs may be obtained. For example, if an absolute value of a difference between time domain start locations of any two of the L time domain ranges is 2 µs, a quantity of radar detection apparatuses that do not interfere with each other and that can be supported is [27.8/2]=13 in a case of a frequency scanning period of 27.8 µs.

In the formula 2.1, the formula 2.2, and the formula 2.2-1, a synchronization error between radar detection apparatus is not considered, and different radar detection apparatuses may have inconsistent understanding of time. For example, the fourth radar detection apparatus considers that a moment is 10:00:00, and the fifth radar detection apparatus may consider that the moment is 10:00:02. Therefore, there is a synchronization error between the two radar detection apparatuses. If a synchronization error between two radar detection apparatuses is considered, a method for determining the first threshold varies. For example, the first threshold may be determined based on the at least one propagation delay, the at least one echo delay, and first information, and the second sub-threshold may be determined based on the at least one propagation delay, the at least one echo delay, and the first information.

If the fourth radar detection apparatus and the fifth radar detection apparatus are used as examples, the first threshold may be determined based on the echo delay corresponding to the maximum detection distance of the fourth radar detection apparatus, the echo delay corresponding to the maximum detection distance of the fifth radar detection apparatus, the maximum propagation delay of the radar signal sent by the fourth radar detection apparatus, the maximum propagation delay of the radar signal sent by the fifth radar detection apparatus, and the first information. Similarly, if the fourth radar detection apparatus and the fifth radar detection apparatus are used as examples, the second sub-threshold may be determined based on the echo delay corresponding to the maximum detection distance of the fourth radar detection apparatus, the echo delay corresponding to the maximum detection distance of the fifth radar detection apparatus, the maximum propagation delay of the radar signal sent by the fourth radar detection apparatus, the maximum propagation delay of the radar signal sent by the fifth radar detection apparatus, and the first information.

The first information may include a time margin, may include a synchronization error between two radar detection apparatuses, or may include a sum of a time margin and a synchronization error between two radar detection apparatuses. For example, if the fourth radar detection apparatus and the fifth radar detection apparatus are involved in calculation, the first information may include a time margin, a synchronization error between the fourth radar detection apparatus and the fifth radar detection apparatus, or a sum of a time margin and a synchronization error between the fourth radar detection apparatus and the fifth radar detection apparatus. When radar detection apparatuses involved in calculation vary, the synchronization error may vary, and the time margin may or may not vary.

For example, the first threshold may be determined based on a third formula, and the third formula may be $$\max(\tau_{max_1}, \tau_{max_2}, \Delta_{p_1}, \Delta_{p_2}) + \max\left(0, T_c - \frac{a_1}{a_2}T_c\right) + \Delta \leq \Delta_t.$$

The second threshold may be determined based on a seventh formula, and the seventh formula may be $$\Delta_t \leq T_c - \max(\tau_{max_1}, \tau_{max_2}, \Delta_{p_1}, \Delta_{p_2}) + \min\left(0, T_c - \frac{a_1}{a_2}T_c\right) - \Delta.$$

The following may be obtained through combination:

$$\max(\tau_{max_1}, \tau_{max_2}, \Delta_{p_1}, \Delta_{p_2}) + \max\left(0, T_c - \frac{a_1}{a_2}T_c\right) + \Delta \leq \Delta_t \leq \quad \text{(formula 2.3)}$$
$$T_c - \max(\tau_{max_1}, \tau_{max_2}, \Delta_{p_1}, \Delta_{p_2}) + \min\left(0, T_c - \frac{a_1}{a_2}T_c\right) - \Delta$$

Δ represents the first information. For example, $\Delta = \Delta_s + \delta$, or $\Delta = \Delta_s$, or $\Delta = \delta$. $\Delta_s$ represents the synchronization error between the two radar detection apparatuses. If the fourth radar detection apparatus and the fifth radar detection apparatus are involved in calculation, $\Delta_s$ represents the synchronization error between the fourth radar detection apparatus and the fifth radar detection apparatus. δ represents the time margin.

The formula for determining the first threshold and the formula for determining the second threshold may be combined into one formula, for example, the formula 2.3. In this case, the first threshold and the second threshold may be determined together. Alternatively, the formula for determining the first threshold and the formula for determining the second threshold may exist separately, and the first threshold and the second threshold may be separately determined.

For example, both the fourth radar detection apparatus and the fifth radar detection apparatus are LRRs. For example, frequency scanning bandwidth of the fourth LRR is 250 MHz, a frequency scanning period $T_c$ is 27.8 μs, a maximum detection distance is 250 m, and a corresponding maximum intermediate frequency is 15 MHz. A slope of a radar signal sent by the fifth LRR (for a radar detection apparatus, a slope of a transmitted signal, a slope of a reflected signal, and a slope of a signal obtained after a propagation delay of the transmitted signal are the same) is 1.2 times of a slope of a radar signal sent by the fourth LRR, a maximum detection distance of the fifth LRR is also 250 m, a maximum propagation delay of the radar signal sent by the fourth LRR is 2 μs, and a maximum propagation delay of the radar signal sent by the fifth LRR is also 2 μs (for example, if after the radar signal of the fourth LRR is propagated for 600 meters, power of the signal arriving at a receiver of the fifth LRR is −115 dBm, and is equal to sensitivity of the receiver of the fifth LRR, the maximum propagation delay of the fourth LRR is 2 μs). $\tau_{max_1} = \tau_{max_2} = 250 \times 2/\text{speed of light} \approx 1.67$ μs may be calculated based on the maximum detection distance 250 m.

Generally, for a synchronization error $\Delta_s$ between the fourth LRR and the fifth LRR, refer to a timing error such as 2 μs of a global positioning system (global positioning system, GPS). If the first information includes the synchronization error between the fourth LRR and the fifth LRR, and does not include the time margin, 8.7 μs ≤ $\Delta_t$ ≤ 21.8 is may be obtained through substitution into the formula 2.3. δ may be a predefined or preconfigured constant, and represents time jitter caused by a non-ideal factor of the LRR. For example, δ=1 μs. If the first information includes the time margin and the synchronization error between the fourth LRR and the fifth LRR, 9.7 μs ≤ $\Delta_t$ ≤ 20.8 μs may be obtained through substitution into the formula 2.3. Provided that an absolute value of a difference between time domain start locations of any two of the L time domain ranges is greater than or equal to 9.7 μs and less than or equal to 20.8 μs, there can be no interference between any two radar detection apparatuses sending radar signals in the L time domain ranges. For example, an absolute value of a difference between time domain start locations of any two of the L time domain ranges may be made equal to the first threshold, for example, equal to 9.7 μs, so that a quantity of radar detection apparatuses that do not interfere with each other reaches the largest, thereby improving utilization of time domain resources. For example, if an absolute value of a difference between time domain start locations of any two of the L time domain ranges is 9.7 μs, a quantity of radar detection apparatuses that do not interfere with each other and that can be supported is [27.8/9.7]=2 in a case of a frequency scanning period of 27.8 μs. For a schematic diagram of arrangement of time domain ranges within which a plurality of LRRs fall, still refer to FIG. 19.

When the first information is considered, a special case may also be considered: The slope of the radar signal sent by the fourth radar detection apparatus and the slope of the radar signal sent by the fifth radar detection apparatus are the same. In this case, the formula 2.3 may be transformed into the following:

$$\max(\tau_{max_1}, \tau_{max_2}\Delta_{p_1}, \Delta_{p_2}) + \Delta \leq \Delta_t \leq T_c - \max(\tau_{max_1}, \tau_{max_2}\Delta_{p_1}, \Delta_{p_2}) - \Delta \quad \text{(formula 2.4)}$$

The formula 2.4 may also be considered as two formulas. For example, $\max(\tau_{max_1}, \tau_{max_2}\Delta_{p_1}, \Delta_{p_2}) + \Delta \leq \Delta_t$ may be considered as a fourth formula, used to determine the first threshold, and $\Delta_t \leq T_c - \max(\tau_{max_1}, \tau_{max_2}\Delta_{p_1}, \Delta_{p_2}) - \Delta$ may be considered as an eighth formula, used to determine the second threshold. The formula for determining the first threshold and the formula for determining the second threshold may be combined into one formula, for example, the formula 2.4. In this case, the first threshold and the second threshold may be determined together. Alternatively, the formula for determining the first threshold and the formula for determining the second threshold may exist separately, and the first threshold and the second threshold may be separately determined.

For example, both the fourth radar detection apparatus and the fifth radar detection apparatus are LRRs, and parameters of the fourth radar detection apparatus are the same as parameters of the fifth radar detection apparatus. For example, frequency scanning bandwidth of the LRR is 250 MHz, a frequency scanning period $T_c$ is 27.8 μs, a maximum detection distance is 250 m, a corresponding maximum intermediate frequency is 15 MHz, and both the maximum propagation delay of the radar signal sent by the fourth radar detection apparatus and the maximum propagation delay of the radar signal sent by the fifth radar detection apparatus are 2 μs (for example, if after the radar signal of the fourth radar detection apparatus is propagated for 600 meters, power of the signal arriving at a receiver of the fifth radar detection apparatus is −115 dBm, and is equal to sensitivity of the receiver of the fifth radar detection apparatus, the maximum propagation delay of the fourth radar detection apparatus is 2 μs). Because the parameters of the fourth radar detection apparatus are the same as the parameters of the fifth radar detection apparatus, the foregoing parameters correspond to the fourth radar detection apparatus and also correspond to the fifth radar detection apparatus. The following may be calculated based on the maximum detection distance 250 m: $\tau_{max_1} = \tau_{max_2} = 250 \times 2/\text{speed of light} \approx 1.67$ μs.

Generally, for a synchronization error $\Delta_s$ between the fourth radar detection apparatus and the fifth radar detection apparatus, refer to a timing error such as 2 μs of a GPS. If the first information includes the synchronization error between the fourth radar detection apparatus and the fifth radar detection apparatus, and does not include a time margin, 4 μs≤$\Delta_t$≤23.8 μs may be obtained through substitution into the formula 2.4. δ may be a predefined or preconfigured constant, and represents time jitter caused by a non-ideal factor of the radar detection apparatus. For example, δ=1 μs. If the first information includes a time margin and the synchronization error between the fourth radar detection apparatus and the fifth radar detection apparatus, 5 μs≤$\Delta_t$≤22.8 vs may be obtained through substitution into the formula 2.4. Provided that an absolute value of a difference between time domain start locations of any two of the L time domain ranges is greater than or equal to 5 μs and less than or equal to 22.8 μs, there can be no interference between any two radar detection apparatuses sending radar signals in the L time domain ranges. For example, an absolute value of a difference between time domain start locations of any two of the L time domain ranges may be made equal to the first threshold, for example, equal to 5 μs, so that a quantity of radar detection apparatuses that do not interfere with each other reaches the largest, thereby improving utilization of time domain resources. For example, if an absolute value of a difference between time domain start locations of any two of the L time domain ranges is 5 μs, a quantity of radar detection apparatuses that do not interfere with each other and that can be supported is [27.8/5]=5 in a case of a frequency scanning period of 27.8 μs. For a schematic diagram of arrangement of time domain ranges within which a plurality of LRRs fall, still refer to FIG. 19.

Based on the formula 2.4, if the echo delay corresponding to the maximum detection distance of the fourth radar detection apparatus is equal to the echo delay corresponding to the maximum detection distance of the fifth radar detection apparatus, and the maximum propagation delay of the radar signal sent by the fourth radar detection apparatus is equal to the maximum propagation delay of the radar signal sent by the fifth radar detection apparatus, for example, the fourth radar detection apparatus and the fifth radar detection apparatus are a same type of radar detection apparatus, the formula 2.4 may be further transformed into the following:

$$\max(\tau_{max}, \Delta_p) + \Delta \leq \Delta_t \leq T_c - \max(\tau_{max}, \Delta_p) - \Delta \quad \text{(formula 2.4-1)}$$

The formula 2.4-1 may also be considered as two formulas. For example, $\max(\tau_{max}, \Delta_p) + \Delta \leq \Delta_t$ may be considered as a second formula, used to determine the first threshold, and $\Delta_t \leq T_c - \max(\tau_{max}, \Delta_p) - \Delta$ may be considered as a sixth formula, used to determine the second threshold.

The formula for determining the first threshold and the formula for determining the second threshold may be combined into one formula, for example, the formula 2.4-1. In this case, the first threshold and the second threshold may be determined together. Alternatively, the formula for determining the first threshold and the formula for determining the second threshold may exist separately, and the first threshold and the second threshold may be separately determined.

For example, both the fourth radar detection apparatus and the fifth radar detection apparatus are in-vehicle radars. For example, frequency scanning bandwidth of the fourth radar detection apparatus is 250 MHz, the frequency scanning period $T_c$ is 27.8 μs, the maximum detection distance is 250 m, a corresponding maximum intermediate frequency is 15 MHz, and a maximum propagation delay of a signal between a plurality of radars is 2 μs (for example, if after the radar signal of the fourth radar detection apparatus is propagated for 600 meters, power of the signal arriving at a receiver of the fifth LRR is −115 dBm, and is equal to sensitivity of the receiver of the fifth radar detection apparatus, the maximum propagation delay of the fourth radar detection apparatus is 2 μs). The following may be calculated based on the maximum detection distance 250 m: $\tau_{max_1} = \tau_{max_2} = 250 \times 2/\text{speed of light} \approx 1.67$ μs.

Generally, for a synchronization error $\Delta_s$ between the fourth radar detection apparatus and the fifth radar detection apparatus, refer to a timing error such as 2 μs of a GPS. If the first information includes the synchronization error between the fourth radar detection apparatus and the fifth radar detection apparatus, and does not include a time margin, 4 μs≤$\Delta_t$≤23.8 μs may be obtained through substitution into the formula 2.4-1. δ may be a predefined or preconfigured constant, and represents time jitter caused by a non-ideal factor of the radar detection apparatus. For example, δ=1 μs. If the first information includes a time margin and the synchronization error between the fourth radar detection apparatus and the fifth radar detection apparatus, 5 μs≤$\Delta_t$≤22.8 μs may be obtained through substitution into the formula 2.4-1. Provided that an absolute value of a difference between time domain start locations of any two of the L time domain ranges is greater than or equal to 5 μs and less than or equal to 22.8 μs, there can be no interference between any two radar detection apparatuses sending radar signals in the L time domain ranges. For example, an absolute value of a difference between time domain start locations of any two of the L time domain ranges may be made equal to the first threshold, for example, equal to 5 μs, so that a quantity of radar detection apparatuses that do not interfere with each other reaches the largest, thereby improving utilization of time domain resources. For example, if an absolute value of a difference between time domain start locations of any two of the L time domain ranges is 5 μs, a quantity of radar detection apparatuses that do not interfere with each other and that can be supported is [27.8/5]=5 in a case of a frequency scanning period of 27.8 μs. For a schematic diagram of arrangement of time domain ranges within which a plurality of LRRs fall, still refer to FIG. 19.

The foregoing describes the case in which the radar detection apparatus is a movable radar detection apparatus. The following describes a case in which the radar detection apparatus is not movable.

2. A location of the radar detection apparatus is fixed. For example, the radar detection apparatus is fixed on an RSU, a base station, or another device. Alternatively, the radar detection apparatus may be independently deployed, but the location is fixed.

In this case, the first threshold (or the first sub-threshold) may be determined based on the at least one propagation delay and the at least one echo delay, and the second threshold (or the second sub-threshold) may be determined based on the at least one propagation delay and the at least one echo delay.

In an example in which the fourth radar detection apparatus and the fifth radar detection apparatus are involved in calculation, the first threshold is determined based on an echo delay corresponding to a maximum detection distance of the fourth radar detection apparatus, an echo delay corresponding to a maximum detection distance of the fifth radar detection apparatus, a propagation delay of a radar signal sent by the fourth radar detection apparatus, and a propagation delay of a radar signal sent by the fifth radar detection apparatus. Similarly, in an example in which a sixth radar detection apparatus and a seventh radar detection apparatus are involved in calculation, the second threshold is determined based on an echo delay corresponding to a maximum detection distance of the sixth radar detection apparatus, an echo delay corresponding to a maximum detection distance of the seventh radar detection apparatus, a propagation delay of a radar signal sent by the sixth radar detection apparatus, and a propagation delay of a radar signal sent by the seventh radar detection apparatus.

The echo delay corresponding to the maximum detection distance of the fourth radar detection apparatus and the echo delay corresponding to the maximum detection distance of the fifth radar detection apparatus may be the same or different, and the propagation delay of the radar signal sent by the fourth radar detection apparatus and the propagation delay of the radar signal sent by the fifth radar detection apparatus may be the same or different. In addition, locations of radar detection apparatuses are all fixed. Therefore, the propagation delay of the radar signal sent by the fourth radar detection apparatus is a propagation delay of the radar signal sent by the fourth radar detection apparatus in reaching the fifth radar detection apparatus, and the propagation delay of the radar signal sent by the fifth radar detection apparatus is a propagation delay of the radar signal sent by the fifth radar detection apparatus in reaching the fourth radar detection apparatus. The echo delay corresponding to the maximum detection distance of the sixth radar detection apparatus and the echo delay corresponding to the maximum detection distance of the seventh radar detection apparatus may be the same or different, and the propagation delay of the radar signal sent by the sixth radar detection apparatus and the propagation delay of the radar signal sent by the seventh radar detection apparatus may be the same or different. In addition, locations of radar detection apparatuses are all fixed. Therefore, the propagation delay of the radar signal sent by the sixth radar detection apparatus is a propagation delay of the radar signal sent by the sixth radar detection apparatus in reaching the seventh radar detection apparatus, and the propagation delay of the radar signal sent by the seventh radar detection apparatus is a propagation delay of the radar signal sent by the seventh radar detection apparatus in reaching the sixth radar detection apparatus.

For example, the radar signal sent by the fourth radar detection apparatus is earlier than the radar signal sent by the fifth radar detection apparatus. In this embodiment of this application, when an absolute value of a difference between time domain start locations of any two of the L time domain ranges is set, (1), (2), and (3) in the first point also need to be considered.

The foregoing may be combined to obtain the following:

$$\max(\Delta_{p_1}, \Delta_{p_2}, \tau_{max_2} - \Delta_{p_1}, \tau_{max_1} - \Delta_{p_2}) + \qquad \text{(formula 2.5)}$$
$$\max\!\left(0, T_c - \frac{a_1}{a_2}T_c\right) \leq \Delta_t \leq$$
$$T_c - \max(\Delta_{p_1}, \Delta_{p_2}, \tau_{max_2} - \Delta_{p_1}, \tau_{max_1} - \Delta_{p_2}) +$$
$$\min\!\left(0, T_c - \frac{a_1}{a_2}T_c\right)$$

$\Delta_{p_1}$ represents the propagation delay of the radar signal sent by the fourth radar detection apparatus, and $\Delta_{p_2}$ represents the propagation delay of the radar signal sent by the fifth radar detection apparatus. For meanings of the remaining parameters involved in the formula 2.5, refer to the foregoing related descriptions.

The formula 2.5 may also be considered as two formulas. For example, $$\max(\Delta_{p_1}, \Delta_{p_2}, \tau_{max_2} - \Delta_{p_1}, \tau_{max_1} - \Delta_{p_2}) + \max\!\left(0, T_c - \frac{a_1}{a_2}T_c\right) \leq \Delta_t$$

may be considered as a first formula, used to determine the first threshold, and $$\Delta_t \leq T_c - \max(\Delta_{p_1}, \Delta_{p_2}, \tau_{max_2} - \Delta_{p_1}, \tau_{max_1} - \Delta_{p_2}) + \min\!\left(0, T_c - \frac{a_1}{a_2}T_c\right)$$

may be considered as a fifth formula, used to determine the second threshold. It can be learned from the first point that the first formula may be $$\max(\tau_{max_1}, \tau_{max_2}, \Delta_{p_1}, \Delta_{p_2}) +$$
$$\max\!\left(0, T_c - \frac{a_1}{a_2}T_c\right) \leq \Delta_t \text{ or } \max(\Delta_{p_1}, \Delta_{p_2}, \tau_{max_2} - \Delta_{p_1}, \tau_{max_1} - \Delta_{p_2}) +$$
$$\max\!\left(0, T_c - \frac{a_1}{a_2}T_c\right) \leq \Delta_t,$$

and the fifth formula may be $$\Delta_t \leq T_c - \max(\tau_{max_1}, \tau_{max_2}, \Delta_{p_1}, \Delta_{p_2}) + \min\!\left(0, T_c - \frac{a_1}{a_2}T_c\right) \text{ or } \Delta_t \leq$$
$$T_c - \max(\Delta_{p_1}, \Delta_{p_2}, \tau_{max_2} - \Delta_{p_1}, \tau_{max_1} - \Delta_{p_2}) + \min\!\left(0, T_c - \frac{a_1}{a_2}T_c\right).$$

The formula for determining the first threshold and the formula for determining the second threshold may be combined into one formula, for example, the formula 2.5. In this case, the first threshold and the second threshold may be determined together. Alternatively, the formula for determining the first threshold and the formula for determining the second threshold may exist separately, and the first threshold and the second threshold may be separately determined.

Figure 22:
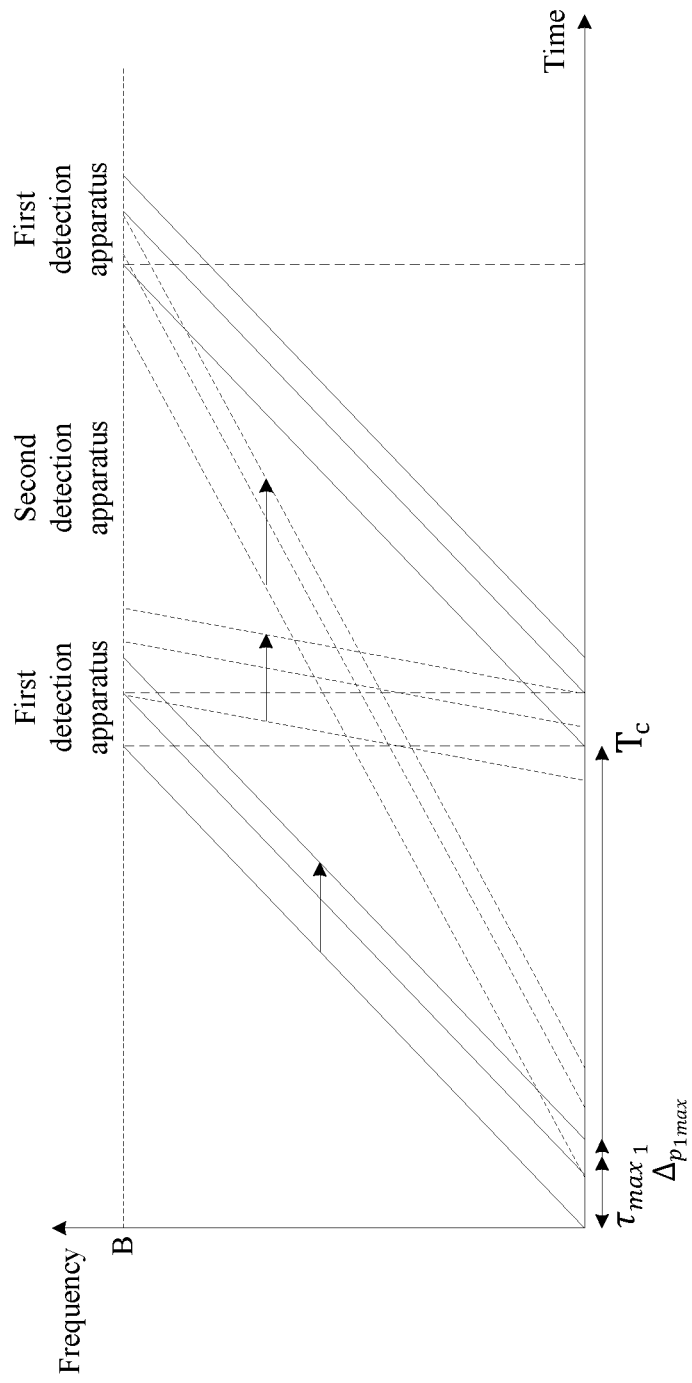
FIG. 22 is a schematic diagram of a time domain range of a fourth radar detection apparatus and a time domain range of a fifth radar detection apparatus according to an embodiment of this application.

FIG. 22 is a schematic diagram of a time domain range of the fourth radar detection apparatus and a time domain range of the fifth radar detection apparatus that are determined based on the foregoing method. In FIG. 22, all solid lines represent signals of the fourth radar detection apparatus, all dashed lines (except for three vertical dashed lines) represent signals of the fifth radar detection apparatus, and B represents frequency scanning bandwidth of the fourth radar detection apparatus. It can be learned based on the requirement that a moment at which the fifth radar detection apparatus sends the radar signal needs to be later than at least the echo delay corresponding to the maximum detection distance of the fourth radar detection apparatus (in FIG. 22, the first solid line from left to right represents a transmitted signal of the fourth radar detection apparatus in one period, the second solid line from left to right represents a reflected signal, namely, an echo signal, of the transmitted signal, and the third solid line from left to right represents a signal obtained after the propagation delay $\Delta_{p_1}$ expires for the transmitted signal), and needs to be later than the propagation delay of the radar signal sent by the fourth radar detection apparatus. In this case, the transmitted signal of the fourth radar detection apparatus is not received by the fifth radar detection apparatus as a received signal. Therefore, $\max(\Delta_{p_1}, \Delta_{p_2}, \tau_{max_2}-\Delta_{p_1}, \tau_{max_1}-\Delta_{p_2}) \leq \Delta_t \leq T_c - \max(\Delta_{p_1}, \Delta_{p_2}, \tau_{max_2}-\Delta_{p_1}, \tau_{max_1}-\Delta_{p_2})$.

In addition, it should be further ensured that the transmitted signal of the fifth radar detection apparatus does not fall within a target echo observation range of the fourth radar detection apparatus in a range of the bandwidth B, in other words, the transmitted signal of the fifth radar detection apparatus does not intersect with the target echo observation range of the fourth radar detection apparatus in the range of the bandwidth B, and certainly, it also needs to be ensured that the transmitted signal of the fourth radar detection apparatus does not fall within the target echo observation range of the fifth radar detection apparatus in the range of the bandwidth B. Therefore, $$T_c + \max(\Delta_{p_1}, \Delta_{p_2}, \tau_{max_2}-\Delta_{p_1}, \tau_{max_1}-\Delta_{p_2}) - \frac{a_1}{a_2}T_c \leq$$

$$\Delta_t \leq 2T_c - \max(\Delta_{p_1}, \Delta_{p_2}, \tau_{max_2}-\Delta_{p_1}, \tau_{max_1}-\Delta_{p_2}) - \frac{a_1}{a_2}T_c.$$

In addition, $a_2$ needs to meet the following constraint, so that the foregoing formula does not limit a frequency scanning period of the fifth radar detection apparatus:

$$\frac{a_1 T_C}{2T_c - 2\Delta_p} \leq a_2 \leq \frac{a_1 T_c}{2\Delta_p}.$$

The three formulas may be combined to obtain the formula 2.5. It can be learned from FIG. 22 that a transmitted signal of each of the two radar detection apparatuses does not fall within a target echo observation range of the other party, and does not cause interference to the other party. In addition, in FIG. 22, the signal of the fourth radar detection apparatus is used as a reference, and the radar signal of the fifth radar detection apparatus needs to meet the corresponding requirement, so that the two radar detection apparatuses do not interfere with each other. Therefore, when the formula 2.5 is applied to FIG. 22, $T_c$ may be a sending period of the fourth radar detection apparatus.

For example, both the fourth radar detection apparatus and the fifth radar detection apparatus are radars disposed on an RSU, and may be respectively referred to as an RSU radar 1 and an RSU radar 2. For example, frequency scanning bandwidth of the RSU radar 1 is 250 MHz, a frequency scanning period $T_c$ is 27.8 μs, a maximum detection distance is 250 m, and a corresponding maximum intermediate frequency is 15 MHz. A slope of a radar signal sent by the RSU radar 2 is 1.2 times of a slope of a radar signal sent by the RSU radar 1, a maximum detection distance of the RSU radar 2 is 200 m, frequency scanning bandwidth is 250 MHz, a frequency scanning period $T_c$ is 27.8 μs, and a corresponding maximum intermediate frequency is 15 MHz. Assuming that the RSU radar 1 and the RSU radar 2 are 300 m apart, $\Delta_{p_1}=\Delta_{p_2}=1$ μs may be obtained. $\tau_{max_1}=250 \times 2/\text{speed of light} \approx 1.67$ μs may be calculated based on the maximum detection distance 250 m of the fourth radar detection apparatus, and $\tau_{max_2}=200 \times 2/\text{speed of light} \approx 1.33$ μs may be calculated based on the maximum detection distance 200 m of the fifth radar detection apparatus.

Through substitution into the formula 2.5, $$\max(1, 1.67-1, 1, 1.33-1) + \max\left(0, 27.8 - \frac{1}{1.2} \times 27.8\right) \leq \Delta_t \leq$$

$$27.8 - \max(1, 1.67-1, 1, 1.33-1) + \min\left(0, 27.8 - \frac{1}{1.2} \times 27.8\right),$$

that is, 5.7 μs$\leq \Delta_t \leq$26.7 μs may be obtained. For example, if an absolute value of a difference between time domain start locations of any two of the L time domain ranges is 5.7 μs, a quantity of radar detection apparatuses that do not interfere with each other and that can be supported is [27.8/5.7]=4 in a case of frequency scanning duration of 27.8 μs.

For a schematic diagram of arrangement of time domain ranges within which a plurality of radar detection apparatuses fall, still refer to FIG. 19.

There is also a relatively special case in which the slope of the radar signal sent by the fourth radar detection apparatus and the slope of the radar signal sent by the fifth radar detection apparatus are the same. In this case, the formula 2.5 may be transformed into the following:

$$\max(\Delta_{p_1},\Delta_{p_2},\tau_{max_2}-\Delta_{p_1},\tau_{max_1}-\Delta_{p_2}) \leq \Delta_t \leq T_c - \max(\Delta_{p_1}, \Delta_{p_2},\tau_{max_2}-\Delta_{p_1},\tau_{max_1}-\Delta_{p_2}) \quad \text{(formula 2.6)}$$

The formula 2.6 may also be considered as two formulas. For example, $\max(\Delta_{p_1}, \Delta_{p_2}, \tau_{max_2}-\Delta_{p_1}, \tau_{max_1}-\Delta_{p_2}) \leq \Delta_t$ may be considered as a second formula, used to determine the first threshold, and $\Delta_t \leq T_c - \max(\Delta_{p_1}, \Delta_{p_2}, \tau_{max_2}-\Delta_{p_1}, \tau_{max_1}-\Delta_{p_2})$ may be considered as a sixth formula, used to determine the second threshold. It can be learned from the first point that the second formula may be $\max(\tau_{max_1}, \tau_{max_2}, \Delta_{p_1}, \Delta_{p_2}) \leq \Delta_t$ or $\max(\Delta_{p_1}, \Delta_{p_2}, \tau_{max_2}-\Delta_{p_1}, \tau_{max_1}-\Delta_{p_2}) \leq \Delta_t$, and the sixth formula may be $\Delta_t T_c \max(\tau_{max_1}, \tau_{max_2}, \Delta_{p_1}, \Delta_{p_2}) \leq \Delta_t$ or $\Delta_t \leq T_c - \max(\Delta_{p_1}, \Delta_{p_2}, \tau_{max_2}-\Delta_{p_1}, \tau_{max_1}-\Delta_{p_2}) \leq \Delta_t)$.

The formula for determining the first threshold and the formula for determining the second threshold may be combined into one formula, for example, the formula 2.6. In this case, the first threshold and the second threshold may be determined together. Alternatively, the formula for determining the first threshold and the formula for determining the second threshold may exist separately, and the first threshold and the second threshold may be separately determined.

Figure 23:
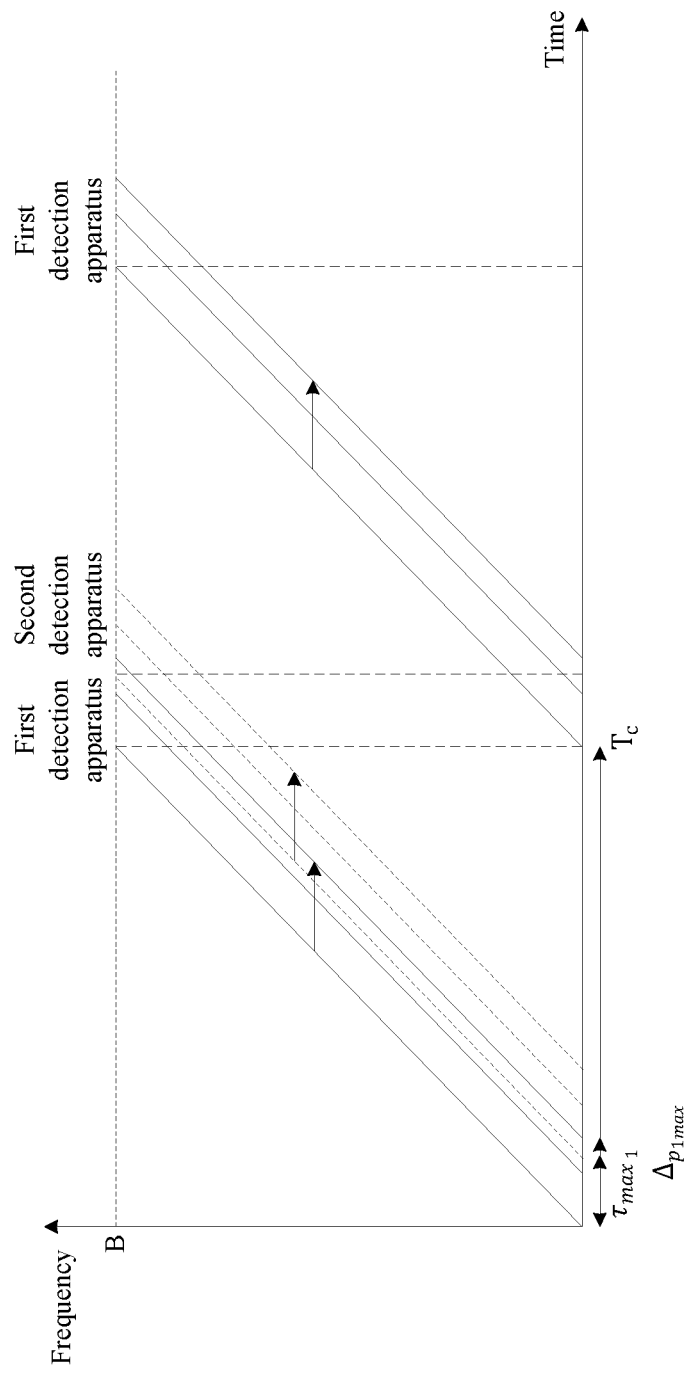
FIG. 23 is a schematic diagram of a time domain range of a fourth radar detection apparatus and a time domain range of a fifth radar detection apparatus according to an embodiment of this application.

FIG. 23 is a schematic diagram of a time domain range of the fourth radar detection apparatus and a time domain range of the fifth radar detection apparatus that are determined based on the foregoing method. In FIG. 23, all solid lines represent signals of the fourth radar detection apparatus, all dashed lines (except for three vertical dashed lines) represent signals of the fifth radar detection apparatus, B represents frequency scanning bandwidth of the fourth radar detection apparatus, the first solid line from left to right represents a transmitted signal of the fourth radar detection apparatus in one period, the second solid line from left to right represents a signal obtained after the propagation delay $\Delta_{p_1}$ expires for the transmitted signal, and the third solid line from left to right represents a reflected signal, namely, an echo signal, of the transmitted signal. The transmitted signal of the fourth radar detection apparatus and the signal obtained after the propagation delay $\Delta_{p_1}$ expires for the transmitted signal need to fall beyond a target echo observation range of the fifth radar detection apparatus, and therefore, $\max(\Delta_{p_1}, \Delta_{p_2}, \tau_{max_2}-\Delta_{p_1}, \tau_{max_1}-\Delta_{p_2}) \leq \Delta_t \leq T_c - \max(\Delta_{p_1}, \Delta_{p_2}, \tau_{max_2}-\Delta_{p_1}, \tau_{max_1}-\Delta_{p_2})$. Because the slope of the radar signal sent by the fourth radar detection apparatus and the slope of the radar signal sent by the fifth radar detection apparatus are the same, it is unnecessary to consider a case in which waveforms of the two radar detection apparatuses intersect, and $\max(\Delta_{p_1}, \Delta_{p_2}, \tau_{max_2}-\Delta_{p_1}, \tau_{max_1}-\Delta_{p_2}) \leq \Delta_t \leq T_c - \max(\Delta_{p_1}, \Delta_{p_2}, \tau_{max_2}-\Delta_{p_1}, \tau_{max_1}-\Delta_{p_2})$ is the formula 2.6. It can be learned from FIG. 23 that a transmitted signal of each of the two radar detection apparatuses does not fall within a target echo observation range of the other party, and does not cause interference to the other party.

In addition, in FIG. 23, the radar signal of the fourth radar detection apparatus is used as a reference, and the radar signal of the fifth radar detection apparatus needs to meet the corresponding requirement, so that the two radar detection apparatuses do not interfere with each other. Therefore, when the formula 2.6 is applied to FIG. 23, $T_c$ may be a sending period of the fourth radar detection apparatus.

For example, both the fourth radar detection apparatus and the fifth radar detection apparatus are radars disposed on an RSU, and may be respectively referred to as an RSU radar 1 and an RSU radar 2. A slope of a radar signal sent by the RSU 1 and a slope of a radar signal sent by the RSU 2 are the same. For example, frequency scanning bandwidth of the RSU radar 1 is 250 MHz, a frequency scanning period $T_c$ is 27.8 μs, a maximum detection distance is 250 m, and a corresponding maximum intermediate frequency is 15 MHz. A maximum detection distance of the RSU radar 2 is 250 m, frequency scanning bandwidth is 250 MHz, a frequency scanning period $T_c$ is 27.8 μs, and a corresponding maximum intermediate frequency is 15 MHz. Assuming that the RSU radar 1 and the RSU radar 2 are 300 m apart, $\Delta_{p_1}=\Delta_{p_2}=1$ μs may be obtained. $\tau_{max_1}=\tau_{max_2}=250\times2/\text{speed of light}\approx1.67$ μs may be calculated based on the maximum detection distance 250 m.

Through substitution into the formula 2.6, $\max(1.67, 1) \leq \Delta_t \leq 27.8\max(1.67, 1)$, that is, 1 μs ≤ $\Delta_t$ ≤ 26.8 μs may be obtained. For example, if an absolute value of a difference between time domain start locations of any two of the L time domain ranges is 1 μs, a quantity of LRRs that do not interfere with each other and that can be supported is [27.8/1]=27 in a case of frequency scanning duration of 27.8 μs.

For a schematic diagram of arrangement of time domain ranges within which a plurality of LRRs fall, still refer to FIG. 19.

For another example, based on the formula 2.6, if the echo delay corresponding to the maximum detection distance of the fourth radar detection apparatus is equal to the echo delay corresponding to the maximum detection distance of the fifth radar detection apparatus, and the maximum propagation delay of the radar signal sent by the fourth radar detection apparatus is equal to the maximum propagation delay of the radar signal sent by the fifth radar detection apparatus, the formula 2.6 may be transformed into the following:

$$\max(\Delta_p, \tau_{max}-\Delta_p) \leq \Delta_t \leq T_c - \max(\Delta_p, \tau_{max}-\Delta_p) \quad \text{(formula 2.6-1)}$$

The formula 2.6-1 may also be considered as two formulas. For example, $\max(\Delta_p, \tau_{max}-\Delta_p) \leq \Delta_t$ may be considered as a second formula, used to determine the first threshold, and $\Delta_t \leq T_c - \max(\Delta_p, \tau_{max}-\Delta_p)$ may be considered as a sixth formula, used to determine the second threshold. It can be learned from the first point that the second formula may be $\max(\tau_{max_1}, \tau_{max_2}, \Delta_{p_1}, \Delta_{p_2}) \leq \Delta_t$ or $\max(\Delta_{p_1}, \Delta_{p_2}, \tau_{max_2}-\Delta_{p_1}, \tau_{max_1}-\Delta_{p_2}) \leq \Delta_t$ or $\max(\Delta_p, \tau_{max}-\Delta_p) \leq \Delta_t$ and the sixth formula may be $\Delta_t \leq T_c - \max(\tau_{max_1}, \tau_{max_2}, \Delta_{p_1}, \Delta_{p_2})$ or $\Delta_t \leq T_c - \max(\Delta_{p_1}, \Delta_{p_2}, \tau_{max_2}-\Delta_{p_1}, \tau_{max_1}-\Delta_{p_2})$ or $\Delta_t \leq T_c - \max(\Delta_p, \tau_{max}-\Delta_p)$.

The formula for determining the first threshold and the formula for determining the second threshold may be combined into one formula, for example, the formula 2.6-1. In this case, the first threshold and the second threshold may be determined together. Alternatively, the formula for determining the first threshold and the formula for determining the second threshold may exist separately, and the first threshold and the second threshold may be separately determined.

For example, both the fourth radar detection apparatus and the fifth radar detection apparatus are radars disposed on an RSU, and may be respectively referred to as an RSU radar 1 and an RSU radar 2. For example, frequency scanning bandwidth of the RSU radar 1 is 250 MHz, a frequency scanning period $T_c$ is 27.8 μs, a maximum detection distance is 250 m, and a corresponding maximum intermediate frequency is 15 MHz. Assuming that the RSU radar 1 and the RSU radar 2 are 300 m apart, $\Delta_p=1$ μs may be obtained. $\tau_{max}=250\times2/\text{speed of light}\approx1.67$ μs may be calculated based on the maximum detection distance 250 m.

Through substitution into the formula 2.6-1, $\max(1.67, 1) \leq \Delta_t \leq 27.8\max(1.67, 1)$, that is, 1 μs ≤ $\Delta_t$ ≤ 26.8 μs may be obtained. For example, if an absolute value of a difference between time domain start locations of any two of the L time domain ranges is 1 μs, a quantity of LRRs that do not interfere with each other and that can be supported is [27.8/1]=27 in a case of frequency scanning duration of 27.8 μs.

In an optional implementation, the formula 2.6 and the formula 2.6-1 may be considered to be applicable to a case in which a distance between the fourth radar detection apparatus and the fifth radar detection apparatus is less than a light speed propagation distance corresponding to a larger value in $\tau_{max_1}$ and $\tau_{max_2}$. In other words, when a propagation time is the larger value in $\tau_{max_1}$ and $\tau_{max_2}$, and a propagation speed is a speed of light, a distance may be calculated, where the distance is a light speed propagation distance corresponding to the larger value in $\tau_{max_1}$ and $\tau_{max_2}$. If the slope of the radar signal sent by the fourth radar detection apparatus and the slope of the radar signal sent by the fifth radar detection apparatus are the same, and the distance between the fourth radar detection apparatus and the fifth radar detection apparatus is less than the distance, the formula 2.6 or the formula 2.6-1 may be used. If the distance between the fourth radar detection apparatus and the fifth radar detection apparatus is greater than or equal to the distance, $\Delta_t$ may be determined in another manner.

For example, if the distance between the fourth radar detection apparatus and the fifth radar detection apparatus is greater than or equal to the light speed propagation distance corresponding to the larger value in $\tau_{max_1}$ and $\tau_{max_2}$, $\Delta_t$ may be an integer multiple of $T_c$, that is, $\Delta_t=MT_c$, where M is a positive integer. For example, for simplicity, M may be 0, and in this case, the fourth radar detection apparatus and the fifth radar detection apparatus send signals simultaneously.

Figure 24:
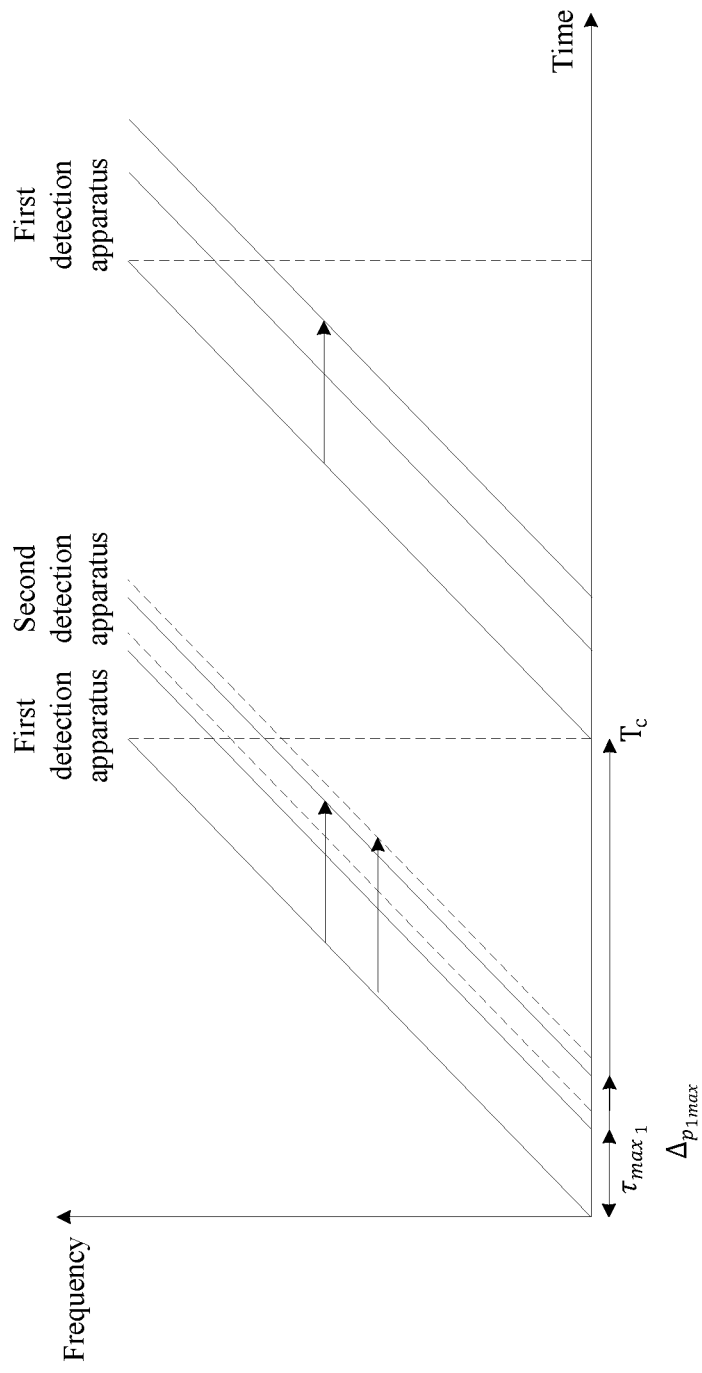
FIG. 24 is a schematic diagram of a time domain range of a fourth radar detection apparatus and a time domain range of a fifth radar detection apparatus according to an embodiment of this application.

FIG. 24 is a schematic diagram of a time domain range of the fourth radar detection apparatus and a time domain range of the fifth radar detection apparatus that are determined based on the foregoing method. In FIG. 24, the first solid line from left to right represents a transmitted signal of the fourth radar detection apparatus in one period and also represents a transmitted signal of the fifth radar detection apparatus in one period, the second solid line from left to right represents a reflected signal, namely, an echo signal, of the transmitted signal of the fourth radar detection apparatus, the first dashed line from left to right represents a reflected signal, namely, an echo signal, of the transmitted signal of the fifth radar detection apparatus, the third solid line from left to right represents a signal obtained after a propagation delay $\Delta_{p_1}$ expires for the transmitted signal of the fourth radar detection apparatus, and the second dashed line from left to right represents a signal obtained after a propagation delay $\Delta_{p_2}$ expires for the transmitted signal of the fifth radar detection apparatus. It can be learned that a transmitted signal of each of the two radar detection apparatuses does not fall within a target echo observation range of the other party, and does not cause interference to the other party.

The first information is not considered in the formula 2.5, the formula 2.6, or the formula 2.6-1. If the first information is considered, a method for determining the first threshold varies. For example, the first threshold may be determined based on the at least one echo delay, the at least one propagation delay, and the first information. Similarly, the second threshold may be determined based on the at least one echo delay, the at least one propagation delay, and the first information.

If an example in which the fourth radar detection apparatus and the fifth radar detection apparatus are involved in calculation is used, the first threshold may be determined based on the echo delay corresponding to the maximum detection distance of the first radar detection apparatus, the echo delay corresponding to the maximum detection distance of the second radar detection apparatus, the propagation delay of the radar signal sent by the first radar detection apparatus, the propagation delay of the radar signal sent by the second radar detection apparatus, and first information. Similarly, if an example in which the fourth radar detection apparatus and the fifth radar detection apparatus are involved in calculation is used, the second threshold may be determined based on the echo delay corresponding to the maximum detection distance of the first radar detection apparatus, the echo delay corresponding to the maximum detection distance of the second radar detection apparatus, the propagation delay of the radar signal sent by the first radar detection apparatus, the propagation delay of the radar signal sent by the second radar detection apparatus, and first information.

For example, the first threshold may be determined based on a third formula, and the third formula may be $$\max(\Delta_{p_1}, \Delta_{p_2}, \tau_{max_2}-\Delta_{p_1}, \tau_{max_1}-\Delta_{p_2})+\max\left(0, T_c-\frac{a_1}{a_2}T_c\right)+\Delta \leq \Delta_t.$$

The second threshold may be determined based on a seventh formula, and the seventh formula may be $$\Delta_t \leq T_c - \max(\Delta_{p_1}, \Delta_{p_2}, \tau_{max_2}-\Delta_{p_1}, \tau_{max_1}-\Delta_{p_2}) + \min\left(0, T_c-\frac{a_1}{a_2}T_c\right)-\Delta.$$

The following may be obtained through combination:

$$\max(\Delta_{p_1}, \Delta_{p_2}, \tau_{max_2}-\Delta_{p_1}, \tau_{max_1}-\Delta_{p_2})+ \qquad \text{(formula 2.7)}$$
$$\max\left(0, T_c-\frac{a_1}{a_2}T_c\right)+\Delta \leq \Delta_t \leq T_c - $$
$$\max(\Delta_{p_1}, \Delta_{p_2}, \tau_{max_2}-\Delta_{p_1}, \tau_{max_1}-\Delta_{p_2})+$$
$$\min\left(0, T_c-\frac{a_1}{a_2}T_c\right)-\Delta$$

The formula for determining the first threshold and the formula for determining the second threshold may be combined into one formula, for example, the formula 2.7. In this case, the first threshold and the second threshold may be determined together. Alternatively, the formula for determining the first threshold and the formula for determining the second threshold may exist separately, and the first threshold and the second threshold may be separately determined.

In addition, it can be learned from the first point that the third formula is $$\max(\tau_{max_1}, \tau_{max_2}, \Delta_{p_1}, \Delta_{p_2})+\max\left(0, T_c-\frac{a_1}{a_2}T_c\right)+$$
$$\Delta \leq \Delta_t \text{ or } \max(\Delta_{p_1}, \Delta_{p_2}, \tau_{max_2}-\Delta_{p_1}, \tau_{max_1}-\Delta_{p_2})+$$
$$\max\left(0, T_c-\frac{a_1}{a_2}T_c\right)+\Delta \leq \Delta_t,$$

and the seventh formula is $$\Delta_t \leq T_c - \max(\tau_{max_1}, \tau_{max_2}, \Delta_{p_1}, \Delta_{p_2})+$$
$$\min\left(0, T_c-\frac{a_1}{a_2}T_c\right)-\Delta \text{ or } \leq \Delta_t \leq T_c - \max(\Delta_{p_1}, \Delta_{p_2},$$
$$\tau_{max_2}-\Delta_{p_1}, \tau_{max_1}-\Delta_{p_2})+\min\left(0, T_c-\frac{a_1}{a_2}T_c\right)-\Delta.$$

For example, both the fourth radar detection apparatus and the fifth radar detection apparatus are radars disposed on an RSU, and may be respectively referred to as an RSU radar 1 and an RSU radar 2. For example, a slope of a radar signal sent by the RSU radar 2 is 1.2 times of a slope of a radar signal sent by the RSU radar 1. For example, frequency scanning bandwidth of the RSU radar 1 is 250 MHz, a frequency scanning period $T_c$ is 27.8 µs, a maximum detection distance is 250 m, and a corresponding maximum intermediate frequency is 15 MHz. The slope of the radar signal sent by the RSU radar 2 is 1.2 times of the slope of the radar signal sent by the RSU radar 1, a maximum detection distance of the RSU radar 2 is 200 m, frequency scanning bandwidth is 250 MHz, a frequency scanning period $T_c$ is 27.8 is, and a corresponding maximum intermediate frequency is 15 MHz. Assuming that the RSU radar 1 and the RSU radar 2 are 300 m apart, $\Delta_{p_1}=\Delta_{p_2}=1$ µs may be obtained. $\tau_{max_1}$=250×2/speed of light≈1.67 μs may be calculated based on the maximum detection distance 250 m of the RSU radar 1, and $\tau_{max_2}$=200×2/speed of light≈1.33 μs may be calculated based on the maximum detection distance 200 m of the RSU radar 2.

Through substitution into the formula 2.5, $$\max(1, 1.67-1, 1, 1.33-1) + \max\left(0, 27.8 - \frac{1}{1.2} \times 27.8\right) \leq \Delta_t \leq$$
$$27.8 - \max(1, 1.67-1, 1, 1.33-1) + \min\left(0, 27.8 - \frac{1}{12} \times 27.8\right),$$

that is, 5.7 μs≤$\Delta_t$≤26.7 μs may be obtained. For a synchronization error $\Delta_s$ between the RSU radar 1 and the RSU radar 2, refer to a timing error such as 2 μs of a GPS. If the first information includes the synchronization error between the RSU radar 1 and the RSU radar 2, and does not include a time margin, 7.7 μs≤$\Delta_t$≤24.7 is may be obtained through substitution into the formula 2.7. δ may be a predefined or preconfigured constant, and represents time jitter caused by a non-ideal factor of the RSU radar. For example, δ=1 μs. If the first information includes a time margin and the synchronization error between the RSU radar 1 and the RSU radar 2, 8.7 μs≤$\Delta_t$≤23.7 μs may be obtained through substitution into the formula 2.7. Provided that an absolute value of a difference between time domain start locations of any two of the L time domain ranges is greater than or equal to 8.7 μs and less than or equal to 23.7 there can be no interference between any two radar detection apparatuses sending radar signals in the L time domain ranges. For example, an absolute value of a difference between time domain start locations of any two of the L time domain ranges may be made equal to the first threshold, for example, equal to 8.7 μs, so that a quantity of radar detection apparatuses that do not interfere with each other reaches the largest, thereby improving utilization of time domain resources. For example, if an absolute value of a difference between time domain start locations of any two of the L time domain ranges is 8.7 μs, a quantity of radar detection apparatuses that do not interfere with each other and that can be supported is [27.8/8.7]=3 in a case of a frequency scanning period of 27.8 μs. For a schematic diagram of arrangement of time domain ranges within which a plurality of LRRs fall, still refer to FIG. 19.

When the first information is considered, a special case may also be considered: The slope of the radar signal sent by the fourth radar detection apparatus and the slope of the radar signal sent by the fifth radar detection apparatus are the same. In this case, the formula 2.7 may be transformed into the following:

$$\max(\Delta_{p_1}, \Delta_{p_2}, \tau_{max_2}-\Delta_{p_1}, \tau_{max_1}-\Delta_{p_2})+\Delta \leq \Delta_t \leq T_c-\max(\Delta_{p_1}, \Delta_{p_2}, \tau_{max_2}-\Delta_{p_1}, \tau_{max_1}-\Delta_{p_2})-\Delta \text{(formula 2.8)}$$

The formula 2.8 may also be considered as two formulas. For example, $\max(\Delta_{p_1}, \Delta_{p_2}, \tau_{max_2}-\Delta_{p_1}, \tau_{max_1}-\Delta_{p_2})+\Delta \leq \Delta_t$ may be considered as a fourth formula, used to determine the first threshold, and $\Delta_t \leq T_c-\max(\Delta_{p_1}, \Delta_{p_2}, \tau_{max_2}-\Delta_{p_1}, \tau_{max_1}-\Delta_{p_2})-\Delta$ may be considered as an eighth formula, used to determine the second threshold. The formula for determining the first threshold and the formula for determining the second threshold may be combined into one formula, for example, the formula 2.8. In this case, the first threshold and the second threshold may be determined together. Alternatively, the formula for determining the first threshold and the formula for determining the second threshold may exist separately, and the first threshold and the second threshold may be separately determined.

In addition, it can be learned from the first point that the fourth formula may be $\max(\tau_{max_i}, \tau_{max_1}, \Delta_{p_1}, \Delta_{p_2})+\Delta \leq \Delta_t$ or $\max(\Delta_{p_1}, \Delta_{p_2}, \tau_{max_2}-\Delta_{p_1}, \tau_{max_1}-\Delta_{p_2})+\Delta \leq \Delta_t$, and the eighth formula may be $\Delta_t \leq T_c-\max(\tau_{max_i}, \tau_{max_1}, \Delta_{p_1}, \Delta_{p_2})-\Delta$ or $\Delta_t \leq T_c-\max(\Delta_{p_1}, \Delta_{p_2}, \tau_{max_2}-\Delta_{p_1}, \tau_{max_1}-\Delta_{p_2})-\Delta$.

For example, both the fourth radar detection apparatus and the fifth radar detection apparatus are radars disposed on an RSU, and may be respectively referred to as an RSU radar 1 and an RSU radar 2. For example, a slope of a radar signal sent by the RSU 1 and a slope of a radar signal sent by the RSU 2 are equal. For example, frequency scanning bandwidth of the RSU radar 1 is 250 MHz, a frequency scanning period $T_c$ is 27.8 μs, a maximum detection distance is 250 m, and a corresponding maximum intermediate frequency is 15 MHz. A maximum detection distance of the RSU radar 2 is 250 m, frequency scanning bandwidth is 250 MHz, a frequency scanning period $T_c$ is 27.8 μs, and a corresponding maximum intermediate frequency is 15 MHz. Assuming that the RSU radar 1 and the RSU radar 2 are 300 m apart, $\Delta_{p_1}=\Delta_{p_2}=1$ μs may be obtained. $\tau_{max_1}=\tau_{max_2}$=250×2/speed of light≈1.67 μs may be calculated based on the maximum detection distance 250 m.

Through substitution into the formula 2.8, max(1, 1.67−1)≤$\Delta_t$≤27.8max(1, 1.67−1), that is, 1 μs≤$\Delta_t$≤26.8 μs may be obtained. For a synchronization error $\Delta_s$ between the RSU radar 1 and the RSU radar 2, refer to a timing error such as 2 μs of a GPS. If the first information includes the synchronization error between the RSU radar 1 and the RSU radar 2, and does not include a time margin, 3 μs≤$\Delta_t$≤24.8 μs may be obtained through substitution into the formula 2.8. δ may be a predefined or preconfigured constant, and represents time jitter caused by a non-ideal factor of the RSU radar. For example, δ=1 μs. If the first information includes a time margin and the synchronization error between the RSU radar 1 and the RSU radar 2, 4 μs≤$\Delta_t$≤23.8 may be obtained through substitution into the formula 2.8. Provided that an absolute value of a difference between time domain start locations of any two of the L time domain ranges is greater than or equal to 4 μs and less than or equal to 23.8 μs, there can be no interference between any two radar detection apparatuses sending radar signals in the L time domain ranges. For example, an absolute value of a difference between time domain start locations of any two of the L time domain ranges may be made equal to the first threshold, for example, equal to 4 μs, so that a quantity of radar detection apparatuses that do not interfere with each other reaches the largest, thereby improving utilization of time domain resources. For example, if an absolute value of a difference between time domain start locations of any two of the L time domain ranges is 4 μs, a quantity of radar detection apparatuses that do not interfere with each other and that can be supported is [27.8/4]=6 in a case of a frequency scanning period of 27.8 μs. For a schematic diagram of arrangement of time domain ranges within which a plurality of LRRs fall, still refer to FIG. 19.

Similarly, if the slope of the radar signal sent by the fourth radar detection apparatus and the slope of the radar signal sent by the fifth radar detection apparatus are the same, the synchronization error and the time margin are considered, and the distance between the fourth radar detection apparatus and the fifth radar detection apparatus is less than the distance, the formula 2.8 may be used. If the distance between the fourth radar detection apparatus and the fifth radar detection apparatus is greater than or equal to the distance, $\Delta_t$ may be determined in another manner.

For example, if the distance between the fourth radar detection apparatus and the fifth radar detection apparatus is greater than or equal to the light speed propagation distance corresponding to the larger value in $\tau_{max_1}$ and $\tau_{max_2}$, $\Delta_t$ may be an integer multiple of $T_c$, that is, $\Delta_t = MT_c$, where M is a positive integer. For example, for simplicity, M may be 0, and in this case, the fourth radar detection apparatus and the fifth radar detection apparatus send signals simultaneously.

Based on the formula 2.8, if the echo delay corresponding to the maximum detection distance of the fourth radar detection apparatus is equal to the echo delay corresponding to the maximum detection distance of the fifth radar detection apparatus, and the maximum propagation delay of the radar signal sent by the fourth radar detection apparatus is equal to the maximum propagation delay of the radar signal sent by the fifth radar detection apparatus, for example, the fourth radar detection apparatus and the fifth radar detection apparatus are a same type of radar detection apparatus, the formula 2.8 may be transformed into the following:

$$\max(\Delta_p, \tau_{max} - \Delta_{p_1}) + \Delta \leq \Delta' \leq T_c - \max(\Delta_p, \tau_{max} - \Delta_{p_1}) - \Delta \quad \text{(formula 2.8-1)}$$

The formula 2.8-1 may also be considered as two formulas. For example, $\max(\Delta_p, {}^T{}_{max} - \Delta_{p_1}) + \Delta \leq \Delta_t$ may be considered as a fourth formula, used to determine the first threshold, and $\Delta_t \leq T_c - \max(\Delta_p, \tau_{max} - \Delta_{p_1}) - \Delta$ may be considered as an eighth formula, used to determine the second threshold. The formula for determining the first threshold and the formula for determining the second threshold may be combined into one formula, for example, the formula 2.8-1. In this case, the first threshold and the second threshold may be determined together. Alternatively, the formula for determining the first threshold and the formula for determining the second threshold may exist separately, and the first threshold and the second threshold may be separately determined.

In addition, it can be learned from the first point that the fourth formula may be $\max(T_{max\,1}, \tau_{max_2}, \Delta_{p_1}, \Delta_{p_2}) + \Delta \leq \Delta_t$ or $\max(\Delta_{p_1}, \Delta_{p_2}, \tau_{max_2} - \Delta_{p_1}, \tau_{max_1} - \Delta_{p_2}) + \Delta \leq \Delta_t$ or $\max(\Delta_p, \tau_{max} - \Delta_{p_1}) + \Delta \leq \Delta_t$, and the eighth formula may be $\Delta_t \leq T_c - \max(\tau_{max_1}, \tau_{max_2}, \Delta_{p_1}, \Delta_{p_2}) - \Delta$ or $\Delta_t \leq T_c - \max(\Delta_{p_1}, \Delta_{p_2}, \tau_{max_2} \Delta - \Delta_{p_1}, \tau_{max_1} - \Delta_{p_2}) - \Delta$ or $\Delta_t \leq T_c - \max(\Delta_p, \tau_{max} - \Delta_{p_1}) - \Delta$.

For example, both the fourth radar detection apparatus and the fifth radar detection apparatus are radars disposed on an RSU, and may be respectively referred to as an RSU radar 1 and an RSU radar 2. For example, frequency scanning bandwidth of the RSU radar 1 is 250 MHz, a frequency scanning period $T_c$ is 27.8 µs, a maximum detection distance is 250 m, and a corresponding maximum intermediate frequency is 15 MHz. Assuming that the RSU radar 1 and the RSU radar 2 are 300 m apart, $\Delta_p = 1$ µs may be obtained. $\tau_{max} = 250 \times 2/\text{speed of light} \approx 1.67$ µs may be calculated based on the maximum detection distance 250 m.

Through substitution into the formula 2.8-1, $\max(1, 1.67-1) \leq \Delta_t \leq 27.8 \max(1, 1.67-1)$, that is, 1 µs $\leq \Delta_t \leq 26.8$ µs may be obtained. For a synchronization error $\Delta_s$ between the RSU radar 1 and the RSU radar 2, refer to a timing error such as 2 µs of a GPS. If the first information includes the synchronization error between the RSU radar 1 and the RSU radar 2, and does not include a time margin, 3 µs $\leq \Delta_t \leq 24.8$ is may be obtained through substitution into the formula 2.8-1. δ may be a predefined or preconfigured constant, and represents time jitter caused by a non-ideal factor of the RSU radar. For example, δ=1 µs. If the first information includes a time margin and the synchronization error between the RSU radar 1 and the RSU radar 2, 4 µs $\leq \Delta_t \leq 23.8$ us may be obtained through substitution into the formula 2.8-1. Provided that an absolute value of a difference between time domain start locations of any two of the L time domain ranges is greater than or equal to 4 µs and less than or equal to 23.8 µs, there can be no interference between any two radar detection apparatuses sending radar signals in the L time domain ranges. For example, an absolute value of a difference between time domain start locations of any two of the L time domain ranges may be made equal to the first threshold, for example, equal to 4 µs, so that a quantity of radar detection apparatuses that do not interfere with each other reaches the largest, thereby improving utilization of time domain resources. For example, if an absolute value of a difference between time domain start locations of any two of the L time domain ranges is 4 µs, a quantity of radar detection apparatuses that do not interfere with each other and that can be supported is [27.8/4]=6 in a case of a frequency scanning period of 27.8 µs. For a schematic diagram of arrangement of time domain ranges within which a plurality of LRRs fall, still refer to

FIG. 19.

As described above, if there are a plurality of radar detection apparatuses (or a plurality of types of radar detection apparatuses), a plurality of first sub-thresholds may be calculated, and a largest value in the plurality of first sub-thresholds is selected as the first threshold. Similarly, if there are a plurality of radar detection apparatuses (or a plurality of types of radar detection apparatuses), a plurality of second sub-thresholds may be calculated, and a largest value in the plurality of second sub-thresholds is selected as the second threshold. The following provides descriptions by using an example. For example, the final first threshold is a first sub-threshold calculated based on a fourth radar detection apparatus and a fifth radar detection apparatus, and the second threshold is a second sub-threshold calculated based on a sixth radar detection apparatus and a seventh radar detection apparatus. In other words, one first sub-threshold may be determined based on an echo delay corresponding to a maximum detection distance of the fourth radar detection apparatus, an echo delay corresponding to a maximum detection distance of the fifth radar detection apparatus, a maximum propagation delay of a radar signal sent by the fourth radar detection apparatus (or a maximum propagation delay of a transmitted signal of the fourth radar detection apparatus), and a maximum propagation delay of a radar signal sent by the fifth radar detection apparatus (or a maximum propagation delay of a transmitted signal of the fifth radar detection apparatus), and the first sub-threshold is the largest value in the plurality of first sub-thresholds, namely, the final first threshold. One second sub-threshold may be determined based on an echo delay corresponding to a maximum detection distance of the sixth radar detection apparatus, an echo delay corresponding to a maximum detection distance of the seventh radar detection apparatus, a maximum propagation delay of a radar signal sent by the sixth radar detection apparatus, and a maximum propagation delay of a radar signal sent by the seventh radar detection apparatus, and the second sub-threshold is the largest value in the plurality of second sub-thresholds, namely, the final second threshold.

In addition, in the foregoing description process, the example in which the second sub-threshold is calculated based on the fourth radar detection apparatus and the fifth radar detection apparatus is used. If the second sub-threshold (finally used as the second threshold) is calculated based on the sixth radar detection apparatus and the seventh radar detection apparatus, calculation formulas are the same as the foregoing formulas. For simplicity, when the second sub-threshold is calculated based on the radar detection apparatus and the seventh radar detection apparatus, the foregoing letters in the formulas used to calculate the second sub-threshold may also be used to represent corresponding parameters, and equivalently, a same letter may be used to represent different parameters in this embodiment of this application. For example, if parameters of a corresponding radar detection apparatus are substituted into any one of the formula 2.1 to the formula 2.8, calculation can be performed based on the corresponding radar detection apparatus. In the foregoing description process, parameters of the fourth radar detection apparatus and the fifth radar detection apparatus are substituted into the formula 2.1 to the formula 2.8. However, parameters of the sixth radar detection apparatus and the seventh radar detection apparatus may be substituted instead of the parameters of the fourth radar detection apparatus and the fifth radar detection apparatus, and in this case, the first sub-threshold or the second sub-threshold is calculated based on the sixth radar detection apparatus and the seventh radar detection apparatus.

The fourth radar detection apparatus and the sixth radar detection apparatus may be a same detection apparatus, or may be different detection apparatuses, and the fifth radar detection apparatus and the seventh radar detection apparatus may be a same detection apparatus, or may be different detection apparatuses.

For example, there is a radar detection apparatus 1, a radar detection apparatus 2, and a radar detection apparatus 3, the radar detection apparatus 1 is 300 m apart from the radar detection apparatus 2, the radar detection apparatus 1 is 400 m apart from the radar detection apparatus 3, the radar detection apparatus 2 is 500 m apart from the radar detection apparatus 3, and a slope of a radar signal sent by the radar detection apparatus 1, a slope of a radar signal sent by the radar detection apparatus 2, and a slope of a radar signal sent by the radar detection apparatus 3 are the same. For example, if the first information is not considered, through calculation based on the formula 2.5, an absolute value range of a difference between time domain start locations of a time domain range of the radar detection apparatus 1 and a time domain range of the radar detection apparatus 2 is 1 $\mu s \leq \Delta_t \leq 26.8$ $\mu s$, an absolute value range of a difference between time domain start locations of the time domain range of the radar detection apparatus 1 and a time domain range of the radar detection apparatus 3 is 1.3 $\mu s \leq \Delta_t \leq 26.5$ $\mu s$, and an absolute value range of a difference between time domain start locations of the time domain range of the radar detection apparatus 2 and the time domain range of the radar detection apparatus 3 is 1.67 $\mu s \leq \Delta_t \leq 26.1$ $\mu s$, an intersection set of the three ranges is selected (in other words, a largest value in a plurality of first sub-thresholds is selected as the first threshold, and a smallest value in a plurality of second sub-thresholds is selected as the second threshold) to learn that an absolute value range of a difference between time domain start locations of any two of the L time domain ranges is 1.67 $\mu s \leq \Delta_t \leq 26.1$ $\mu s$.

In this embodiment of this application, one radar detection apparatus may calculate $\Delta_t$, to determine the L time domain ranges and send information about the L time domain ranges to another radar detection apparatus. Therefore, the radar detection apparatus only needs to select a corresponding time domain range from the L time domain ranges to send a radar signal. Alternatively, the L time domain ranges may be specified in a protocol, for example, the protocol specifies the L time domain ranges and $\Delta_t$. Therefore, the radar detection apparatus only needs to select a corresponding time domain range from the L time domain ranges to send a radar signal. Alternatively, the L time domain ranges may be preconfigured in the radar detection apparatus, for example, both information about the L time domain ranges and $\Delta_t$ are preconfigured in the radar detection apparatus. Therefore, the radar detection apparatus only needs to select a corresponding time domain range from the L time domain ranges to send a radar signal.

In addition, in actual application, the first threshold and the second threshold may be calculated by using the method provided in this embodiment of this application, so that $\Delta_t$ is determined based on the first threshold and the second threshold. Alternatively, only the first threshold may be calculated by using the method provided in this embodiment of this application and the second threshold may be calculated in another manner, and $\Delta_t$ is determined based on the first threshold and the second threshold. A method for calculating the second threshold is not limited. Alternatively, only the second threshold may be calculated by using the method provided in this embodiment of this application and the first threshold may be calculated in another manner, and $\Delta_t$ is determined based on the first threshold and the second threshold. A method for calculating the first threshold is not limited.

S1702. The first radar detection apparatus sends the first radar signal in the first time domain range.

After the first radar detection apparatus selects the first time domain range, the first radar detection apparatus may send the first radar signal in the first time domain range, and a signal may be reflected back after the first radar signal reaches a target object, so that the first radar apparatus receives the reflected signal. The first radar apparatus performs frequency mixing on the reflected signal and a local oscillator signal to obtain an intermediate frequency signal, so that one or more of information such as a location, a speed, and an angle of the target object can be determined based on the intermediate frequency signal.

If there is another radar detection apparatus that also needs to send a radar signal, for example, there is a second radar detection apparatus, the second radar detection apparatus may select a second time domain range from the L time domain ranges to send a second radar signal.

In other words, different radar detection apparatuses may select different time domain ranges to send radar signals. There may be or may not be an intersection set between the first time domain range and the second time domain range. If there is an intersection set between the first time domain range and the second time domain range, an absolute value of a difference between time domain start locations of the first time domain range and the second time domain range may be $\Delta_t$ calculated in S1701. Therefore, according to the method provided in this embodiment of this application, it can be ensured that a mutual interference area of radar detection apparatuses disappears, so that a problem of a false alarm or an interference platform is avoided. In addition, in this embodiment of this application, a minimum value of the calculated range may be selected as $\Delta_t$, that is, the first threshold may be made equal to $\Delta_t$, so that in a case of same available time domain resources, a quantity of radar detection apparatuses that do not interfere with each other and that can be supported reaches the largest, thereby greatly improving utilization of time domain resources.

The foregoing mainly describes the solutions provided in the embodiments of this application from the perspective of the first radar detection apparatus or from the perspective of interaction between the first radar detection apparatus and a radar detection apparatus or a target object. The formulas involved in the foregoing solution are only a specific expression manner. Possible modification or rewriting of the foregoing formulas that is made to resolve a same technical problem and achieve a same or similar technical effect falls within the protection scope of the embodiments of this application. It may be understood that to implement the foregoing functions, each apparatus such as the first radar detection apparatus includes hardware structures and/or software modules corresponding to the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the first radar detection apparatus may be divided into function modules. For example, function modules may be obtained through division based on functions, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, another division manner may be used.

Figure 25:
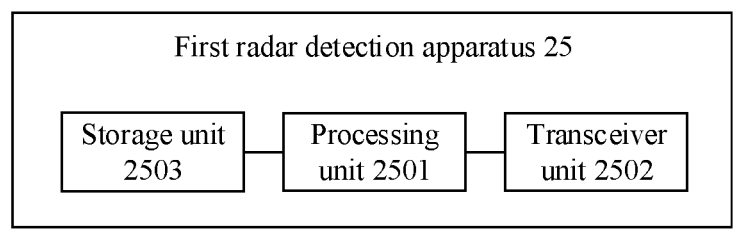
FIG. 25 is a schematic structural diagram of a first radar detection apparatus according to an embodiment of this application.

For example, when function modules of a radar detection apparatus are obtained through division in an integrated manner, FIG. 25 is a possible schematic structural diagram of the first radar detection apparatus in the foregoing embodiment of this application. The first radar detection apparatus 25 may include a processing unit 2501 and a transceiver unit 2502. The processing unit 2501 may be configured to perform all operations except for transceiving operations performed by the first radar detection apparatus in the embodiment shown in FIG. 17A, for example, S1701, and/or configured to perform another process used to support the technology described in this specification. The transceiver unit 2502 may be configured to perform all transceiving operations performed by the first radar detection apparatus in the embodiment shown in FIG. 17A, for example, S1702, and/or configured to perform another process used to support the technology described in this specification.

The processing unit 2501 is configured to determine a first time domain range, where the first time domain range is a time domain range in L time domain ranges, and L is a positive integer greater than 1.

The transceiver unit 2502 is configured to send a first radar signal in the first time domain range, where any one of the L time domain ranges partially overlaps at least one of the other (L−1) time domain ranges, and an absolute value of a difference between time domain start locations of any two of the L time domain ranges is greater than or equal to a first threshold and less than or equal to a second threshold; and the first threshold is determined based on at least one echo delay and at least one propagation delay, the at least one echo delay includes a first echo delay corresponding to a maximum detection distance of the first radar detection apparatus 25, and the at least one propagation delay includes a first propagation delay corresponding to the first radar signal.

In an optional implementation, the at least one echo delay includes a second echo delay, and the second echo delay is an echo delay corresponding to a maximum detection distance of a second radar detection apparatus, and/or the at least one propagation delay includes a second propagation delay, and the second propagation delay is a propagation delay corresponding to a third radar signal corresponding to a third radar detection apparatus, where the second echo delay is not equal to the first echo delay, and the second propagation delay is not equal to the first propagation delay.

In an optional implementation, the first threshold is a largest value in a plurality of first sub-thresholds, and the plurality of first sub-thresholds are determined based on the at least one echo delay and the at least one propagation delay.

In an optional implementation, the first threshold meets the following formula:

$$\max(\tau_{max_1}, \tau_{max_2}, \Delta_{p_1}, \Delta_{p_2}) + \max\left(0, T_c - \frac{a_1}{a_2}T_c\right),$$

$$\text{or } \max(\tau_{max_1}, \tau_{max_2}, \Delta_{p_1}, \Delta_{p_2}) + \max\left(0, T_c - \frac{a_1}{a_2}T_c\right) + \Delta,$$

where $\tau_{max_1}$ is an echo delay corresponding to a maximum detection distance of a fourth radar detection apparatus, $\tau_{max_2}$ is an echo delay corresponding to a maximum detection distance of a fifth radar detection apparatus, $\Delta_{p_1}$ is a propagation delay corresponding to a fourth radar signal, $\Delta_{p_2}$ is a propagation delay corresponding to a fifth radar signal, $a_1$ is a frequency change amount of the fourth radar signal in a unit time, $a_2$ is a frequency change amount of the fifth radar signal in the unit time, $T_c$ is a frequency scanning time of the fourth radar detection apparatus, the fourth radar signal corresponds to the fourth radar detection apparatus, the fifth radar signal corresponds to the fifth radar detection apparatus, $\Delta$ is a time margin, a synchronization error, or a sum of a time margin and a synchronization error, and the synchronization error is a synchronization error between the fourth radar detection apparatus and the fifth radar detection apparatus.

In an optional implementation, the propagation delay corresponding to the fourth radar signal is a maximum propagation delay corresponding to the fourth radar signal, and the propagation delay corresponding to the fifth radar signal is a maximum propagation delay corresponding to the fifth radar signal.

In an optional implementation, the second threshold is determined based on the at least one echo delay and the at least one propagation delay.

In an optional implementation, the second threshold is a smallest value in a plurality of second sub-thresholds, and the plurality of second sub-thresholds are determined based on the at least one echo delay and the at least one propagation delay.

In an optional implementation, the second threshold meets the following formula:

$$T_c - \max(\tau_{max_1}, \tau_{max_2}, \Delta_{p_1}, \Delta_{p_2}) + \min\left(0, T_c - \frac{a_1}{a_2}T_c\right),$$

or $T_c - \max(\tau_{max_1}, \tau_{max_2}, \Delta_{p_1}, \Delta_{p_2}) + \min\left(0, T_c - \frac{a_1}{a_2}T_c\right) + \Delta,$ where $\tau_{max_1}$ is an echo delay corresponding to a maximum detection distance of a sixth radar detection apparatus, $\tau_{max_2}$ is an echo delay corresponding to a maximum detection distance of a seventh radar detection apparatus, $\Delta_{p_1}$ is a propagation delay corresponding to a sixth radar signal, $\Delta_{p_2}$ is a propagation delay corresponding to a seventh radar signal, $a_1$ is a frequency change amount of the sixth radar signal in the unit time, $a_2$ is a frequency change amount of the seventh radar signal in the unit time, $T_c$ is a frequency scanning time of the sixth radar detection apparatus, the sixth radar signal corresponds to the sixth radar detection apparatus, the seventh radar signal corresponds to the seventh radar detection apparatus, $\Delta$ is a time margin, a synchronization error, or a sum of a time margin and a synchronization error, and the synchronization error is a synchronization error between the sixth radar detection apparatus and the seventh radar detection apparatus.

In an optional implementation, the propagation delay corresponding to the fourth radar signal is a maximum propagation delay corresponding to the fourth radar signal, and the propagation delay corresponding to the fifth radar signal is a maximum propagation delay corresponding to the fifth radar signal.

In an optional implementation, the first threshold meets the following formula:

$$\max(\Delta_{p_1}, \Delta_{p_2}, \tau_{max_2} - \Delta_{p_1}, \tau_{max_1} - \Delta_{p_2}) + \max\left(0, T_c - \frac{a_1}{a_2}T_c\right),$$

$$\text{or } \max(\Delta_{p_1}, \Delta_{p_2}, \tau_{max_2} - \Delta_{p_1}, \tau_{max_1} - \Delta_{p_2}) + \max\left(0, T_c + -\frac{a_1}{a_2}T_c\right) + \Delta,$$

where $\tau_{max_1}$ is an echo delay corresponding to a maximum detection distance of a fourth radar detection apparatus, $\tau_{max_2}$ is an echo delay corresponding to a maximum detection distance of a fifth radar detection apparatus, $\Delta_{p_1}$ is a propagation delay corresponding to a fourth radar signal, $\Delta_{p_2}$ is a propagation delay corresponding to a fifth radar signal, $a_1$ is a frequency change amount of the fourth radar signal in a unit time, $a_2$ is a frequency change amount of the fifth radar signal in the unit time, $T_c$ is a frequency scanning time of the fourth radar detection apparatus, the fourth radar signal corresponds to the fourth radar detection apparatus, the fifth radar signal corresponds to the fifth radar detection apparatus, $\Delta$ is a time margin, a synchronization error, or a sum of a time margin and a synchronization error, and the synchronization error is a synchronization error between the fourth radar detection apparatus and the fifth radar detection apparatus.

In an optional implementation, the second threshold is determined based on the at least one echo delay and the at least one propagation delay.

In an optional implementation, the second threshold is a smallest value in a plurality of second sub-thresholds, and the plurality of second sub-thresholds are determined based on the at least one echo delay and the at least one propagation delay.

In an optional implementation, the second threshold meets the following formula:

$T_c - \max(\Delta_{p_1}, \Delta_{p_2}, \tau_{max_2} - \Delta_{p_1}, \tau_{max_1} - \Delta_{p_2}) + \min\left(0, T_c - \frac{a_1}{a_2}T_c\right),$ or $T_c - \max(\Delta_{p_1}, \Delta_{p_2}, \tau_{max_2} - \Delta_{p_1}, \tau_{max_1} - \Delta_{p_2}) + \min\left(0, T_c - \frac{a_1}{a_2}T_c\right) + \Delta,$ where $\tau_{max_1}$ is an echo delay corresponding to a maximum detection distance of a sixth radar detection apparatus, $\tau_{max_2}$ is an echo delay corresponding to a maximum detection distance of a seventh radar detection apparatus, $\Delta_{p_1}$ is a propagation delay corresponding to a sixth radar signal, $\Delta_{p_2}$ is a propagation delay corresponding to a seventh radar signal, $a_1$ is a frequency change amount of the sixth radar signal in the unit time, $a_2$ is a frequency change amount of the seventh radar signal in the unit time, $T_c$ is a frequency scanning time of the sixth radar detection apparatus, the sixth radar signal corresponds to the sixth radar detection apparatus, the seventh radar signal corresponds to the seventh radar detection apparatus, $\Delta$ is a time margin, a synchronization error, or a sum of a time margin and a synchronization error, and the synchronization error is a synchronization error between the sixth radar detection apparatus and the seventh radar detection apparatus.

In an optional implementation, the propagation delay corresponding to the fourth radar signal is a delay of the fourth radar signal in reaching the fifth radar detection apparatus from the fourth radar detection apparatus, and the propagation delay corresponding to the fifth radar signal is a delay of the fifth radar signal in reaching the fourth radar detection apparatus from the fifth radar detection apparatus.

Optionally, the first radar detection apparatus 25 may further include a storage unit 2503, configured to store program instructions and/or data for reading by the processing unit 2501.

The optional design may be implemented independently, or may be integrated with any one of the foregoing optional designs.

Figure 26:
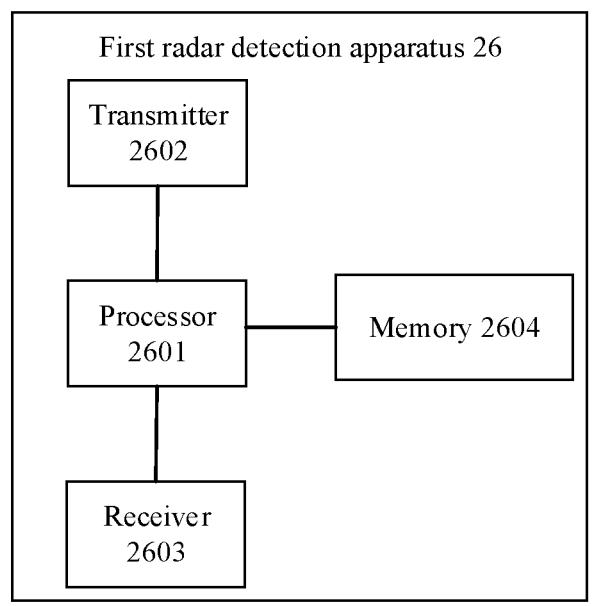
FIG. 26 is another schematic structural diagram of a first radar detection apparatus according to an embodiment of this application.

FIG. 26 is another schematic structural diagram of a first radar detection apparatus according to an embodiment of this application. The first radar detection apparatus 26 may include a processor 2601, a transmitter 2602, and a receiver 2603. Functions of the processor 2601, the transmitter 2602, and the receiver 2603 may separately correspond to specific functions of the processing unit 2501 and the transceiver unit 2502 shown in FIG. 25. Details are not described herein again. Optionally, the first radar detection apparatus 26 may further include a memory 2604, configured to store program instructions and/or data for reading by the processor 2601.

Figure 27:
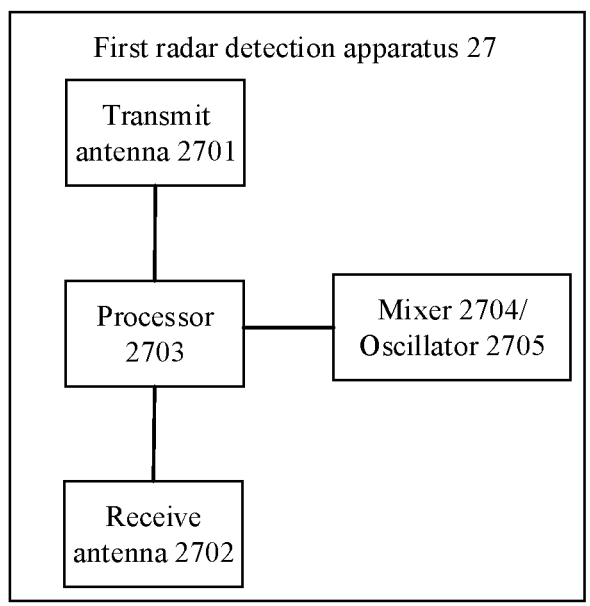
FIG. 27 is still another schematic structural diagram of a first radar detection apparatus according to an embodiment of this application.

FIG. 1 is a schematic structural diagram of a radar apparatus. Another optional manner is provided with reference to the foregoing content. FIG. 27 is still another possible schematic structural diagram of a first radar detection apparatus according to an embodiment of this application. The first radar detection apparatus provided in FIG. 25 to FIG. 27 may be a part or all of a radar apparatus in an actual communication scenario, or may be a function module integrated into a radar apparatus or located outside a radar apparatus, for example, may be a chip system. Details depend on corresponding functions, and a structure and composition of the first radar detection apparatus are not specifically limited.

In this optional manner, the first radar detection apparatus 27 includes a transmit antenna 2701, a receive antenna 2702, and a processor 2703. Further, the first radar detection apparatus further includes a mixer 2704 and/or an oscillator 2705. Further, the first radar detection apparatus 27 may further include a low-pass filter, a directional coupler, and/or the like. The transmit antenna 2701 and the receive antenna 2702 are configured to support the detection apparatus in performing radio communication, the transmit antenna 2701 supports radar signal transmission, and the receive antenna 2702 supports radar signal reception and/or reflected signal reception, to finally implement a detection function. The processor 2703 performs some possible determining and/or processing functions and controls operations of the transmit antenna 2701 and/or the receive antenna 2702. The processor 2703 controls the transmit antenna 2701 to transmit a signal to be transmitted, and a signal received by using the receive antenna 2702 may be transferred to the processor 2703 for corresponding processing. The components included in the first radar detection apparatus 27 may be configured to perform the method provided in the embodiment shown in FIG. 17A in cooperation. Optionally, the first radar detection apparatus may further include a memory, configured to store program instructions and/or data. The transmit antenna 2701 and the receive antenna 2702 may be independently disposed, or may be disposed as a transceiver antenna through integration to perform a corresponding transceiving function.

Figure 28:
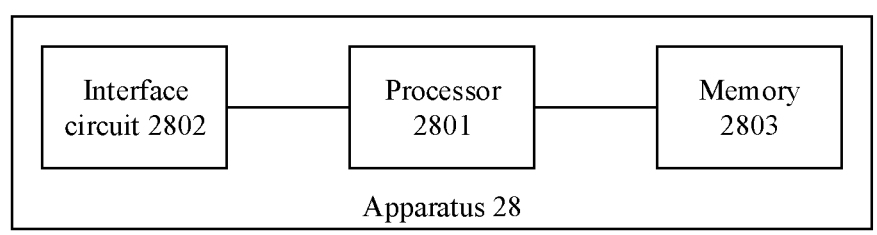
FIG. 28 is a schematic structural diagram of an apparatus according to an embodiment of this application.

FIG. 28 is a schematic structural diagram of an apparatus 28 according to an embodiment of this application. The apparatus 28 shown in FIG. 28 may be a first radar detection apparatus, or may be a chip or a circuit that can complete functions of a first radar detection apparatus. For example, the chip or the circuit may be disposed in the first radar detection apparatus. The apparatus 28 shown in FIG. 28 may include a processor 2801 (for example, the processing unit 2501 may be implemented by using the processor 2801, and the processor 2601 and the processor 2801 may be, for example, a same component) and an interface circuit 2802 (for example, the transceiver unit 2502 may be implemented by using the interface circuit 2802, and the transmitter 2602 and the receiver 2603 are, for example, a same component as the interface circuit 2802). The processor 2801 may enable the apparatus 28 to implement the steps performed by the first radar detection apparatus in the method provided in the embodiment shown in FIG. 17A. Optionally, the apparatus 28 may further include a memory 2803, and the memory 2803 may be configured to store instructions. The processor 2801 executes the instructions stored in the memory 2803, so that the apparatus 28 implements the steps performed by the first radar detection apparatus in the method provided in the embodiment shown in FIG. 17A.

Further, the processor 2801, the interface circuit 2802, and the memory 2803 may communicate with each other through an internal connection channel to transfer a control signal and/or a data signal. The memory 2803 is configured to store computer programs. The processor 2801 may invoke the computer programs from the memory 2803 and run the computer programs to control the interface circuit 2802 to receive a signal or send a signal, to complete the steps performed by the first radar detection apparatus in the method provided in the embodiment shown in FIG. 17A. The memory 2803 may be integrated into the processor 2801, or may be disposed separately from the processor 2801.

Optionally, if the apparatus 28 is a device, the interface circuit 2802 may include a receiver and a transmitter. The receiver and the transmitter may be a same component, or may be different components. When the receiver and the transmitter are a same component, the component may be referred to as a transceiver.

Optionally, if the apparatus 28 is a chip or a circuit, the interface circuit 2802 may include an input interface and an output interface, and the input interface and the output interface may be a same interface, or may be different interfaces.

Optionally, if the apparatus 28 is a chip or a circuit, the apparatus 28 may not include the memory 2803, and the processor 2801 may read instructions (program or code) in a memory outside the chip or the circuit, to implement the steps performed by the first radar detection apparatus in the method provided in the embodiment shown in FIG. 17A.

Optionally, if the apparatus 28 is a chip or a circuit, the apparatus 28 may include a resistor, a capacitor, or another corresponding function component, and the processor 2801 or the interface circuit 2802 may be implemented by using a corresponding function component.

In an implementation, functions of the interface circuit 2802 may be implemented by using a transceiver circuit or a dedicated transceiving chip. The processor 2801 may be implemented by using a dedicated processing chip, processing circuit, or processor, or a general-purpose chip.

In another implementation, the first radar detection apparatus provided in this embodiment of this application may be implemented by using a general-purpose computer. To be specific, program code for implementing functions of the processor 2801 and the interface circuit 2802 is stored in the memory 2803, and the processor 2801 implements the functions of the processor 2801 and the interface circuit 2802 by executing the program code stored in the memory 2803.

The foregoing described functions and actions of the modules or the units in the apparatus 28 are merely for example description, and the function units in the apparatus 28 may be configured to perform the actions or processing processes performed by the first radar detection apparatus in the embodiment shown in FIG. 17A. To avoid repetition, detailed descriptions are omitted herein.

It should be noted that a second radar detection apparatus, a third radar detection apparatus, a fourth radar detection apparatus, a fifth radar detection apparatus, and the like may have a same structure as the first radar detection apparatus, that is, the schematic structural diagrams shown in FIG. 25 to FIG. 28 are also applicable.

In still another optional manner, when software is used to implement the radar detection apparatus, all or some of the embodiments may be implemented in a form of a computer program product. The computer program product includes one or more computer instructions. When the computer program instructions are loaded and executed on a computer, all or some of the procedures or functions described in the embodiments of this application are implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It should be noted that the processor in the embodiments of this application may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

Method or algorithm steps described in combination with the embodiments of this application may be implemented by hardware, or may be implemented by a processor by executing a software instruction. The software instruction may include a corresponding software module. The software module may be stored in a random access memory (random access memory, RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a detection apparatus. Certainly, the processor and the storage medium may exist in the detection apparatus as discrete components.

It may be understood that FIG. 25 to FIG. 28 show only simplified designs of the radar detection apparatus. In actual application, the radar detection apparatus may include any quantity of transmitters, receivers, processors, controllers, memories, and other possible elements.

An embodiment of this application further provides a communications system, including at least one radar detection apparatus corresponding to the at least one echo delay and the at least one propagation delay that are mentioned in the foregoing embodiment of this application.

An embodiment of this application further provides a communications system, including at least one radar detection apparatus mentioned in the foregoing embodiment of this application and/or at least one central processing unit/central controller. The central processing unit/central controller is configured to control driving of a vehicle and/or processing of another radar detection apparatus based on output of the at least one radar detection apparatus. The central processing unit/central controller may be located in a vehicle or another possible location to implement the control.

The foregoing descriptions about implementations allow a person skilled in the art to understand that, for the purpose of convenient and brief description, division of the foregoing function modules is used as an example for illustration. In actual application, the foregoing functions may be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A radar signal sending method, comprising:
   determining, by a first radar detection apparatus, a first time domain range in L time domain ranges, where L is a positive integer greater than 1; and
   sending, by the first radar detection apparatus, a first radar signal in the first time domain range, wherein:
   any one of the L time domain ranges partially overlaps at least one of the other (L−1) time domain ranges, and an absolute value of a difference between time domain start locations of any two of the L time domain ranges is greater than or equal to a first threshold and less than or equal to a second threshold, the first threshold being determined based on at least one echo delay and at least one propagation delay, the at least one echo delay comprising a first echo delay corresponding to a maximum detection distance of the first radar detection apparatus, and the at least one propagation delay comprising a first propagation delay corresponding to the first radar signal.

2. The method according to claim 1, wherein the at least one echo delay comprises a second echo delay corresponding to a maximum detection distance of a second radar detection apparatus, the second echo delay not being equal to the first echo delay.

3. The method according to claim 1, wherein the at least one propagation delay comprises a second propagation delay corresponding to a third radar signal associated with a third radar detection apparatus, and the second propagation delay is not equal to the first propagation delay.

4. The method according to claim 1, wherein the first threshold is a largest value in a plurality of first sub-thresholds, and the plurality of first sub-thresholds is determined based on the at least one echo delay and the at least one propagation delay.

5. The method according to claim 1, wherein the second threshold is determined based on the at least one echo delay and the at least one propagation delay.

6. The method according to claim 1, wherein the second threshold is a smallest value in a plurality of second sub-thresholds, and the plurality of second sub-thresholds is determined based on the at least one echo delay and the at least one propagation delay.

7. The method according to claim 1, wherein the second threshold is determined based on the at least one echo delay and the at least one propagation delay.

8. The method according to claim 7, wherein the second threshold is a smallest value in a plurality of second sub-thresholds, and the plurality of second sub-thresholds is determined based on the at least one echo delay and the at least one propagation delay.

9. The radar signal sending method according to claim 1, further comprising:
receiving another radar signal by the first radar detection apparatus after the propagation delay, wherein:
when power of the other radar signal is greater than a sensitivity of a receiver of the first radar detection apparatus, the other radar signal causes interference to the first radar detection apparatus;
when the power of the other radar signal is not greater than the sensitivity of the receiver of the first radar detection apparatus, the other radar signal does not cause interference to the first radar detection apparatus and the other radar signal is processed as noise; and
when the power of the other radar signal is equal to the sensitivity of the receiver of the first radar detection apparatus, the propagation delay is referred to as maximum propagation delay of radar signal.

10. A detection apparatus, comprising:
one or more processors, and
a non-transitory storage medium coupled to the one or more processors, the non-transitory storage medium storing program instructions that, when executed by the one or more processors, cause the apparatus to:
determine a first time domain range in L time domain ranges, L being a positive integer greater than 1; and
send a first radar signal in the first time domain range, wherein:
any one of the L time domain ranges partially overlaps at least one of the other (L−1) time domain ranges, and an absolute value of a difference between time domain start locations of any two of the L time domain ranges is greater than or equal to a first threshold and less than or equal to a second threshold, the first threshold being determined based on at least one echo delay and at least one propagation delay, the at least one echo delay comprising a first echo delay corresponding to a maximum detection distance of the radar detection apparatus, and the at least one propagation delay comprising a first propagation delay corresponding to the first radar signal.

11. The detection apparatus according to claim 10, wherein the at least one echo delay comprises a second echo delay corresponding to a maximum detection distance of a second radar detection apparatus, and the second echo delay is not equal to the first echo delay.

12. The detection apparatus according to claim 10, wherein the at least one propagation delay comprises a second propagation delay corresponding to a third radar signal associated with a third radar detection apparatus, and the second propagation delay is not equal to the first propagation delay.

13. The detection apparatus according to claim 10, wherein the first threshold is a largest value in a plurality of first sub-thresholds, and the plurality of first sub-thresholds is determined based on the at least one echo delay and the at least one propagation delay.

14. The detection apparatus according to claim 10, wherein the second threshold is determined based on the at least one echo delay and the at least one propagation delay.

15. The detection apparatus according to claim 10, wherein the second threshold is a smallest value in a plurality of second sub-thresholds and is determined based on the at least one echo delay and the at least one propagation delay.

16. The detection apparatus according to claim 15, wherein the second threshold is determined based on the at least one echo delay and the at least one propagation delay.

17. The detection apparatus according to claim 10, wherein the propagation delay corresponding to the fourth radar signal is a maximum propagation delay corresponding to the fourth radar signal, and the propagation delay corresponding to the fifth radar signal is a maximum propagation delay corresponding to the fifth radar signal.

18. A non-transitory computer readable medium storing program instructions that, when executed by a processor, cause the processor to perform the operations including:
determining a first time domain range range in L time domain ranges, L being a positive integer greater than 1; and
sending a first radar signal in the first time domain range, wherein:
any one of the L time domain ranges partially overlaps at least one of the other (L−1) time domain ranges, an absolute value of a difference between time domain start locations of any two of the L time domain ranges is greater than or equal to a first threshold and less than or equal to a second threshold, the first threshold being determined based on at least one echo delay and at least one propagation delay, the at least one echo delay comprising a first echo delay corresponding to a maximum detection distance of the first radar detection apparatus, the at least one propagation delay comprising a first propagation delay corresponding to the first radar signal.

19. The medium according to claim 18, wherein the at least one echo delay comprises a second echo delay corresponding to a maximum detection distance of a second radar detection apparatus, and the second echo delay is not equal to the first echo delay.

20. The medium according to claim 18, wherein the at least one propagation delay comprises a second propagation delay corresponding to a third radar signal associated with a third radar detection apparatus, and the second propagation delay is not equal to the first propagation delay.

21. The medium according to claim 18, wherein the first threshold is a largest value in a plurality of first sub-thresholds, and the plurality of first sub-thresholds is determined based on the at least one echo delay and the at least one propagation delay.

* * * * *

UNITED STATES PATENT AND TRADEMARK OFFICE
CERTIFICATE OF CORRECTION

PATENT NO. : 12,259,491 B2
APPLICATION NO. : 17/537269
DATED : March 25, 2025
INVENTOR(S) : Gao et al.

Page 1 of 1

It is certified that error appears in the above-identified patent and that said Letters Patent is hereby corrected as shown below:

In the Claims

Claim 18: Column 68, Line 46: "determining a first time domain range range in L time" should read as -- determining a first time domain range in L time --.

Signed and Sealed this
Fifteenth Day of July, 2025

Coke Morgan Stewart
*Acting Director of the United States Patent and Trademark Office*